(12) United States Patent
Hahn et al.

(10) Patent No.: US 11,888,631 B2
(45) Date of Patent: Jan. 30, 2024

(54) DOCUMENT MANAGEMENT IN A COMMUNICATION PLATFORM

(71) Applicant: Salesforce, Inc., San Francisco, CA (US)

(72) Inventors: Michael Hahn, San Francisco, CA (US); Sohom Paul, Sugar Land, TX (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/588,615

(22) Filed: Jan. 31, 2022

(65) Prior Publication Data
US 2023/0246860 A1    Aug. 3, 2023

(51) Int. Cl.
| | |
|---|---|
| H04L 12/18 | (2006.01) |
| G06F 3/0486 | (2013.01) |
| G06F 3/0482 | (2013.01) |
| G06F 16/93 | (2019.01) |

(52) U.S. Cl.
CPC ........ *H04L 12/1818* (2013.01); *G06F 3/0482* (2013.01); *G06F 3/0486* (2013.01); *G06F 16/93* (2019.01)

(58) Field of Classification Search
CPC . H04L 12/1818; G06F 3/0482; G06F 3/0486; G06F 16/93
See application file for complete search history.

(56) References Cited

U.S. PATENT DOCUMENTS

| | | | |
|---|---|---|---|
| 11,412,011 B1* | 8/2022 | Benjamin | H04L 67/02 |
| 11,496,434 B2* | 11/2022 | Luthra | G06F 16/94 |
| 2011/0055209 A1* | 3/2011 | Novac | G06F 40/103 |
| | | | 707/E17.089 |
| 2015/0199488 A1* | 7/2015 | Falchuk | G16H 50/20 |
| | | | 705/2 |

(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Sm A Rahman
(74) *Attorney, Agent, or Firm* — Lee & Hayes, P.C.

(57) ABSTRACT

Techniques for providing a dynamic and modifiable sidebar of a user interface of a communication platform are discussed herein. The sidebar includes affordances of virtual spaces that are associated with a particular user account, such that a virtual space is accessible via a respective affordance. In examples, a section of the sidebar can be modifiable by the user, such as to enable the user to personalize the sidebar. The virtual spaces can include collaborative documents that are created and managed by the communication platform. In examples, the communication platform receives interaction data associated with an interaction of a first user with a collaborative document and identifies a second user associated with the collaborative document. Based in part on the interaction data, the communication platform causes a notification to be presented in a sidebar of user interface associated with the second user, to inform the second user of the update.

20 Claims, 18 Drawing Sheets

(56) References Cited

U.S. PATENT DOCUMENTS

2018/0287982 A1 10/2018 Draeger et al.
2021/0019846 A1* 1/2021 Kaddoura ............... G06F 9/54

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

1400

```
┌─────────────────────────────────────────────────────────────────┐
│ RECEIVE, VIA A FIRST USER INTERFACE ASSOCIATED WITH A FIRST     │
│ USER ACCOUNT OF A COMMUNICATION PLATFORM, A REQUEST TO          │
│ ASSOCIATE A DOCUMENT WITH A SIDEBAR OF THE FIRST USER INTERFACE │
│                              1402                               │
└─────────────────────────────────────────────────────────────────┘
                                │
                                ▼
┌─────────────────────────────────────────────────────────────────┐
│ IN RESPONSE TO THE REQUEST, CAUSE DISPLAY OF AN AFFORDANCE      │
│ ASSOCIATED WITH THE DOCUMENT IN THE SIDEBAR OF THE FIRST        │
│ USER INTERFACE                                                  │
│                              1404                               │
└─────────────────────────────────────────────────────────────────┘
                                │
                                ▼
┌─────────────────────────────────────────────────────────────────┐
│ RECEIVE, VIA A SECOND USER INTERFACE ASSOCIATED WITH A SECOND   │
│ USER ACCOUNT, INTERACTION DATA ASSOCIATED WITH AN INTERACTION   │
│ WITH THE DOCUMENT BY A SECOND USER ASSOCIATED WITH THE SECOND   │
│ USER ACCOUNT                                                    │
│                              1406                               │
└─────────────────────────────────────────────────────────────────┘
                                │
                                ▼
                    ╱╲
                   ╱  ╲
          INTERACTION DATA
       ASSOCIATED WITH AN OBJECT THAT IS      No
       ASSOCIATED WITH THE FIRST USER?   ──────────┐
                   1408                            │
                    ╲  ╱                           │
                     ╲╱                            │
                     │ YES                         │
                     ▼                             │
┌─────────────────────────────────────────────────┐│
│ CAUSE DISPLAY OF A NOTIFICATION ASSOCIATED WITH ││
│ THE AFFORDANCE IN THE SIDEBAR OF THE FIRST      ││
│ USER INTERFACE                                  ││
│                      1412                       ││
└─────────────────────────────────────────────────┘│
                     │                             │
                     ▼                             │
┌─────────────────────────────────────────────────┐│
│ STORE DATA ASSOCIATED WITH AN UPDATED DOCUMENT  │◄┘
│ BASED AT LEAST IN PART ON THE INTERACTION       │
│                      1410                       │
└─────────────────────────────────────────────────┘
```

FIG. 14

DOCUMENT MANAGEMENT IN A COMMUNICATION PLATFORM

TECHNICAL FIELD

Communication platforms are becoming increasingly more popular for facilitating work-related communications, such as for project collaboration within a single organization and across two or more organizations. For instance, a user can generate a virtual space for communication to discuss a particular project or portion thereof. The virtual space can include a means for transmitting written communications (e.g., communication channel, direct message instance, etc.) and/or oral communications (e.g., audio call, video call, etc.). In some examples, a virtual space may have associated therewith a collaborative document configured to enable users of the virtual space to organize and manage information. In some examples, the collaborative document can include a third-party document, with a link thereto shared via the virtual space, such as in a message transmitted via the virtual space. In such examples, the collaborative document can be difficult to discover after additional messages are transmitted via the virtual space. That is, the message with the link to the collaborative document can be buried in the virtual space, potentially requiring significant time and effort to identify the message in order to access the collaborative document. This searching can lead to a negative user experience and can reduce the overall effectiveness of the collaborative document.

In some instances, an affordance associated with the collaborative document can be pinned or otherwise associated with a particular location in the virtual space (e.g., header, footer, etc.). That is, the affordance may persist at the particular location of the virtual space, regardless of messages presented in association therewith. However, the process of searching for and identifying a particular virtual space among a plurality of virtual spaces associated with a user account, in order to access a collaborative document associated therewith, can be an onerous process for the user, and can limit discoverability and use of the collaborative document.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 14 is an example process for providing a notification of an update to a collaborative document in sidebar of a user interface, as described herein

DETAILED DESCRIPTION

Figure 1:
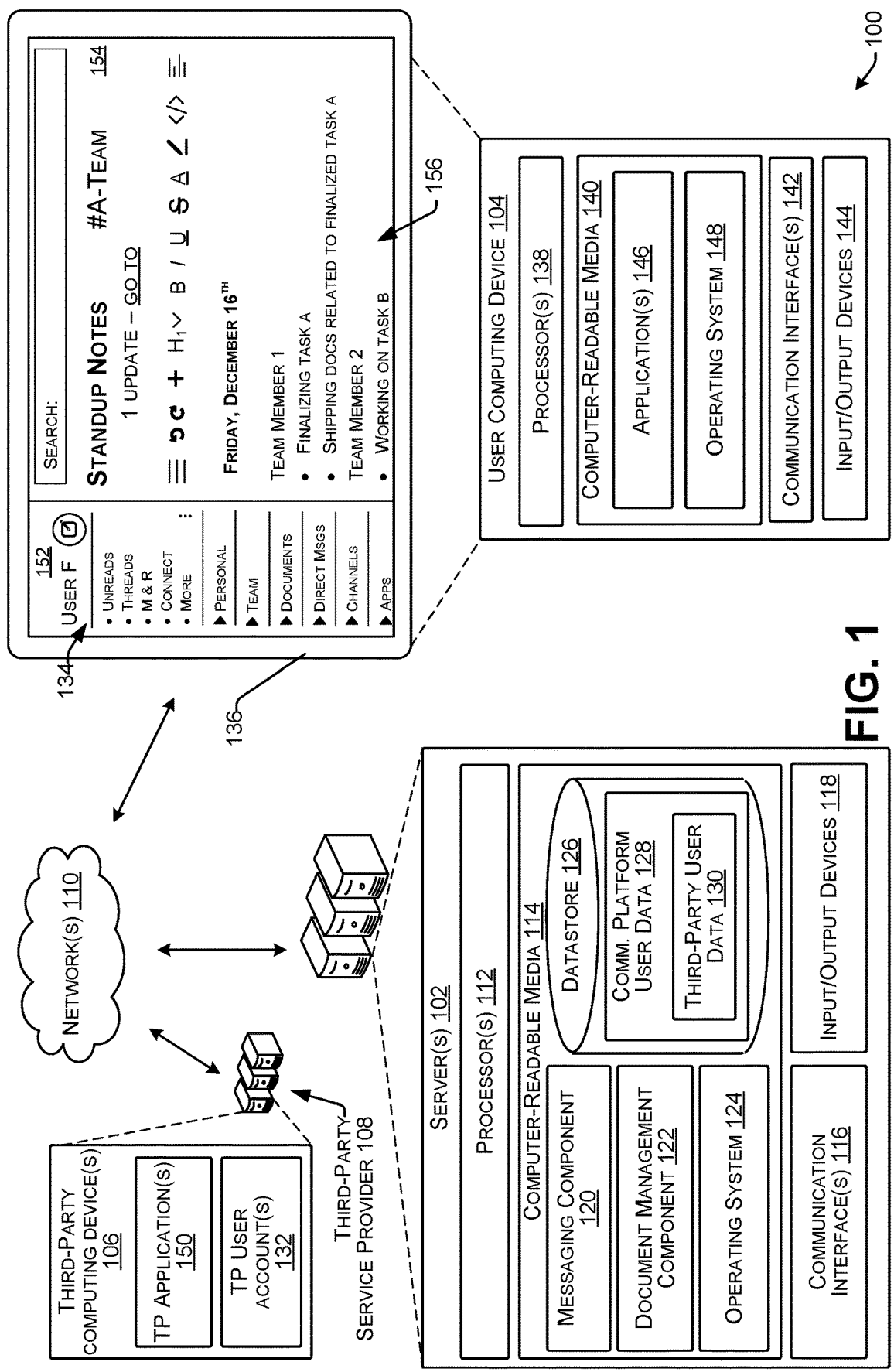
FIG. 1 illustrates an example system for performing techniques described herein.

Techniques are described herein for enhancing efficiency of access and discoverability of updates to collaborative documents within a communication platform. The communication platform can be a group-based communication platform, a channel-based messaging platform and/or any other platform for facilitating communication between and among users. In an example, a first user can interact with a collaborative document via a first user interface. Based in part on the interaction and/or interaction data associated therewith, the communication platform can identify a second user account that is associated with the collaborative document (e.g., second user associated with the second user account is a member of the collaborative document). Based on an identification of the second user account, the communication platform can cause a notification associated with the interaction to be presented in a sidebar of a second user interface associated with the second user, such as in association with an affordance (e.g., an identifier, an indicator, a selectable control, a user interface element, etc.) corresponding to the collaborative document. In at least one example, the second user can select the affordance and/or the notification to access the collaborative document, such as to efficiently access the document and view the update thereto.

As discussed above, in existing technologies, a first user can associate a collaborative document with a virtual space, such as by sharing the document or a link thereto in a message transmitted via the virtual space. However, to access the document, users of the virtual space must recall a particular virtual space via which the collaborative document was shared and, once identified, may need to search through dozens, if not hundreds of virtual spaces to find and access the particular virtual space containing the collaborative document. Then, once in the particular virtual space, a user may be required to search through a plurality of messages to identify the particular message containing the collaborative document or link thereto. This process can be time consuming and onerous for the users and can require significant computing resources in searching for and identifying both the particular virtual space and the desired collaborative document associated therewith. As such, in existing technologies, access to collaborative documents can be limited. Additionally, discoverability of updates to collaborative documents in existing technologies is limited. For example, in some existing technologies, to identify that another user has updated the collaborative document, a user may be required to access the document itself to identify the changes. In existing technologies with third-party documents, a third-party service provider configured to manage a third-party document may be configured to send an email, text, or other notification of an update to the third-party document. However, the notifications may require users to switch between the communication platform and another communication application (e.g., email, text, etc.) to discover the update, which can limit discoverability of third-party document updates.

Techniques described herein are directed to providing a dynamic and modifiable sidebar of a user interface to enable efficient access to collaborative documents and increase discoverability of updates thereto. The sidebar can include a portion of the user interface that includes lists of virtual spaces that are associated with a particular user account. For example, the sidebar can include a list of documents, workspaces, communication channels, direct messaging instances, and/or the like that are associated with a user account of a viewing user. In at least one example, the collaborative documents that can be accessible via the sidebar (or other interface as described herein) can be created within and managed by the communication platform and can be accessible by one or more users of the communication platform. In at least one example, a collaborative document can support editable text and/or objects that can be ordered, added, deleted, modified, and/or the like. An object can include, but is not limited to, text (e.g., which can be editable), a file (e.g., text, audio, video, an application, etc.), a task to be completed, a ticket to be resolved, an event (e.g., scheduled event, calendar invitation, calendar instance, etc.), a message previously transmitted via the communication platform, an image, a graphic, a link to a local object, a link to a remote object (e.g., third-party object), and/or the like. In various examples, each collaborative document can be associated with permissions defining which users of the communication platform can view and/or edit the collaborative document. For example, a first collaborative document can include permissions designating a group of two or more users as members and a second collaborative document can include permissions designating a single user as a member (e.g., personal document). In various examples, the permissions can be defined based on a means by which the collaborative document was created.

In at least one example, the communication platform can generate a collaborative document utilizing techniques such as those described in U.S. patent application Ser. No. 17/566,429, filed Dec. 30, 2021 and entitled "Communication Platform Document as a Communication Channel," the entire contents of which are incorporated herein by reference. In some examples, the collaborative document can be associated with a virtual space (e.g., workspace, communication channel, direct message instance, document, board, audio or video communication, etc.) of the communication platform. In such examples, the communication platform may associate members of the virtual space as members of the collaborative document. In some examples, the collaborative document can be associated with a single user account. That is, the communication platform can enable a user to create a personal document for organizing and managing data. For example, a user may generate a first personal document to manage a to do list and a second personal document in which to store saved items.

In various examples, the communication platform can receive a request from a user to associate one or more collaborative documents with a sidebar of a user interface associated with a user account of the user. That is, the user can cause a presentation of an affordance associated with the selected collaborative document(s) in a section (or subsection) of the sidebar. The affordance may include a user interface element that, when selected by the user, causes the collaborative document to be presented via the user interface.

In some examples, the section can be a platform-generated section, such as that generated by the communication platform. In such examples, the section can include a default section generated by the communication platform to enable access to collaborative documents and/or virtual spaces. That is, the platform-generated section can have associated therewith one or more collaborative documents and/or one or more other virtual spaces (e.g., communication channels, direct messaging instances, synchronous or asynchronous audio or video meetings, etc.). In some examples, collaborative document(s) that are associated with the other virtual space(s) can be presented proximate or otherwise in association with one another in the platform-generated section.

In some examples, the section can be a user-generated section, such as that generated and managed by the user. In such examples, the user can submit a request to generate the section prior to or concurrently with associating a document with the sidebar. For example, a user can submit a first request to generate a section for personal documents. The user can then submit a second request to associate a personal document, such as a to do list document, with the section for personal documents. In various examples, the user-generated section can be configured to include affordances associated with collaborative document(s) and/or virtual spaces. For example, a user can generate a section associated with a team and can associate a virtual space associated with the team and a collaborative document with the team section. Similar to the platform-generated section, collaborative document(s) that are associated with virtual space(s) can be presented proximate or otherwise in association with one another in the user-generated section.

In various examples, the communication platform can enable the user to modify a user-generated and/or platform-generated section. That is, the user can personalize the sidebar of the user interface and/or sections associated therewith, as desired. Non-limiting examples of modifications include renaming the section, deleting the section, relocating the section within the sidebar, relocating associated affordances within the section, adding affordances to the section, and removing affordances from the section. In at least one example, the user can add collaborative document(s) and/or virtual space(s) to a section of the sidebar utilizing a drag-and-drop operation and/or by submitting a request to pin or otherwise associate a selected document or virtual space with the section of the sidebar.

In some examples, a section of the sidebar can include a documents section, such as that configured to present affordances associated with a group of documents that are associated with a user account of the user. In such examples, the communication platform can be configured to identify one or more collaborative documents associated with the user account and to cause affordances associated with at least a portion of the collaborative documents to be presented in the documents section. In some examples, a label, title or other identifier associated with the documents section can include an affordance that, when selected by the user, causes a presentation of a document interface associated with the user account. The document interface can include one or more affordances associated with the one or more collaborative documents with which the user account is associated.

In some examples, the affordance(s) associated with the collaborative document(s) presented in the document interface can each include an affordance that, when selected by the user, causes a respective collaborative document to be presented via the user interface. In at least one example, affordance(s) associated with a portion of the collaborative document(s) that are associated with the user account can additionally be presented in association with the documents section of the sidebar, as described above. That is, a first affordance associated with a collaborative document can be presented via the document interface and a second affordance associated with the collaborative document can be presented in association with the documents section, each of the first affordance and the second affordance being selectable to cause presentation of the collaborative document via the user interface.

In at least one example, the communication platform can be configured to identify the portion of the collaborative document(s) to associate with the documents section. In some examples, the communication platform can associate a collaborative document with the documents section based on a request from the user. In some examples, the request can include a drag-and-drop operation, an instruction to pin or otherwise associate a collaborative document with the documents section of the sidebar, and/or the like. For example, the user can select or otherwise interact with an affordance of a collaborative document presented in association with a virtual space, drag or otherwise move the affordance to the documents section, and release the selection of the affordance, to associate the affordance with the documents section. In response to the drag-and-drop operation, the communication platform can cause a first affordance associated with the collaborative document to be presented in association with the virtual space and a second affordance associated with the collaborative document to be presented in association with the sidebar of the user interface. For another example, the request can include a selection of an option to pin or otherwise associate an affordance associated with a collaborative document presented via the documents interface to the sidebar. In response to the request, the communication platform can cause a first affordance associated with the collaborative document to be presented in association with the document interface and a second affordance associated with the collaborative document to be presented in association with the documents section of the sidebar. Though described as associating the second affordance with the documents section, this is not intended to be so limiting, and a drag-and-drop operation can include an association of the second affordance with any section in which a selected collaborative document or virtual space is released (or dropped).

In some examples, the communication platform can identify one or more collaborative documents to associate with the documents section based on interaction data associated with interactions by the user and/or other users with individual collaborative documents. In at least one example, the communication platform can identify the collaborative document(s) to associate with the documents section based on a recency of access by the user, a frequency of access by the user, a frequency of interaction by other users, an interaction with a document meeting or exceeding a threshold level, a selection of a collaborative document as a preferred document (e.g., document marked as favorite), an assignment of objects associated with the document to the user, and/or other interactions with the individual collaborative documents.

In various examples, the communication platform can be configured to rank collaborative documents associated with the user account, such as based on interaction data. In such examples, the communication platform can cause presentation of affordances associated with a number of highest ranked collaborative documents. In some examples, the number can include a pre-determined number (e.g., 5, 7, 10, etc.) of affordances to be presented in the documents section of the sidebar. In such examples, the affordances presented can be associated with the pre-determined number of top-ranked collaborative documents. In some examples, the communication platform can determine the number of affordances to present in (e.g., a number of collaborative documents to associate with) the documents section based on a user preference. For example, the communication platform may present a first number of documents based on a default setting (e.g., pre-determined number). The user may later submit a request to modify the number of collaborative documents associated with the documents section of the sidebar to a second number of collaborative documents. In response to the request, the communication platform can modify the sidebar of the user interface to include the second number of affordances associated with respective collaborative documents.

In some examples, the communication platform can rank the collaborative documents based on a default setting (e.g., pre-determined ranking criteria). In some examples, the ranking can be based at least in part on a user preference. For example, the user can submit a preference to view affordances associated with collaborative documents that were most recently accessed by the user. The communication platform can identify the collaborative documents most recently accessed by the user and cause presentation affordances associated therewith in the sidebar of the user interface. For another example, the user can submit a preference to view affordances associated with collaborative documents that were most frequently viewed by members of the collaborative documents (e.g., most interacted with collaborative documents). The communication platform can identify the most interacted with collaborative documents and cause presentation of affordances associated therewith in the sidebar of the user interface.

In some examples, the communication platform can be configured to provide notifications of updates to collaborative documents via the sidebar. That is, the communication platform can be configured to identify one or more updates to a collaborative document and provide an indication thereof in association with an affordance of the collaborative document in the sidebar. In an example, the communication platform can receive interaction data associated with an interaction by a first user with a collaborative document. The communication platform can identify a second user account of a second user that is associated with (e.g., is a member of) the collaborative document. Based on an identification of the second user as a member, the communication platform can cause a notification of the update to be presented in the sidebar of the user interface associated with the second user account. The second user may then select the notification and/or the affordance associated with the collaborative document to access the updated collaborative document. In response to receiving the indication of selection of the notification and/or the affordance associated with the collaborative document, the communication platform can cause presentation of the collaborative document via the user interface. In some examples, the communication platform can cause an updated section of the collaborative document to be presented via the user interface.

In some examples, the notification can be presented as a modification to text and/or an image associated with the affordance, such as bolding text and/or lines associated with an image. In some examples, the notification can include a separate indicator presented in association with the affordance. The separate indicator can include a shape, symbol, letter, number, and/or other indicator to provide an indication of the update to a particular collaborative document. In some examples, the separate indicator can include a number that represents a number of update instances (e.g., number of users who have updated or otherwise interacted with the collaborative document) since the user last viewed the collaborative document.

In some examples, the update to the collaborative document can include a comment or other message posted in association with a messaging interface or thread of the collaborative document. In such examples, the notification can be presented as an indication of an update to a thread of one or more threads, such as that represented by a "thread" affordance in a sidebar of the user interface. In some examples, the comment or other message posted in association with the messaging interface or thread of the collaborative document can additionally be presented in a messaging feed or thread of an associated virtual space. That is, a comment posted in a collaborative document associated with a virtual space can additionally be published in association with a messaging feed (e.g., main feed, a thread associated with a root message in the main feed, etc.) of the virtual space.

Additionally or alternatively, the notification can include a pop-up or overlay notification. In some examples, the notification can be persistent, and can remain in the sidebar and/or other portion of the user interface until acknowledged by the user. In some examples, the notification can be ephemeral, such that it is presented for a period of time (e.g., 5 minutes, 2 hours, etc.). In such examples, the period of time may be determined by the communication platform and/or the user, such as based on a user preference. In some examples, the notification can include information associated with the update, such as an identifier associated with a collaborative document and/or section thereof that was updated, an object associated with the collaborative document that was modified (e.g., task assigned, message added, workflow updated, etc.), a virtual space associated with the collaborative document, a user identifier associated with the update, a time associated with the update, and/or other information associated with the update.

In some examples, the communication platform can additionally be configured to cause presentation of affordances of objects associated with a collaborative document in the sidebar, such as in association with an affordance of the collaborative document. In at least one example, the communication platform can identify one or more objects associated with the user (e.g., assigned to or otherwise associated with the user account) and cause presentation of an affordance associated with the object(s) in the sidebar. In at least one example, the presentation of the object in the sidebar can include a reminder to address the object. For example, the communication platform can identify a task assigned to a user (e.g., the user account). In response to an identification of the task, the communication platform can cause an affordance associated with the task to be presented in association with the respective collaborative document in the sidebar, such as to remind the user to complete the task. In some examples, the affordance associated with the object in the sidebar can be configured such that, when selected, it causes at least one of the object or the associated collaborative document to be presented via the user interface.

In some examples, the communication platform can be configured to identify a trigger associated with causing presentation of an affordance associated with an object. That is, the communication platform can identify the object to associate with the sidebar of the user interface based on a detection of the trigger. Non-limiting examples of the trigger can include task and/or ticket assignment, completion of a step in a workflow, a current time being within a threshold time of a time associated with a task and/or with the object, and a current day/date being associated with the task and/or object. For example, the communication platform can identify a task assigned to a user that includes a particular due date and/or time. Based on a determination that a current time is within a threshold period (e.g., 1 hour, 5 hours, 1 day, etc.) of the particular due date and/or time, the communication platform can cause presentation of an affordance associated with the task in the sidebar of the user interface. In some examples, in response to determining that the user has not initiated and/or completed the task (e.g., has not selected the affordance, has not marked the task as complete, etc.), the communication platform can be configured to modify the affordance associated with the object in the sidebar, such as to emphasize the proximity to the due date and/or time. For example, in response to determining that a current time is a first period of time from the due date and/or time (e.g., 6 hours, 8 hours, 1 day, etc.), the communication platform can represent the affordance in bold and in response to determining that a later time is a second period of time from the due date and/or time (e.g., 30 minutes, 1 hour, 2 hours, etc.), the communication platform can highlight the bolded affordance.

In some examples, the trigger can be determined based on user preferences. That is, the user can establish one or more triggers with regard to particular collaborative documents and/or types of collaborative documents (e.g., personal document, shared document, etc.). For example, a user can maintain a personal document that includes a to do list, in which the user can self-assign tasks to complete. The user can establish a user preference for the communication platform to provide an indication of each task in the to do list that is associated with a current day in the sidebar, such as to provide a timely reminder to complete the task(s) without the user having to access the to do list to identify task(s) to complete that day. In some examples, the user preference can include a preference to associate reminders with objects that are marked urgent, important, and/or are time sensitive (e.g., have a due date, due date within a threshold period of time of a current time, etc.). In some examples, the user preference may include a preference to display affordances associated with urgent, important and/or time sensitive objects differently than other objects presented in the sidebar. In such examples, the communication platform can cause the urgent, important, and/or time sensitive objects to stand out from affordances associated with other objects, documents, and/or virtual spaces in the sidebar. For example, affordances associated with urgent, important, and/or time sensitive objects can be presented in highlighted text, and affordances associated with other objects can be presented in regular text.

In various examples, the communication platform can be configured to identify a potential task to assign to the user based on one or more messages transmitted via a virtual space. In some examples, the message(s) can be transmitted via a collaborative document, such as in a chat window, thread, or other messaging functionality enabled with respect to the collaborative document. In some examples, the message(s) can be transmitted via a virtual space. In at least one example, the communication platform can be configured to identify content in the message(s), a context of an associated conversation (e.g., conversation between two or more users reflected in the message(s)), and identify the potential task to assign to the user based on the content and/or context. In some examples, the communication platform may identify the content and/or context utilizing natural language processing, machine learning, and/or other techniques to identify meaning and/or sentiment in the messages. In some examples, in response to identifying the potential task, the communication platform can be configured to associate the potential task with a to do list or other collaborative document associated with the user (e.g., add the task to the to do list). In some examples, the communication platform can automatically associate the task with the to do list or other collaborative document, such as based on the content and/or context of the message(s). In some examples, the communication platform can associate the task with the to do list or other collaborative document in response to receiving input from the user to make the association.

In at least one example, in response to identifying the potential task, the communication platform can be configured to cause presentation of a query to the user, to determine whether to add the potential task to a collaborative document. In some examples, the query may be presented as an automated message presented to the user in association with the message(s). For example, the user may have a conversation with another user about a particular task in a communication channel. The communication platform can identify the particular task as a potential task and cause an automated message to be presented via the communication channel (e.g., presented as if transmitted via the communication channel), the automated message including selectable controls to enable the user to cause the potential task to be added to a to do list or other collaborative document (e.g., selecting a "yes" or "add" option) or not (e.g., selecting a "no" or "not now" option). In some examples, the query may be presented as a pop-up or overlay notification. In such examples, the notification can include selectable controls to enable the user to add the potential task to a to do list or other collaborative document. In some examples, the query can additionally include an option for the user to input an identifier associated with another user, such as to assign the task to the other user.

In response to receiving an indication of selection of a selectable control associated with adding the potential task to a to do list or other collaborative document (e.g., selecting "yes" or otherwise associating the potential task with the to do list or other collaborative document), the communication platform can associate the potential task with the to do list or the other collaborative document. In some examples, the potential task can be presented as a task for the user to perform. Additionally, in some examples, an affordance associated with the task can be presented in the sidebar of the user interface, such as in association with the to do list or other collaborative document. In at least one example, in response to determining that a current time is associated with or is within a threshold time period of a time associated with the task, the communication platform can cause the affordance associated with the task to be presented and/or emphasized (e.g., bold, highlight, enlarged, etc.) in the sidebar of the user interface.

From the user experience perspective, techniques described herein greatly enhance the utility and functionality of a collaborative document within the communication platform. As discussed above, conventional techniques may require the user to search for a particular virtual space among a plurality of virtual spaces that is associated with a collaborative document and, in some cases, search through a plurality of messages transmitted via the virtual space to identify a message in which the collaborative document or a link thereto was shared. As such, the burden on the user to find a collaborative document within the communication platform can be onerous and can result in significant frustration to the user and decreased effectiveness of the collaborative document as a virtual space for collaboration. Unlike the conventional techniques, the techniques described herein provide the user with quick and easy access to collaborative documents that are associated with a user account of the user. For example, the techniques described herein provide a documents interface that can enable efficient access to collaborative documents that are associated with the user account. For another example, the techniques described herein provide affordances associated with collaborative documents and/or objects associated therewith in a sidebar of a user interface associated with the user account. At least because the techniques described herein provide means by which the user can quickly and efficiently access collaborative documents that are associated with the user account, the techniques described herein can greatly enhance the utility and user experience associated with collaborative documents.

Additionally, as described above, conventional techniques can require the user to search through a plurality of virtual spaces to identify a virtual space associated with a collaborative document and in some cases, once the particular virtual space is identified, search through a plurality of messages to identify a message in which the collaborative document or a link associated therewith was shared. Such searching can require a significant amount of computing resources to identify a particular collaborative document. Unlike these conventional techniques, the techniques described herein provide a quick and efficient means to access collaborative documents associated with a user account. As such, the techniques described herein can improve the functioning of a user computing device.

Additionally, the techniques described herein can increase an amount of network bandwidth available to the user computing device and other devices on a network. For example, while conducting a search for a particular virtual space and/or collaborative document associated therewith, a server computing device may continually send additional data (e.g., packets of data) to the user computing device to present via the user interface. The additional data can include previously unpresented identifiers associated with virtual spaces and/or message data associated with messages transmitted in association with a virtual space. By negating the need to search for a virtual space and/or message associated with a collaborative document, the techniques described herein can reduce a total amount of network bandwidth required to identify a particular collaborative document, such as by reducing an amount of data transmitted from a server computing device to the user computing device to identify the collaborative document. As such, the techniques described herein increase the amount of network bandwidth available to the user computing device and/or other devices on the network.

Additional details and examples are described below with reference to FIGS. 1-15.

FIG. 1 illustrates an example system 100 for performing techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, which can be associated with common access credentials, domains, or the like. In some examples, the communication platform can be a hub, offering a secure and private virtual space to enable users to chat, meet, call, collaborate, transfer files or other data, or otherwise communicate between or among each other. In various examples, each group can be associated with a workspace, enabling users associated with the group to chat, meet, call, collaborate, transfer files or other data, or otherwise communicate between or among each other in a secure and private virtual space. In some examples, members of a group, and thus a workspace, can be associated with a same organization. In some examples, members of a group, and thus a workspace, can be associated with different organizations (e.g., entities with different organization identifiers).

In at least one example, the example system 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 and/or one or more third-party computing devices 106 associated with a third-party service provider 108 (e.g., third-party resource) via one or more network(s) 110. That is, the server(s) 102, the user computing device 104, and the third-party computing device(s) 106 can transmit, receive, and/or store data (e.g., content, information, or the like) using the network(s) 110, as described herein. The user computing device 104 and the third-party computing device(s) 106 can be any suitable type of computing device, e.g., portable, semi-portable, semi-stationary, or stationary. Some examples of the third-party computing device(s) 106 can include a server computing device, such as that described above with regard to the server(s) 102, a desktop computing device, a terminal computing device, or the like.

Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example system 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 110 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 110 are well known and are not discussed herein in detail.

In at least one example, the server(s) 102 can include one or more processors 112, computer-readable media 114, one or more communication interfaces 116, and input/output devices 118. Though not illustrated in FIG. 1, the third-party computing device(s) 106 can additionally include one or more processors, such as processor(s) 112, computer-readable media, such as computer-readable media 114, communication interface(s), such as communication interface(s) 116, input/output devices, such as input/output devices 118.

In at least one example, each processor of the processor(s) 112 can be a single processing unit or multiple processing units and can include single or multiple computing units or multiple processing cores. The processor(s) 112 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 112 can be one or more hardware processors and/or logic circuits of any suitable type specifically programmed or configured to execute the algorithms and processes described herein. The processor(s) 112 can be configured to fetch and execute computer-readable instructions stored in the computer-readable media, which can program the processor(s) to perform the functions described herein.

The computer-readable media 114 can include volatile and nonvolatile memory and/or removable and non-removable media implemented in any type of technology for storage of data, such as computer-readable instructions, data structures, program modules, or other data. Such computer-readable media 114 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 114 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 114 can be used to store any number of functional components that are executable by the processor(s) 112. In many implementations, these functional components comprise instructions or programs that are executable by the processor(s) 112 and that, when executed, specifically configure the processor(s) 112 to perform the actions attributed above to the server(s) 102. Functional components stored in the computer-readable media can optionally include a messaging component 120, a document management component 122, an operating system 124, and a datastore 126.

In at least one example, the messaging component 120 can process messages between users. That is, in at least one example, the messaging component 120 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, as described herein. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform. In at least one example, the messaging component 120 can establish a communication route between and among various user computing devices, allowing the user computing devices to communicate and share data between and among each other. In at least one example, the messaging component 120 can manage such communications and/or sharing of data. In some examples, data associated with a virtual space, such a collaborative document, can be presented via a user interface. In addition, metadata associated with each message transmitted via the virtual space, such as a time stamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 120 can receive a message transmitted in association with a collaborative document. In various examples, the messaging component can identify one or more users associated with the collaborative document and can cause a rendering of the message in association with instances of the collaborative document on respective user computing devices 104. In various examples, the messaging component 120 can identify the message as an update to the collaborative document and, based on the identified update, can cause a notification associated with the update to be presented in association with a sidebar of user interface associated with one or more of the user(s) associated with the collaborative document. For example, the messaging component 120 can receive, from a first user account, a message transmitted in association with a collaborative document. In response to receiving the message (e.g., interaction data associated with an interaction of a first user with the collaborative document), the messaging component 120 can identify a second user associated with the collaborative document (e.g., another user that is a member of the collaborative document). In some examples, the messaging component 120 can cause a notification of an update to the collaborative document to be presented via a sidebar of a user interface associated with a second user account of the second user. In some examples, the messaging component 120 can cause the notification to be presented in response to a determination that the sidebar of the user interface associated with the second user account includes an affordance associated with the collaborative document. In such examples, the notification can be presented in association with the affordance associated with the collaborative document.

In various examples, the messaging component 120 can be configured to identify a mention or tag associated with the message transmitted in association with the collaborative document. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 120 can cause a notification to be presented on a user interface associated with the user identifier, such as in association with an affordance associated with the collaborative document in a sidebar 134 of a user interface 136 associated with the particular user and/or in a virtual space associated with mentions and reactions. That is, the messaging component 120 can be configured to alert a particular user that they were mentioned in a collaborative document.

In at least one example, the document management component 122 can be configured to generate one or more collaborative documents associated with a user account of a user. In some examples, the document management component 122 can generate a collaborative document of the collaborative document(s) in response to receiving a request to generate a new virtual space. In such examples, the collaborative document can be associated with the virtual space. In some examples, the document management component 122 can generate a collaborative document of the collaborative document(s) in response to receiving a request from a user to generate a new collaborative document. In some examples, the request can be received in association with a virtual space. In such examples, the document management component 122 can associate the collaborative document with the virtual space. For example, the collaborative document can be created in association with a communication channel, an audio-based synchronous or asynchronous meeting, a direct messaging instance, and/or the like. In some examples, the request can be received independent of a virtual space. In such examples, the document management component 122 can generate a collaborative document of which the user is a sole user. Such collaborative documents may be referred to as "personal documents."

In at least one example, the collaborative document(s) can support editable text and/or objects that can be ordered, added, deleted, modified and/or the like. An object can include, but is not limited to, text (e.g., which can be editable), a file (e.g., text, audio, video, an application, etc.), a task to be completed, a ticket to be resolved, an event (e.g., scheduled event, calendar invitation, calendar instance, etc.), a message previously transmitted via the communication platform, an image, a graphic, a link to a local object, a link to a remote object (e.g., third-party object), and/or the like. The remote or third-party object can include an object that is managed by or otherwise stored in association with a third-party service provider 108. In some examples, a user associated with a third-party user account 132 can provide credentials, tokens, or other information necessary for the document management component 122 to access data associated with the object(s). That is, the user(s) associated with a collaborative document may provide the document management component 122 information necessary to access third-party user account(s) associated with objects included in a collaborative document.

In at least one example, the document management component 122 can be configured to manage objects and process data added to a collaborative document. That is, the document management component 122 can receive interaction data associated with an interaction by a first user associated with a collaborative document, and identify an update thereto based on the interaction data. In some examples, the document management component 122 can identify one or more other user accounts that are associated with the collaborative document (e.g., have permissions to access the collaborative document). In such examples, the document management component can access permission data defining which users of the communication platform can view and/or edit the collaborative document, such as that stored in the datastore 126.

In response to identifying a second user account that is associated with the collaborative document, the document management component 122 can be configured to cause a notification associated with the update to be presented in a sidebar 134 of a user interface 136 associated with the second user account. That is, the document management component 122 can identify an update to a collaborative document performed by a first user and provide an indication thereof (e.g., the notification) to a second user associated with the second user account in a sidebar 134 of the user interface 136, such as to enhance discoverability of the update to the collaborative document.

The sidebar 134 can include a portion of the user interface 136 that includes lists of virtual spaces that are associated with a particular user account. For example, the sidebar 134 can include a list of documents, workspaces, communication channels, direct messaging instances, and/or the like that are associated with a user account of a viewing user. In at least one example, the document management component 122 can cause presentation of the notification of the update in the sidebar 134 based on a determination that the sidebar 134 of the user interface 136 associated with the second user account includes an affordance associated with a collaborative document. In some examples, the document management component 122 can cause presentation of the affordance in the sidebar 134 in response to receiving a request from the second user to associate the collaborative document with a sub-section of the sidebar 134. The sub-section of the sidebar 134 can include affordances associated with one or more types of virtual spaces. For example, a first sub-section of the sidebar 134 can include affordances associated with a single type of virtual space (e.g., communication channels, documents, etc.), and a second sub-section of the sidebar 134 can include affordances associated with different types of virtual spaces (e.g., communication channels and associated documents, different virtual spaces associated with mentions and reactions, etc.).

In some examples, the sub-section of the sidebar 134 can be a platform-generated sub-section, such as that generated by the server(s) 102. In such examples, the sub-section can include a default sub-section, such as one configured to enable access to collaborative documents and/or virtual spaces associated with a particular user account. That is, the platform-generated sub-section can have associated therewith one or more collaborative documents and/or one or more virtual spaces. In some examples, collaborative document(s) that are associated with the virtual space(s) can be presented proximate or otherwise in association with one another in the platform-generated sub-section.

In some examples, the sub-section can be a user-generated sub-section, such as that generated and managed by the user. In such examples, the user can submit a request to generate the sub-section prior to or concurrently with associating a collaborative document with the sidebar 134. For example, a user can submit a first request to generate a sub-section for personal documents. The user can then submit a second request to associate a personal document, such as a to do list, with the sub-section for personal documents. In various examples, the user-generated sub-section can be configured to include affordances associated with collaborative document(s) and/or virtual spaces. For example, a user can generate a sub-section associated with a team and can associate a virtual space and a collaborative document with the team sub-section. Similar to the platform-generated sub-section, collaborative document(s) that are associated with a virtual space can be presented proximate or otherwise in association with one another in the user-generated sub-section.

In various examples, the user-generated and/or platform-generated sub-sections can be modifiable by a user. That is, the user can personalize the sidebar 134 of the user interface 136 and/or sub-sections associated therewith, as desired. Non-limiting examples of modifications include renaming a sub-section, deleting the sub-section, relocating the sub-section within the sidebar 134, relocating associated affordances within the sub-section, adding affordances to the sub-section, and removing affordances from the sub-section. In at least one example, the user can add collaborative document(s) and/or virtual space(s) to a sub-section of the sidebar 134 utilizing a drag-and-drop operation and/or by submitting a request to pin or otherwise associate a selected collaborative document or virtual space with the sub-section of the sidebar 134. In some examples, the user can pin or otherwise associate a particular collaborative document to the sidebar 134 by mentioning the particular collaborative document (e.g., @document, *document, etc.) in another virtual space (e.g., an associated virtual space, another collaborative document, etc.). In some example, the communication platform can identify the mention of the particular collaborative document in the other virtual space as a trigger to associate the particular collaborative document with a documents sub-section of the sidebar 134.

In at least one example, a sub-section of the sidebar 134 can include the documents sub-section, such as that configured to present affordances associated with a group of documents that are associated with a user account of the user. In such examples, the document management component 122 can be configured to identify one or more collaborative documents associated with the user account and to cause affordances associated with at least a portion of the collaborative document(s) to be presented in the documents sub-section. In some examples, a label, title or other identifier associated with the documents sub-section can include an affordance that, when selected by the user, causes a presentation of a document interface associated with the user account. The document interface can include affordances associated with the one or more collaborative documents with which the user account is associated. In at least one example, the document interface can include a first list of personal documents of which the user is a sole member, and a second list of collaborative documents that are shared with other users (e.g., user is one of at least two members of the collaborative document). Though this is not intended to be so limiting and the document interface can include a greater or fewer number of lists of collaborative documents.

In at least one example, the affordances associated with the collaborative document(s) presented in the document interface can each include an affordance that, when selected by the user, causes a respective collaborative document to be presented via the user interface 136. Additionally, affordances associated with the identified portion of the collaborative document(s) that are associated with the documents sub-section can be presented in association therewith in the sidebar 134. That is, a first affordance associated with a collaborative document can be presented via the document interface and a second affordance associated with the collaborative document can be presented in association with the documents sub-section, each of the first affordance and the second affordance being selectable to cause presentation of the collaborative document via the user interface 136.

In at least one example, the document management component 122 can be configured to identify the portion of the collaborative document(s) to associate with the documents sub-section. In some examples, the document management component 122 can associate a collaborative document with the documents sub-section based on a request from the user. In some examples, the request can include a drag-and-drop operation, an instruction to pin or otherwise associate a collaborative document with the documents sub-section of the sidebar 134, and/or the like. For example, the user may select an affordance of a collaborative document presented in association with a virtual space, drag or otherwise move the affordance to the documents sub-section, and release the selection of the affordance, to associate the affordance with the documents sub-section. In response to the drag-and-drop operation, the document management component 122 may cause a first affordance associated with the collaborative document to be presented in association with the virtual space and a second affordance associated with the collaborative document to be presented in association with the sidebar 134 of the user interface 136. For another example, the request may include a selection of an option to pin or otherwise associate an affordance associated with a collaborative document presented via the documents interface to the sidebar 134. In response to the request, the document management component 122 may cause a first affordance associated with the collaborative document to be presented in association with the document interface and a second affordance associated with the collaborative document to be presented in association with the documents sub-section of the sidebar 134. For yet another example, the request may include a mention or tag (e.g., @document, *document, !document, etc.) of a collaborative document in another virtual space (e.g., an associated virtual space, another collaborative document, etc.). In response to the mention or tag, the document management component 122 may cause an affordance associated with the collaborative document to be presented in association with the sidebar 134 of the user interface 136. Though described as associating the second affordance with the documents sub-section, this is not intended to be so limiting, and a drag-and-drop operation can include an association of the second affordance with any sub-section in which a selected collaborative document or virtual space is released (or dropped). That is, one or more sub-sections of the sidebar 134 can be personalized by a user to include affordances associated with selected virtual spaces and/or collaborative documents, such as for efficient access thereto via the sidebar 134.

In some examples, the document management component 122 can identify one or more collaborative documents to associate with the documents sub-section based on one or more criteria associated with interactions by the user and/or other users with individual collaborative documents. Non-limiting examples of the one or more criteria include a recency of access by the user, a frequency of access by the user, a frequency of interaction by other users, a selection of a collaborative document as a preferred document (e.g., document marked as favorite), an assignment of objects associated with the document to the user, and/or other interactions with the individual collaborative documents.

In various examples, the document management component 122 can be configured to rank collaborative documents associated with the user account, such as based on the one or more criteria. In such examples, the document management component 122 can cause presentation of affordances associated with the portion of the collaborative documents that are ranked the highest. In some examples, the document management component 122 can rank the collaborative documents based on a default setting (e.g., pre-determined criteria). For example, the document management component 122 can have stored a pre-determined criterion to rank the collaborative documents based on a frequency of interaction therewith by members. The document management component 122 can rank the collaborative documents associated with a user account based on the pre-determined criterion. In some examples, the document management component 122 can rank the collaborative documents based at least in part on a user preference. For example, the user can submit a preference to view affordances associated with collaborative documents that were most recently accessed by the user. Based on the user preference, the document management component 122 can identify the collaborative documents most recently accessed by the user and cause presentation affordances associated therewith in the sidebar 134 of the user interface 136. For another example, the user can submit a preference to view affordances associated with collaborative documents that were most frequently viewed by members of the collaborative documents (e.g., most interacted with collaborative documents). The document management component 122 can identify the most interacted with collaborative documents and cause presentation of affordances associated therewith in the sidebar 134 of the user interface 136.

In some examples, the document management component 122 can be configured to cause presentation of a pre-determined number (e.g., 5, 7, 10, etc.) of affordances (e.g., affordances associated with a pre-determined number of collaborative documents) in the documents sub-section of the sidebar 134. In such examples, the affordances presented can be associated with the predetermined number of top-ranked collaborative documents. In some examples, the communication platform can determine the number of affordances to present in (e.g., a number of collaborative documents to associate with) the documents sub-section based on a user preference. For example, the document management component 122 may present a first number of documents based on a default setting (e.g., pre-determined number). The user may later submit a request to modify the number of collaborative documents associated with the documents sub-section of the sidebar 134 to a second number of collaborative documents. In response to the request, the document management component 122 can modify the sidebar 134 of the user interface to include the second number of affordances associated with respective collaborative documents.

In at least one example, the document management component 122 can cause a notification of an update to a collaborative document in the sidebar 134, based on a determination that an affordance associated with the collaborative document is associated with the sidebar 134 of the user interface 136. That is, the document management component 122 can determine that the affordance is presented in the sidebar 134 of the user interface 136 associated with the user account and based on that determination, can cause the notification to be presented in association therewith. The notification can include a modification to text and/or an image associated with the affordance, such as bolding text and/or lines associated with an image. In some examples, the notification can include a separate indicator presented in association with the affordance. The separate indicator can include a shape, symbol, letter, number, and/or other indicator to provide an indication of the update to a particular collaborative document. In some examples, the separate indicator can include a number that represents a number of update instances (e.g., number of users who have updated the collaborative document) since the user last viewed the collaborative document. For example, the document management component 122 determines that two other members of the collaborative document have interacted with the collaborative document since the user last viewed the collaborative document. Based on the determination that two updates have occurred (e.g., updates by two other members), the document management component 122 can cause a separate indicator with a "2" to be presented in association with the affordance of the collaborative document.

Additionally or alternatively, the notification can include a pop-up or overlay notification. In some examples, the notification can be persistent, and can remain in the sidebar 134 and/or other portion of the user interface until acknowledged by the user (e.g., clicked on, collaborative document accessed, etc.). In some examples, the notification can be ephemeral or otherwise transient, such that it is presented for a period of time (e.g., 5 minutes, 2 hours, etc.). In such examples, the period of time may be determined by the document management component 122 and/or the user, such as based on a user preference. In some examples, the notification can include information associated with the update, such as an identifier associated with a collaborative document and/or section thereof that was updated, an object associated with the collaborative document that was modified (e.g., task assigned, message added, workflow updated, etc.), a virtual space associated with the collaborative document, a user identifier associated with the update, a time associated with the update, and/or other information associated with the update.

In some examples, a single notification can include information about one or more updates, such as updates that have occurred since the user last accessed the collaborative document. In some examples, the document management component 122 can determine to cause presentation of information associated with a threshold number of updates (e.g., 2, 5, 7, etc.). In some examples, the document management component 122 can be configured to rank the updates based on one or more update factors, and cause presentation of the threshold number of highest ranked updates. The update factors can include the most recent updates, updates with the most amount of data modified, the type of updates (e.g., adding/deleting text or content, changing formatting, spell checking or other editing, etc.), updates that include a mention or tag of the user, updates made by another user with whom the user has a particular relationship (e.g., family, friend, co-worker, supervisor, manager, etc.), and/or other factors. In various examples, each update in a notification can be selectable such that, when selected by the user, can cause the collaborative document to be presented at a location in the document associated with the selected update.

In various examples, the document management component 122 can additionally be configured to cause presentation of affordances of objects associated with a collaborative document in the sidebar 134 of the user interface 136, such as in association with an affordance of the collaborative document. In at least one example, the document management component 122 can identify one or more objects associated with the user (e.g., assigned to or otherwise associated with the user account) and cause presentation of an affordance associated with the object(s) in the sidebar 134. In at least one example, the presentation of the object in the sidebar 134 can include a reminder to address the object (e.g., perform a task, complete a ticket, view a message, etc.). For example, the document management component 122 can identify a task assigned to the user (e.g., the user account). In response to an identification of the task, the document management component 122 can cause an affordance associated with the task to be presented in association with the respective collaborative document in the sidebar 134, such as to remind the user to complete the task. In some examples, the affordance associated with the object in the sidebar 134 can be configured such that, when selected, it causes at least one of the object or the associated collaborative document to be presented via the user interface.

In some examples, the document management component 122 can be configured to identify a trigger associated with causing presentation, via the sidebar 134, of an affordance associated with an object. That is, the communication platform can identify the object to associate with the sidebar 134 of the user interface 136 based on a detection of the trigger. Non-limiting examples of the trigger can include task and/or ticket assignment, completion of a step in a workflow, a current time being within a threshold time of a time associated with a task and/or with the object, and a current day/date being associated with the task and/or object. For example, the document management component 122 can identify a task assigned to a user that includes a particular due date and/or time. Based on a determination that a current time is within a threshold period (e.g., 1 hour, 5 hours, 1 day, etc.) of the particular due date and/or time, the document management component 122 can cause presentation of an affordance associated with the task in the sidebar of the user interface. In some examples, in response to determining that the user has not initiated and/or completed the task (e.g., has not selected the affordance, has not marked the task as complete, etc.), the document management component 122 can be configured to modify the affordance associated with the object in the sidebar, such as to emphasize the proximity to the due date and/or time. For example, in response to determining that a current time is a first period of time from the due date and/or time (e.g., 6 hours, 8 hours, 1 day, etc.), the document management component 122 can represent the affordance in bold and in response to determining that a later time is a second period of time from the due date and/or time (e.g., 30 minutes, 1 hour, 2 hours, etc.), the document management component 122 can highlight the bolded affordance.

In some examples, the trigger can be determined based on user preferences. That is, the user can establish one or more triggers with regard to particular collaborative documents and/or types of collaborative documents (e.g., personal document, shared document, etc.). For example, a user can maintain a personal document that includes a to do list, in which the user can self-assign tasks to complete. The user can establish a user preference for the document management component 122 to provide an indication of each task in the to do list that is associated with a current day in the sidebar, such as to provide a timely reminder to complete the task(s) without the user having to access the to do list to identify task(s) to complete that day. In some examples, the user preference can include a preference to associate reminders with objects that are marked urgent, important, and/or are time sensitive (e.g., have a due date, due date within a threshold period of time of a current time, etc.). In some examples, the user preference may include a preference to display affordances associated with urgent, important and/or time sensitive objects differently than other objects presented in the sidebar. In such examples, the document management component 122 can cause the urgent, important, and/or time sensitive objects to stand out from affordances associated with other objects, documents, and/or virtual spaces in the sidebar 134. For example, affordances associated with urgent, important, and/or time sensitive objects can be presented in highlighted text, and affordances associated with other objects can be presented in regular, non-bolded text.

In various examples, the document management component 122 can be configured to identify a potential task to assign to the user based on one or more messages transmitted via a virtual space. In some examples, the message(s) can be transmitted via a collaborative document, such as in a chat window, thread, or other messaging functionality enabled with respect to the collaborative document. In some examples, the message(s) can be transmitted via a virtual space. In at least one example, the document management component 122 can be configured to identify content in the message(s), a context of an associated conversation (e.g., conversation between two or more users reflected in the message(s)), and identify the potential task to assign to the user based on the content and/or context. In some examples, the document management component 122 can identify the content and/or context utilizing natural language processing, machine learning, and/or other techniques to identify meaning and/or sentiment in the message(s). In some examples, in response to identifying the potential task, the communication platform can be configured to associate the potential task with a to do list or other collaborative document associated with the user (e.g., add the task to the to do list). In some examples, the document management component 122 can automatically associate the task with the to do list or other collaborative document, such as based on the content and/or context of the message(s). For example, based on a determination that the content and/or context of the message(s) include a confirmation that a particular user is accepting a task or that the task has been assigned to a particular user, the document management component 122 can automatically associate the task with the to do list or other collaborative document of the user. In some examples, the document management component 122 can associate the task with the to do list or other collaborative document in response to receiving input from the user to make the association.

In at least one example, in response to identifying the potential task, the document management component 122 can be configured to cause presentation of a query or other message to the user, to determine whether to add the potential task to a collaborative document. In some examples, the query may be presented as an automated message presented to the user in association with the message(s). For example, the user may have a conversation with another user about a particular task in a communication channel. The document management component 122 can identify the particular task as a potential task and cause the messaging component 120 to present an automated message via the communication channel (e.g., presented as if transmitted via the communication channel) including a query as to whether the user would like the task to be assigned to the to do list or other collaborative document. In some examples, the automated message can include selectable controls to enable the user to cause the potential task to be added to a to do list or other collaborative document (e.g., selecting a "yes" or "add" option) or not (e.g., selecting a "no" or "not now" option). In some examples, the query may be presented as a pop-up or overlay notification. In such examples, the notification can include selectable controls to enable the user to add the potential task to a to do list or other collaborative document. In some examples, the query can additionally include an option for the user to input an identifier associated with another user, such as to assign the task to the other user.

In response to receiving an indication of selection of a selectable control associated with adding the potential task to a to do list or other collaborative document (e.g., selecting "yes" or otherwise associating the potential task with the to do list or other collaborative document), the document management component 122 can associate the potential task with the to do list or the other collaborative document. In some examples, the potential task can be presented as a task for the user to perform. Additionally, in some examples, an affordance associated with the task can be presented in the sidebar of the user interface, such as in association with the to do list or other collaborative document. In at least one example, in response to determining that a current time is associated with or is within a threshold time period of a time associated with the task, the communication platform can cause the affordance associated with the task to be presented and/or emphasized (e.g., bold, highlight, enlarged, etc.) in the sidebar of the user interface.

In at least one example, the document management component 122 can update the sidebar 134 based on updates to collaborative documents, task or other object assignments, due dates and/or times associated with task or other object assignments, and the like in real-time or near-real time, such as to provide the user with an up-to-date representation of statuses associated with respective collaborative documents. In various examples, the document management component 122 and/or the messaging component 120 can store updated data input in association with the collaborative document in the datastore 126. In at least one example, the datastore 126 can be configured to store data that is accessible, downloadable, manageable, and updatable. In some examples, the datastore 126 can be integrated with the server(s) 102, as shown in FIG. 1. In other examples, the datastore 126 can be located remotely from the server(s) 102 and can be accessible to the server(s) 102 and/or user computing device(s), such as the user computing device 104. Additional or alternative data can be stored in the datastore 126 and/or in one or more other data stores.

In some examples, the datastore 126 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, collaborative documents, or the like.

In some examples, organization data stored in the datastore 126 can include discrete shards for each individual organization, including data related to a particular organization identification. For example, a database shard can store electronic communication data associated with members of a particular organization, which enables members of that particular organization to communicate and exchange data with other members of the same organization in real-time or near-real time. In this example, the organization itself can be the owner of the database shard and has control over where and how the related data is stored. In some examples, a database shard can store data related to two or more organizations (e.g., as in a shared channel). In at least one example, at least a portion of a shared collaborative document (e.g., document that includes users of different organizations as members) can be stored in association with a shard corresponding to each organization associated with the shared collaborative document.

In some examples, individual users can be associated with a database shard within the datastore 126 that stores data related to a particular user account. For example, communication platform user data 128 associated with a particular user account can be stored in a particular database shard. In some examples, third-party user data 130 associated with a particular user account can be associated with a database shard within the datastore 126. For example, one or more object(s) associated with a particular user that are obtained from a third-party service provider 108 can be associated with a database shard within the datastore 126.

In some examples, collaborative documents can be associated with a database shard within the datastore 126 that stores data related to a particular collaborative document. In some examples, the collaborative document can include an intra-organization collaborative document, such that members of the collaborative document are members of a same organization. In some examples, the collaborative document can include a shared or inter-organization collaborative document, such that members of the collaborative document can include members of two or more different organizations. In examples of shared collaborative documents, data associated therewith may be subject to data retention policy (e.g., policy to store data for 1 year, 2 years, etc.) associated with a particular organization of the two or more different organizations. In some examples, the particular organization can include an organization associated with an owner or administrator (e.g., creator of the collaborative document), an organization with the most conservative (e.g., longest duration) data retention policy, an organization with the least conservative (e.g., shortest duration) data retention policy, and/or the like. In such examples, the data associated with a collaborative document can be stored within the datastore 126 based on the data retention policy associated with the particular organization. In some examples, data associated with a collaborative document can be stored within the datastore 126 until the document management component 122 receives an express request to delete the collaborative document or a portion thereof. In such examples, the collaborative document and data presented in association therewith can be maintained in perpetuity until the document management component 122 receives an express request to delete all or a portion of the data associated with the collaborative document.

In at least one example, the operating system 124 can manage the processor(s) 112, computer-readable media 114, and/or hardware, software, etc. of the server(s) 102.

The communication interface(s) 116 can include one or more interfaces and hardware components for enabling communication with various other devices (e.g., the user computing device 104, third-party computing device(s) 106, etc.), such as over the network(s) 110 or directly. In some examples, the communication interface(s) 116 can facilitate communication via WebSockets, Application Programming Interfaces (APIs) (e.g., using API calls), HyperText Transfer Protocols (HTTPs), etc.

The server(s) 102 can further be equipped with various input/output devices 118 (e.g., I/O devices). Such I/O devices 118 can include a display, various user interface controls (e.g., buttons, joystick, keyboard, mouse, touch screen, etc.), audio speakers, connection ports and so forth.

In at least one example, the user computing device 104 can include one or more processors 138, computer-readable media 140, one or more communication interfaces 142, and input/output devices 144.

In at least one example, each processor of the processor(s) 138 can be a single processing unit or multiple processing units, and can include single or multiple computing units or multiple processing cores. The processor(s) 138 can comprise any of the types of processors described above with reference to the processor(s) 112 and can be the same as or different from the processor(s) 112.

The computer-readable media 140 can comprise any of the types of computer-readable media described above with reference to the computer-readable media 114 and can be the same as or different than the computer-readable media 114. Functional components stored in the computer-readable media 140 can optionally include one or more applications 146 and an operating system 148.

The application(s) 146 can include a mobile application, a web application, and/or a desktop application. In some examples, one or more of the application(s) 146 can include third-party applications 150, which can be provided by the third-party service provider(s) 108. In at least one example, at least one application 146 can be provided by the communication platform or which can be an otherwise dedicated application. In some examples, individual user computing devices associated with the system 100 can have an instance or versioned instance of the application(s) 146, which can be downloaded from an application store, accessible via the Internet, or otherwise executable by the processor(s) 138 to perform operations as described herein. That is, the application(s) 146 can be an access point, enabling the user computing device 104 to interact with the server(s) 102 to access and/or use communication services available via the communication platform. In at least one example, the application(s) 146 can facilitate the exchange of data between and among various other user computing devices, for example via the server(s) 102. In at least one example, the application(s) 146 can present user interfaces, as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 136 is shown in FIG. 1. As illustrated in FIG. 1, the user interface 136 can present data associated with the communication platform, such as via a communication platform application 146. In various examples, the user interface 136 can be configured to present data associated with one or more collaborative documents, one or more communication channels, one or more direct messages and, in some examples, one or more workspaces. That is, in some examples, the user interface 136 can present data associated with the one or more collaborative documents (e.g., objects, messages, etc.), messages sent via one or more communication channels and/or via direct message(s) in a single user interface so that the user (e.g., of the user computing device 104) can access and/or interact with data associated with the collaborative document(s), the multiple channels, and/or direct messaging instances that he or she is associated with and/or otherwise communicate with other users associated with the collaborative document(s), multiple channels, and/or direct messaging instances. As discussed above, the collaborative document(s), communication channels, and/or direct messaging instances can be internal to an organization of the user or externally shared (e.g., include users from two or more organizations, include a first user from a first organization and second user not associated with an organization).

In some examples, the user interface 136 can include a first section 152, or pane, that includes indicator(s) (e.g., user interface element(s) or object(s)) representing data with which the user (e.g., account of the user) is associated. Additional details associated with the first section 152 and indicator(s) are described below with reference to FIG. 2.

In at least one example, the user interface 136 can include a second section 154, region, or pane, that can be associated with a collaborative document 156. Though illustrated with a single collaborative document presented via the second section 154, this is not intended to be so limiting, and the second section 154 can present additional or alternative data. For example, the second section 154 can include data associated with a data feed (or, "feed") indicating messages posted to and/or actions taken with respect to one or more channels, direct messages, and/or other virtual spaces for facilitating communications (e.g., a virtual space associated with event(s) and/or action(s), etc.) as described herein. For another example, the second section 154 can include a document interface via which a viewing user may access one or more collaborative documents that are associated with the user. In some examples, the collaborative documents presented in a documents interface can be organized (e.g., ordered presentation) based on one or more ranking criteria, such as a most recent time the user accessed the collaborative document(s), a frequency of access of the collaborative document(s), an activity level (e.g., amount of interaction) within the collaborative document(s), a user preference associated with collaborative document(s) (e.g., marked as "favorite," etc.).

In at least one example, the operating system 148 can manage the processor(s) 138, computer-readable media 140, hardware, software, etc. of the user computing device 104.

The communication interface(s) 142 can include one or more interfaces and hardware components for enabling communication with various other devices (e.g., the user computing device 104), such as over the network(s) 110 or directly. In some examples, the communication interface(s) 142 can facilitate communication via WebSockets, APIs (e.g., using API calls), HTTPs, etc.

The user computing device 104 can further be equipped with various input/output devices 144 (e.g., I/O devices). Such I/O devices 144 can include a display, various user interface controls (e.g., buttons, joystick, keyboard, mouse, touch screen, etc.), audio speakers, connection ports and so forth.

While techniques described herein are described as being performed by the application(s) 146, techniques described herein can be performed by any other component, or combination of components, which can be associated with the server(s) 102, the user computing device 104, or a combination thereof.

Figure 2:
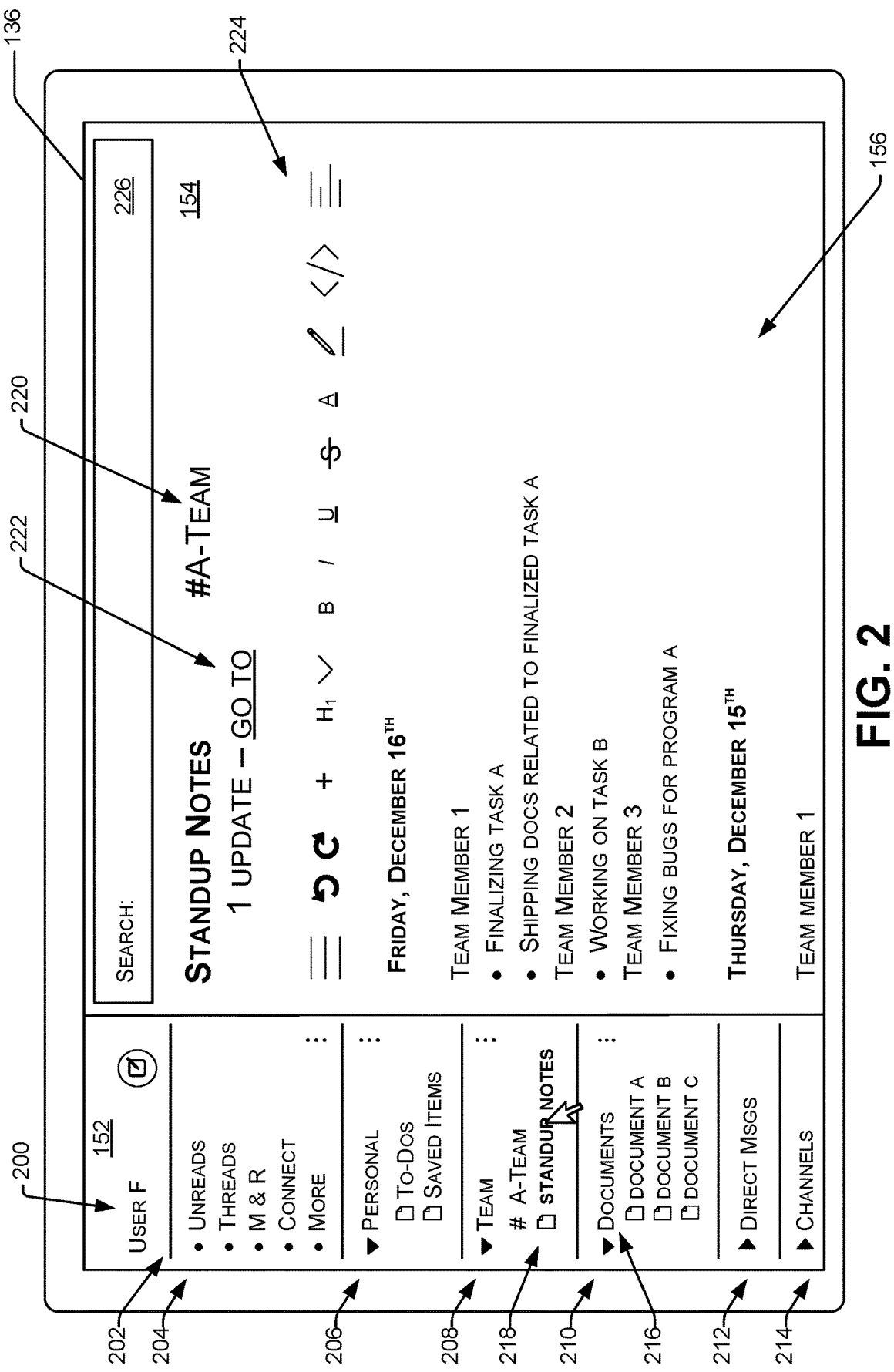
FIG. 2 illustrates an example user interface associated with a collaborative document.

FIG. 2 illustrates the example user interface 136 in which a collaborative document 156 is presented in the second section 154. As discussed above, the user interface 136 can include a first section 152 that includes user interface element(s) representing virtual space(s) associated with the workspace(s) with which the user 200 (e.g., user account of the user) is associated. In at least one example, the first section 152 can include a sidebar 202 including one or more sub-sections, which can represent different virtual spaces. For example, a first sub-section 204 can include affordances (e.g., user interface elements) representing virtual spaces that can aggregate data associated with a plurality of channels and/or workspaces. In at least one example, each virtual space can be associated with an affordance in the first sub-section 204. In some examples, an affordance can be associated with an actuation mechanism, that when actuated, can cause an application, such as application 146, to present data associated with the corresponding virtual space via a second section 154 of the user interface 136.

In at least one example, a virtual space can be associated with all unread data associated with each of the workspaces with which the user 200 is associated. That is, in some examples, if the user 200 requests to access the virtual space associated with "unreads," all data that has not been read (e.g., viewed) by the user can be presented in the second section 154, for example in a feed.

In at least one example, a virtual space can be associated with all threads with which the user 200 is associated (e.g., contributor, viewer, etc.). That is, in some examples, if the user 200 requests to access the virtual space associated with "threads," data associated with one or more threads with which the user 200 is associated can be presented in the second section 154. In some examples, the threads can include messaging threads associated with collaborative documents and/or other virtual spaces. In at least one example, a user 200 can generate or access a thread associated with a portion of a collaborative document 156. The portion can include a message transmitted in association with the collaborative document, selected text, an object, and/or the like.

In response to receiving a request, such as from the user 200, to generate or access the thread associated with the portion of the document, the messaging component 120 and/or the document management component 122 can cause a thread interface to be presented in association with the collaborative document 156. The thread interface can enable the viewing user to comment on the selected portion and/or to view other comments associated with the selected portion (e.g., previously transmitted comments in the thread). That is, the viewing user can transmit one or more messages in association with the thread of the collaborative document 156. In at least one example, in response to receiving a message transmitted in association with the thread of the collaborative document 156, the messaging component 120 and/or the document management component 122 can cause a notification associated with the newly transmitted thread message to be presented in association with the "threads" virtual space. In at least one example, in response to identifying a new message transmitted in association with a thread (of a collaborative document or other virtual space), the virtual space associated with "threads" can be presented in bold text, though other notifications are contemplated herein.

In another example, a virtual space associated with "mentions and reactions" (e.g., "M & R") can be associated with messages or threads where the user 200 (e.g., "User F") has been mentioned (e.g., via a tag) or another user has reacted (e.g., via an emoji, reaction, or the like) to a message object or thread posted by the user 200. In at least one example, a collaborative document or portion thereof in which the user 200 is mentioned or tagged may be included in association with the mentions and reactions virtual space.

In at least one example, a virtual space can be associated with facilitating communications between the user 200 and other users of the communication platform. For example, "connect" can be associated with enabling the user 200 to generate invitations to communicate with one or more other users with whom the user 200 does not have an established connection via the communication platform (e.g., not previously associated with).

In some examples, the sidebar 202 of the first section 152 can include one or more personalized sub-sections, or sub-panes, that include virtual spaces selected by the user 200 for inclusion in a respective sub-section. That is, the sidebar 202 can be configured to enable a user to generate one or more sub-sections and/or to modify the sub-section(s), such as to organize a presentation of various virtual spaces in the sidebar 202. In the illustrative example, the sidebar 202 includes a second sub-section 206 that is a personalized sub-section associated with personal documents that are associated with the user account. In at least one example, the user selects personal documents to associate with the second sub-section 206, such as dragging and dropping, pinning, or otherwise associating selected personal documents into the second sub-section 206. As discussed above, personal documents can include collaborative documents in which the user 200 is a sole member. For example, a personal document can include a to do list, a document with saved items, and/or the like.

Additionally, in the illustrative example, the sidebar 202 includes a third sub-section 208 that is a personalized sub-section associated with a team of which the user 200 is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user 200 can associate selected virtual spaces with the third sub-section 208, such as by dragging and dropping, pinning, or otherwise associating selected virtual spaces with the third sub-section 208.

In at least one example, the sidebar 202 includes a fourth sub-section 210 associated with collaborative documents that are associated with the user account of the user 200. That is, sidebar 202 can include a "documents" sub-section that includes affordances associated with one or more collaborative documents of which the user 200 is a member. In various examples, document management component 122 can determine one or more collaborative documents to be associated with the documents sub-section (e.g., fourth sub-section 210) based on one or more ranking criteria. That is, the document management component 122 can cause affordances associated with highest ranking collaborative documents of which the user is a member to be presented in the documents sub-section. In some examples, the user can pin or otherwise associate one or more collaborative documents with the documents sub-section. For example, the user can drag an affordance or other indicator associated with a collaborative document to the documents sub-section and release the selected collaborative document therein. In response to the drag-and-drop action, the document management component 122 can associate the selected collaborative document with the documents sub-section and cause presentation of an affordance of the selected collaborative document therein.

In at least one example, a label or other indicator associated with the documents sub-section can include an affordance 216 that, when selected by the user 200, causes a documents interface to be presented in the second section 154 of the user interface 136. As discussed above, the documents interface can include one or more lists of collaborative document(s) with which the user account of the user 200 is associated. For example, the documents interface can include a first list of personal collaborative documents associated with the user account and a second list of collaborative documents that include two or more members. Additional details associated with the documents interface will be described below with reference to FIG. 10B.

In at least one example, the sidebar 202 of the user interface 136 can include a fifth sub-section 212, or sub-pane, that includes indicators representative of communications with individual users or multiple specified users (e.g., instead of all, or a subset of, members of an organization). Such communications can be referred to as "direct messaging instances" or "direct messages." That is, the fifth sub-section 212, or sub-pane, can include indicators representative of virtual spaces that are associated with private messages between two or more users (e.g., direct messaging instances).

In at least one example, the sidebar 202 of the user interface 136 can include a sixth sub-section 214, or sub-pane, that includes indicators representing communication channels with which the user 200 is associated. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user can be associated with both workspaces, or can only be associated with one of the workspaces. In some examples, the communication channels represented can be associated with combinations of communication channels associated with a single workspace and communication channels associated with different workspaces.

In some examples, the sixth sub-section 214 can depict all communication channels, or a subset of all communication channels, that the user has permission to access (e.g., as determined by the permission data stored in association with communication platform user data 128). In such examples, the communication channels can be arranged alphabetically, based on most recent interaction, based on frequency of interactions, based on communication channel type (e.g., public, private, shared, cross-workspace, etc.), based on workspace, in user-designated sub-sections, or the like. In some examples, the sixth sub-section 214 can depict all communication channels, or a subset of all communication channels, that the user is a member of, and the user can interact with the user interface 136 to browse or view other communication channels that the user is not a member of but are not currently displayed in the sixth sub-section 214. In some examples, different types of communication channels (e.g., public, private, shared, cross-workspace, etc.) can be in different sections of the sixth sub-section 214, or can have their own sub-regions or sub-panes in the user interface 136. For example, shared channels can be presented in association with the "connect" indicator illustrated in the first sub-section 204, such as in a drop-down menu. In some examples, communication channels associated with different workspaces can be in different sections of the sixth sub-section 214, or can have their own regions or panes in the user interface 136.

In some examples, the affordances presented in different sub-sections of the sidebar 202 can be associated with graphical elements that visually differentiate types of virtual spaces. For example, a first communication channel can be associated with a square visual element and a second communication channel can be associated with a circle visual element. As a non-limiting example, and for the purpose of this discussion, the square visual element can indicate that the user is not a current member of the first channel, whereas the circle visual element can indicate that the user is a current member of the second channel. In some examples, additional or alternative graphical elements can be used to differentiate between public virtual spaces, private virtual spaces, shared virtual spaces, virtual spaces associated with different workspaces, and the like.

In various examples, in response to receiving an indication of selection of an affordance associated with a particular communication channel or other virtual space, the associated communication or other virtual space can be presented in the second section 154. As discussed above, in examples in which a collaborative document is associated with a particular virtual space, the collaborative document may be accessed in association therewith. That is, the document management component 122 may cause display of an affordance associated with the collaborative document 156 via the associated virtual space. In some examples, the document management component 122 can additionally cause display of another affordance associated with the collaborative document in the sidebar 202 of the user interface 136 in association with the virtual space. For example, an affordance 218 associated with the collaborative document 156 can be presented in the third sub-section 208 proximate an affordance corresponding to an associated virtual space 220 (e.g., "#A-Team"). In various examples, in response to receiving an indication of selection of the affordance 218 associated with the collaborative document 156, the document management component 122 can cause the collaborative document to be presented in the second section 154.

In various examples, the document management component 122 can be configured to identify one or more updates to the collaborative document 156. In at least one example, the document management component 122 identifies the update(s) based on interaction data associated with a user interaction with the collaborative document 156. Non-limiting examples, of updates to the collaborative document 156 include modifications to text included in an editable text section 224, a comment posted within the collaborative document 156, an object being added, removed, or modified (e.g., assignment, re-assignment of a task, etc.), a new comment or message transmitted in association with a portion of the collaborative document 156 (e.g., in a chat interface, a thread, etc.), and/or the like. For example, the document management component 122 can receive a request to generate a thread associated with a portion of the collaborative document 156, such as to initiate a conversation associated with the selected portion. The document management component 122 and/or the messaging component 120 can process one or more messages transmitted in association with the thread. Based on the message(s), the document management component 122 can identify the update to the collaborative document 156.

In at least one example, an update can include a comment posted in the collaborative document 156. In some examples, the collaborative document can be configured to receive a user selection of a commenting option, such as to comment on a selected portion of the document. In some examples, the commenting option can be provided via a commenting affordance associated with the collaborative document 156. In some examples, the commenting option can be presented in response to receiving a user selection of the portion of the collaborative document 156. For example, the user can select a word or a sentence of the collaborative document 156, such as that included in an editable text section thereof, and can select an option to comment on the selected portion of the collaborative document 156. In response to receiving the selection of the commenting option, the document management component 122 can cause a commenting or messaging interface to be presented in association with the collaborative document 156. In some examples, the messaging interface can include a thread messaging interface configured to enable one or more users to comment on the selected portion and/or previous comments in the thread. In some examples, the document management component 122 and/or the messaging component 120 can process the message transmitted via the messaging interface and can cause instances of the messaging interface (e.g., thread) to be presented via interfaces associated with the other members of the collaborative document 156. In some examples, the document management component 122 and/or the messaging component 120 can additionally cause the message to be presented in a thread associated with a virtual space with which the collaborative document 156 is associated. That is, the message transmitted via a first thread of the collaborative document 156 can be published via the first thread and a second thread of a virtual space associated with the collaborative document 156.

In some examples, the document management component 122 can cause presentation of a notification in the sidebar 202 of the user interface in association with the affordance 218, the notification providing an indication of the update. Continuing the example from above, in response to receiving the message(s) via the thread, and thus identifying the update to the collaborative document 156, the document management component 122 can cause the notification to be presented in association with the affordance 218. In the illustrative example, the notification includes bolded text of the affordance 218. In other examples, the notification can include a separate indicator (e.g., shape, symbol, number, letter, etc.) associated with the affordance 218 and/or a pop-up or overlay notification presented via the user interface 136. Similarly, in examples in which the collaborative document 156 is associated with a virtual space, the document management component 122 can cause a notification indicating the update to be presented in association with a virtual space indicator or affordance associated with the virtual space. That is, the document management component 122 can identify update(s) to a collaborative document and can cause a notification to be presented in association with a corresponding virtual space, such as to provide an indication of the update(s) to a document associated with the virtual space. Further continuing the example from above, in response to receiving the message(s) via the thread, and thus identifying the update to the collaborative document 156, the document management component 122 can cause the notification to be presented in association with the virtual space presented in the sidebar 202.

In some examples, in response to receiving an indication of selection of the affordance 218 and/or the notification, the communication platform can cause the collaborative document 156 to be presented in the second section 154. In some examples, the document management component 122 can cause a portion of the collaborative document 156 that is associated with the update to be presented in the second section 154. That is, the update associated with the notification can be automatically presented to the user 200, for review. Additionally or alternatively, the collaborative document 156 can include an update affordance 222 that, when selected by the user 200, causes the portion of the collaborative document 156 to be presented in the second section 154.

As discussed above, the collaborative document 156 can support editable text and/or objects that can be ordered, added, deleted, modified, and/or the like. As an illustrative non-limiting example, the collaborative document 156 includes an editable text section 224 that represents a portion of the collaborative document 156 in which members may input, modify, and/or comment on text synchronously or asynchronously, such as in a collaborative effort to refine the text. In such examples, the editable text section 224 can include word processing functionalities.

In various examples, the collaborative document 156 can additionally include one or more object sections, each object section including one or more objects associated with the collaborative document 156. In at least one example, an object section can be used to present data associated with an object or type of object separate from other objects or types of objects in the collaborative document 156, such as to improve organization and management thereof An object can include, but is not limited to, text, audio and/or video files, a task, a ticket to be resolved, an event (e.g., scheduled event, calendar invitation, calendar instance, etc.), a message previously transmitted via the communication platform, an image, a graphic, a link to a local object, a link to a remote object (e.g., third-party object), a file, and/or the like.

In at least one example, the collaborative document 156 can include a search mechanism 226 via which the user 200 can search the collaborative document 156 for particular text, objects, messages, and/or the like. In some examples, the document management component 122 can be configured to receive input via the search mechanism 226 and identify one or more relevant sections of the collaborative document 156 based on the input. The input can include a word, a topic, a member (e.g., username or identifier), and/or other data that can be used to identify particular text, objects, and/or messages in the collaborative document 156.

Additional functionalities associated with collaborative documents (e.g., the collaborative document 156) and affordances associated therewith are described in detail below with respect to FIGS. 3A-11C.

Figure 3A:
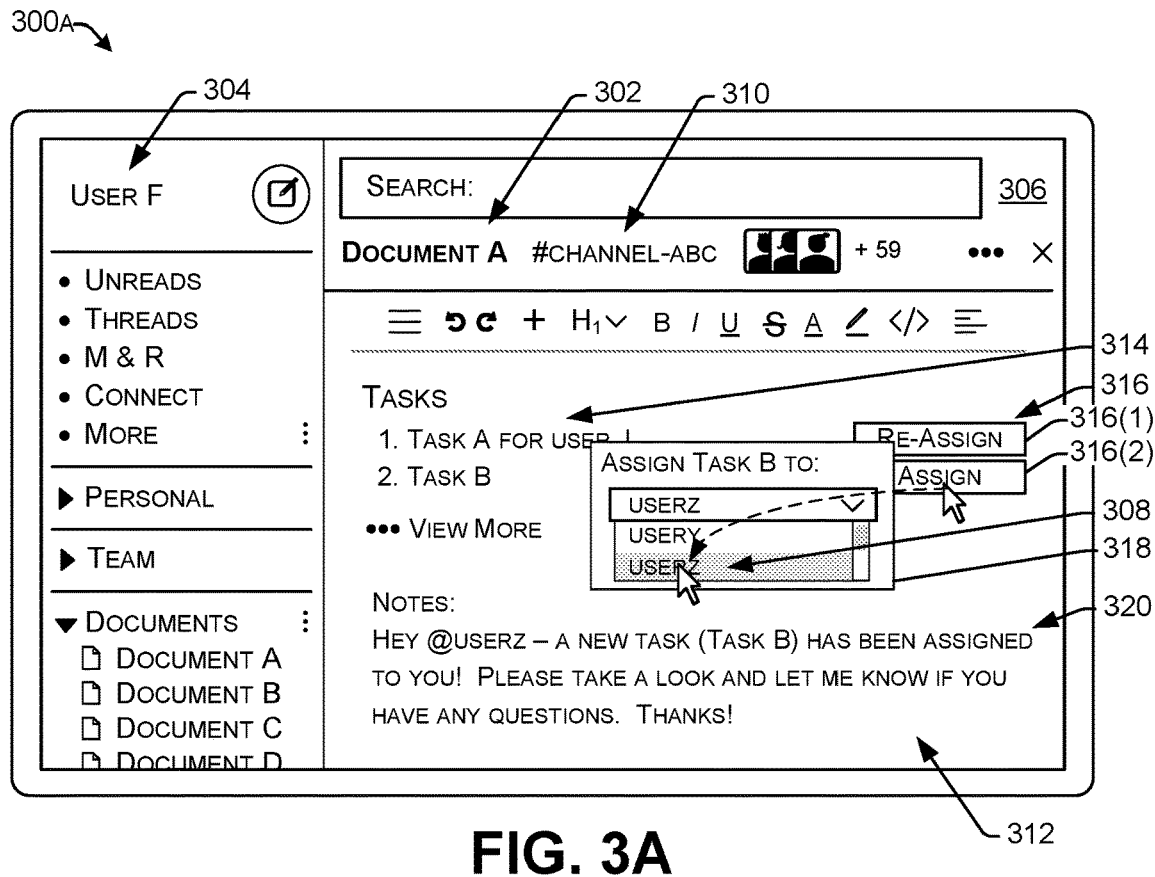
FIGS. 3A and 3B illustrate example user interfaces for providing a notification of an update to a collaborative document in a sidebar of a user interface, as described herein.
Figure 3B:
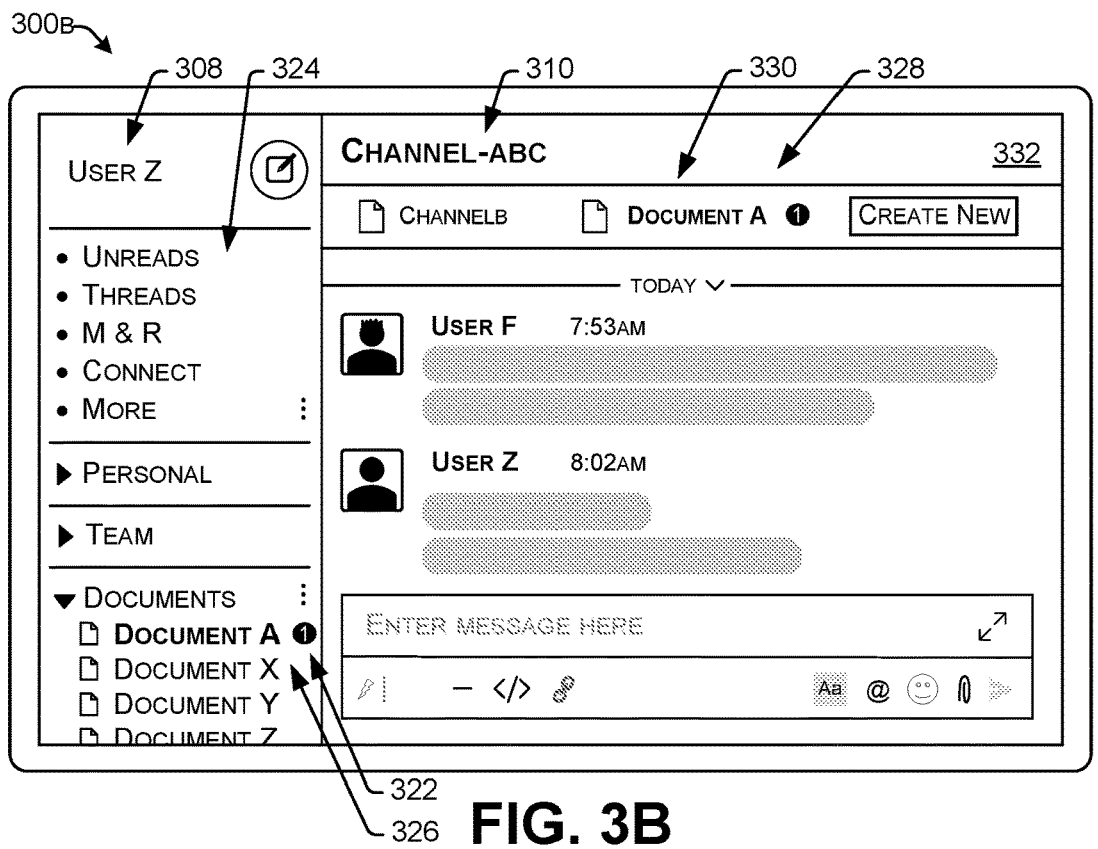

FIGS. 3A and 3B illustrate example user interfaces for providing a notification of an update to a collaborative document in a sidebar of a user interface, as described herein. FIG. 3A illustrates an example user interface 300a in which a collaborative document 302 associated with a first user account of a first user 304, such as user 200, is presented in a second region 306, which may correspond to second region 154. In at least one example, the collaborative document 302 may correspond to collaborative document 156 and/or the first user 304 may correspond to user 200. In at least one example, the collaborative document 302 can include two or more users, such as the first user 304, a second user 308, and the like. In the illustrative example, the collaborative document 302 is associated with a virtual space 310 (e.g., "#channel-abc"). In other examples, the collaborative document 302 can be independent of the virtual space 310.

As discussed above, the collaborative document 302 can support editable text and/or objects that can be ordered, added, deleted, modified, and/or the like. In some examples, the collaborative document 302 can include an editable text section (e.g., editable text section 224) that represents a portion of the collaborative document 302 in which members may input, modify, and/or comment on text synchronously or asynchronously, such as in a collaborative effort to refine the text. In such examples, the editable text section can include word processing functionalities.

In some examples, the collaborative document 302 can additionally include one or more object sections, such as object section 312. In at least one example, the object section 312 can include one or more objects associated with the collaborative document 302. In at least one example, the object section 312 can present data associated with an object or type of object separate from other objects or types of objects in the collaborative document 302, such as to improve organization and management thereof An object can include, but is not limited to, text, audio and/or video files, a task, a ticket to be resolved, an event (e.g., scheduled event, calendar invitation, calendar instance, etc.), a message previously transmitted via the communication platform, an image, a graphic, a link to a local object, a link to a remote object (e.g., third-party object), a file, and/or the like. As a non-limiting illustrative example, the object section 312 can include one or more tasks 314 associated with the collaborative document 302. For example, the task(s) 314 can include a first task (e.g., "Task A") and a second task (e.g., "Task B").

In various examples, the object section 312 can include one or more assignment affordances 316 associated with the tasks 314. In some examples, the communication platform can determine to present the assignment affordances 316 based on a determination that the associated objects are configured to be assigned to a member of the collaborative document 302. That is, the assignment affordances 316 can be presented in association with assignable objects. In various examples, based on a status of the assignable object (e.g., assigned, not assigned, etc.), the communication platform can cause assignment affordances 316 associated with assigning or re-assigning the assignable object. For example, a first assignment affordance 316(1) associated with the first task that is assigned to a user (e.g., "User J") includes an option to re-assign the task. For another example, a second assignment affordance 316(2) associated with the second task includes an option to assign the task.

In some examples, responsive to receiving an indication of selection of the option to assign the task (e.g., the second assignment affordance 316(2)) or re-assign a task (e.g., the first assignment affordance 316(1)), the communication platform can cause an assignment window 318 to be presented in association with the collaborative document 302. In some examples, the assignment window 318 can include one or more users (e.g., members) configured for assignment of the associated object (e.g., able to perform the task). In some examples, the assignment window 318 can include a list of some or all members of the collaborative document, from which the first user 304 can select a particular user for object assignment. In some examples, the communication platform can determine a portion of the members of the collaborative document 302 to include in the assignment window 318 based on the particular object associated with the assignment affordance (e.g., particular task), qualifications of members, existing object or work distribution between members, and/or the like. For example, based on a determination that the first task is assigned to User J, the communication platform can determine to not include User J in the assignment window 318 associated with an assignment of the second task. Though this is just intended to be an illustrative example, and in another example, the communication platform can include User J in the assignment window 318 associated with the assignment of the second task regardless of the assignment of the first task.

In various examples, in response to receiving an indication of selection of the second user 308 for object assignment (e.g., assignment of the second task), the communication platform can associate the object with a second user account of the second user. In some examples, the object assignment can include an update to the collaborative document 302. That is, in response to the receiving input associated with the object assignment, the communication platform can identify an update to the collaborative document 302. In some examples, the communication platform can cause a notification associated with the update to be presented on a user interface associated with the second user 308.

Additionally or alternatively, the communication platform can cause the notification to be presented on a user interface associated with the second user 308 based on a determination that the first user 304 mentions or otherwise tags the second user 308 in the collaborative document 302. In some examples, the object section 312 can include an editable text section 320 in which a member of the collaborative document 302 can input text associated with the object section 312. For example, the first user 304 can include a note to the second user 308 informing the second user about the object assignment. In some examples, the note can be automatically generated by the communication platform, such as based on task assignment. In various examples, the first user 304 and/or the communication platform (in an automated note) can mention or otherwise tag the second user 308, such as to cause the notification to be presented on the user interface associated with the second user 308. Though described as a mention with an @ symbol, this is merely illustrative, and any other type of symbol (e.g., !, &, *, etc.) can be used to mention or tag a user.

FIG. 3B illustrates an example user interface 300b associated with the second user account of the second user 308 in which a notification 322 associated with the update to the collaborative document 302 is presented in a sidebar 324 of the user interface 300b. In various examples, the notification 322 can include a modification to an affordance 326 associated with the collaborative document 302 presented in the sidebar 324. In such examples, the notification 322 can include a modification to text and/or an image associated with the affordance 326, such as bolding text and/or lines associated with the image.

As illustrated in FIG. 3B, the notification 322 can include a separate indicator presented in association with the affordance 326. The separate indicator can include a shape, symbol, letter, number, and/or other indicator to provide an indication of the update to a particular collaborative document. In the illustrative example, the separate indicator can include a number that represents a number of update instances (e.g., number of users who have updated the collaborative document) since the user last viewed the collaborative document. That is, the separate indicator provides an indication that a single user (e.g., the first user 304) has modified the collaborative document 302 since the second user 308 last accessed it.

Additionally or alternatively, the notification 322 can include a pop-up or overlay notification. In some examples, the notification 322 can be persistent, and can remain in the sidebar 324 and/or other portion of the user interface 300b until acknowledged by the second user 308. In some examples, the notification 322 can be ephemeral, such that it is presented for a period of time (e.g., 30 seconds, 1 minute, 1 hour, etc.). In such examples, the period of time may be determined by the communication platform and/or the second user 308, such as based on a user preference. In some examples, the notification 322 can include information associated with the update, such as an identifier associated with a collaborative document 302 and/or section thereof (e.g., object section 312) that was updated, an object associated with the collaborative document that was modified (e.g., object assigned, message added, workflow updated, etc.), the virtual space 310 associated with the collaborative document 302, a user identifier associated with the update (e.g., identifier associated with the first user 304), a time associated with the update, and/or other information associated with the update.

In various examples, the communication platform can additionally or alternatively cause a presentation of a second notification 328 in association with a second affordance 330 corresponding to the collaborative document. In such examples, the communication platform can enhance discoverability of the update. As described above, in examples in which the collaborative document 302 is associated with a virtual space 310, the second affordance 330 can be presented in association with the virtual space 310. In the illustrative example, the second affordance 330 is presented in a document header associated with the virtual space 310, that is presented in a second section 332 of the user interface 300b. In other examples, the second affordance 330 can be presented in a different location associated with the virtual space 310, such as at a bottom or a side of the second section 332.

In various examples, the second notification 328 can provide the same or different information as the notification 322. In various examples, in response to receiving an indication of selection of the first notification 322 and/or the second notification 328, the communication platform can cause the collaborative document to be presented in the second section 332. In some examples, the communication platform can cause the object section 312 of the collaborative document 302 to be presented in the second section 332. That is, in response to a selection of the first notification 322 or the second notification 328, the communication platform can surface the update for the second user to view.

Figure 4A:
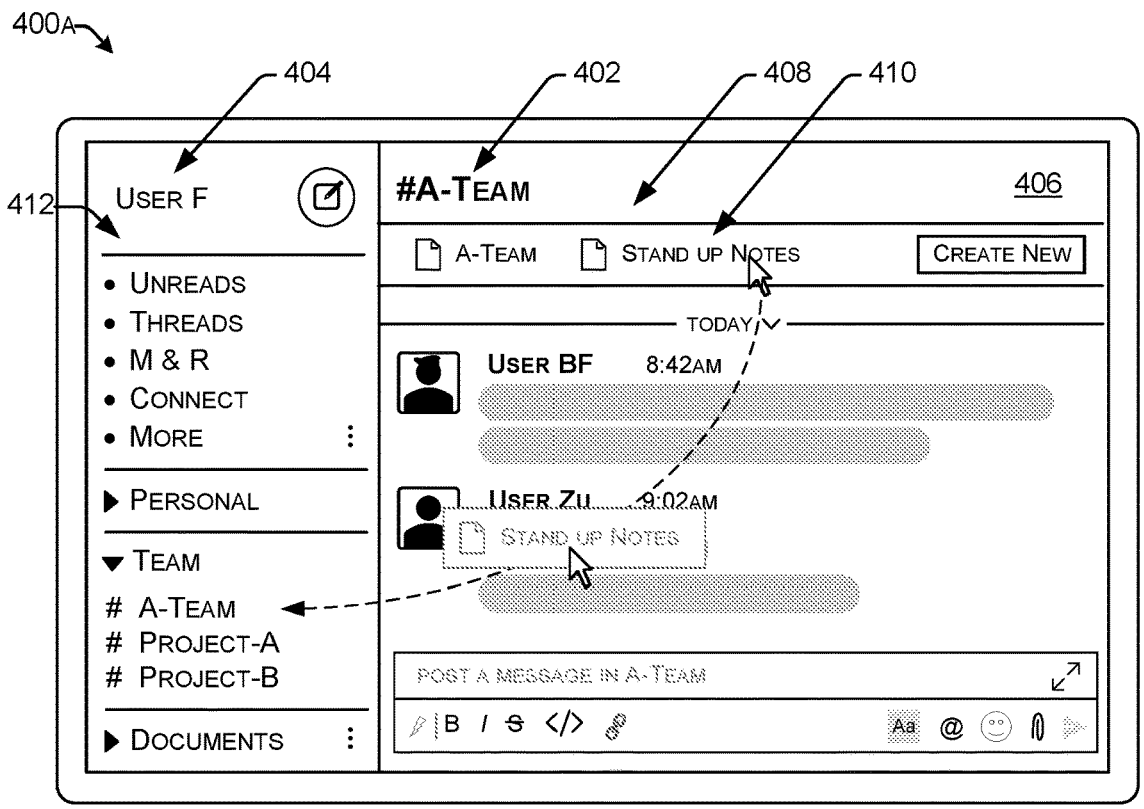
FIGS. 4A and 4B illustrate example user interfaces for causing an affordance associated with a document to be presented in a sidebar of a user interface, as described herein.
Figure 4B:
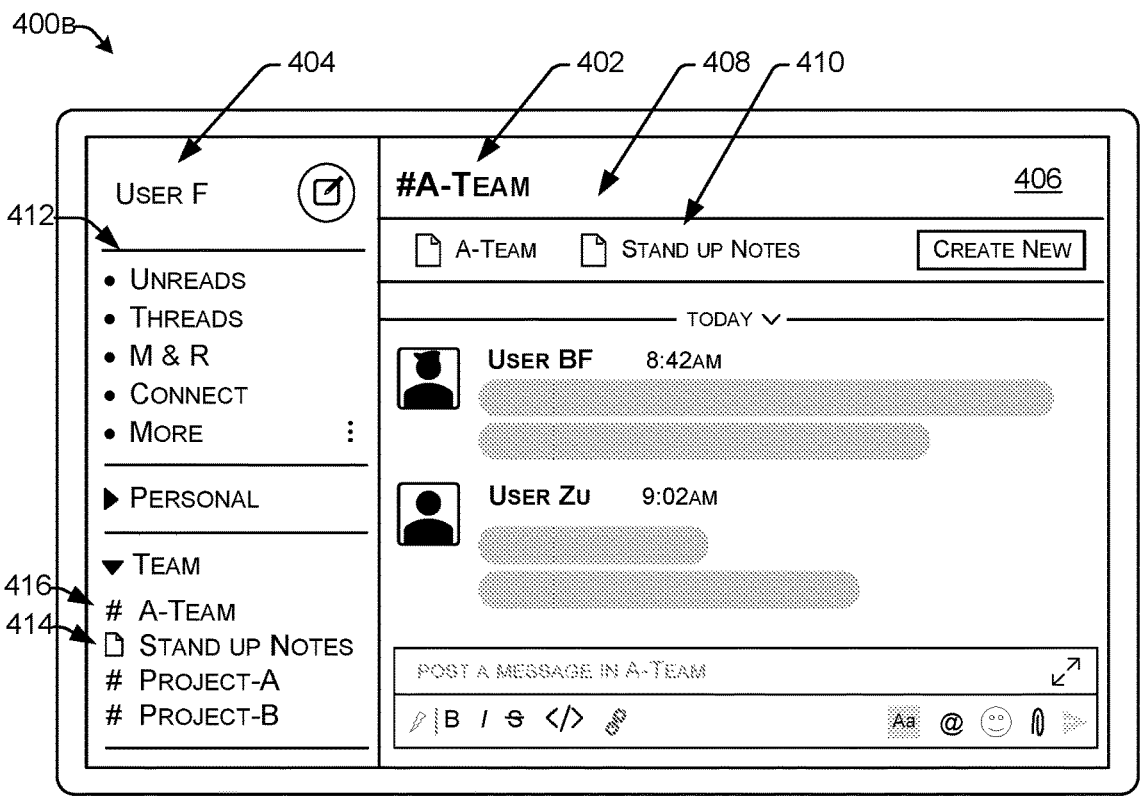

FIGS. 4A and 4B illustrate example user interfaces for causing an affordance associated with a document to be presented in a sidebar of a user interface, as described herein. FIG. 4A illustrates an example user interface 400a in which a virtual space 402 (e.g., "#A-Team") associated with a user account of a user 404 is presented in a second section 406, which may correspond to second section 154. In the illustrative example, the virtual space 402 can have associated therewith one or more collaborative documents 408. The collaborative documents 408 can include other virtual spaces in which members of the virtual space 402 can share information, interact with objects, and/or the like.

In various examples, each collaborative document 408 can have associated therewith an affordance 410 that, when selected by the user 404, causes a respective collaborative document 408 to be presented via the user interface 400a. In some examples, the selected collaborative document 408 can be presented in the second section 406. In some examples, the selected collaborative document 408 can be presented in another section of the user interface 400a (e.g., a third section). In such examples, the selected collaborative document 408 can be viewed concurrently with one or more messages (e.g., a messaging feed) associated with the virtual space 402.

In various examples, the communication platform can be configured to associate the selected collaborative document 408 with a sidebar 412 of the user interface 400a. That is, the communication platform can cause the affordance 410 associated with the selected collaborative document 408 to be presented in the sidebar 412. In some examples, the communication platform can cause the affordance 410 to be presented in the sidebar 412 based on a determination that the selected collaborative document 408 is among a portion of the collaborative documents associated with the user account of the user 404 that is ranked the highest. For example, as discussed above, the communication platform can cause presentation of affordances associated with a number of highest ranked collaborative documents in the sidebar 412, such as in a documents sub-section thereof.

In some examples, the communication platform can cause the affordance 410 to be presented in the sidebar 412 in response to receiving a request from the user 404 to associate the selected collaborative document 408 therewith. In some examples, the request can include a request to pin or otherwise associate the selected collaborative document 408 with the sidebar 412. In the illustrative example, the request includes a drag-and-drop operation associated with the affordance 410. That is, the user 404 selects the affordance 410 presented in association with the virtual space 402, drags the affordance 410 to a location (e.g., particular sub-section) in the sidebar 412 (e.g., "Team" sub-section), and releases the affordance 410. In response to the drag-and-drop operation, the communication platform causes presentation of a first affordance 410 in association with the virtual space 402 and a second affordance associated with the selected collaborative document 408 at the location in the sidebar 412.

FIG. 4B illustrates an example user interface 400b in which a second affordance 414 is presented in the sidebar 412. In at least one example, the second affordance 414 can be presented in the sidebar 412 in response to the request from the user 404 to associate the selected collaborative document 408 with the sidebar 412. In at least one example, the second affordance 414 can be presented in a sub-section of the sidebar 412 selected by the user (e.g., the location), such as in the drag and drop operation or another request to pin or otherwise associate the selected collaborative document with the sidebar 412. In at least one example, the second affordance 414 can be presented in association with or proximate to an affordance 416 associated with the virtual space 402.

Figure 5A:
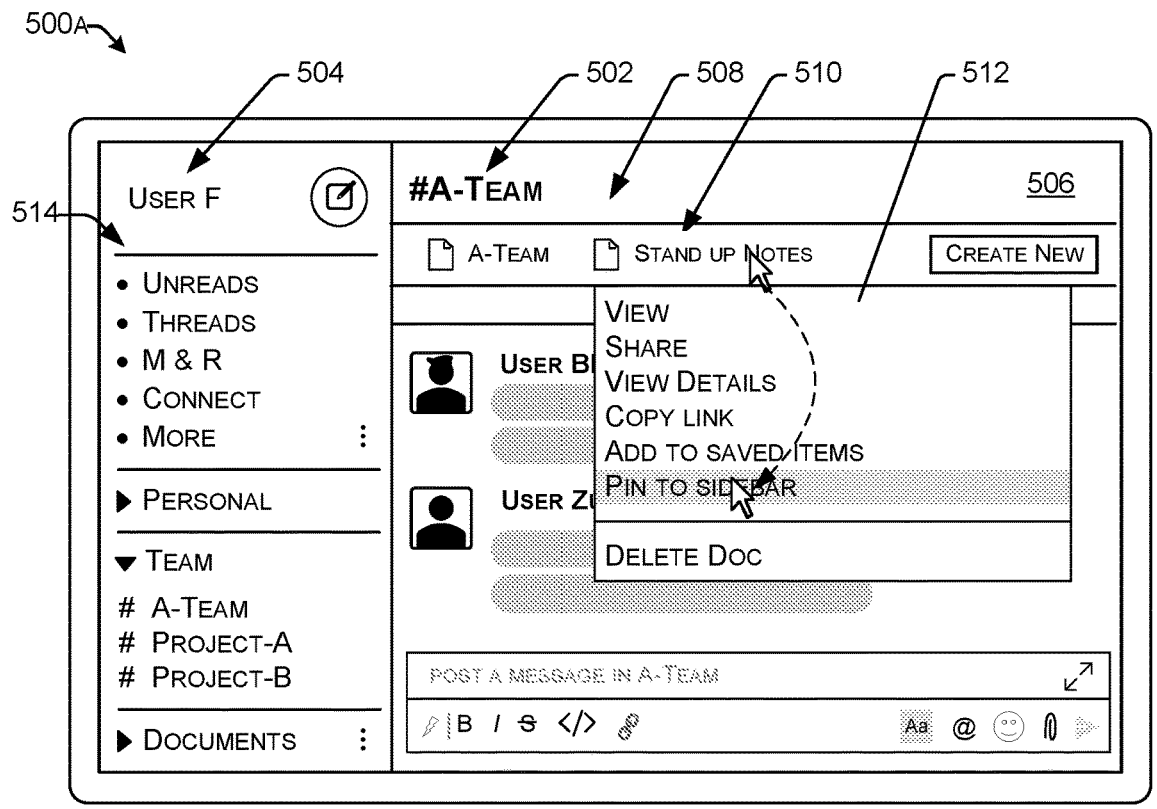
FIGS. 5A-5C illustrate example user interfaces for causing an affordance associated with a document to be presented in a sidebar of a user interface, as described herein.
Figure 5B:
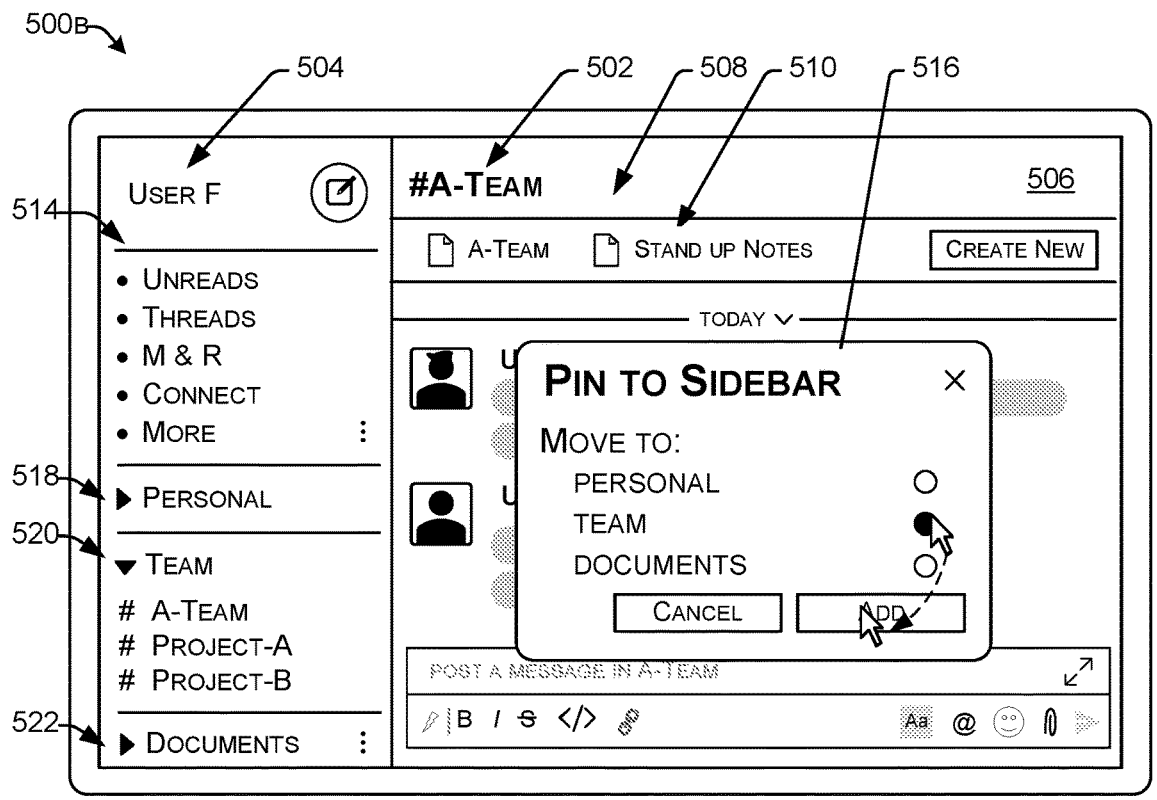
Figure 5C:
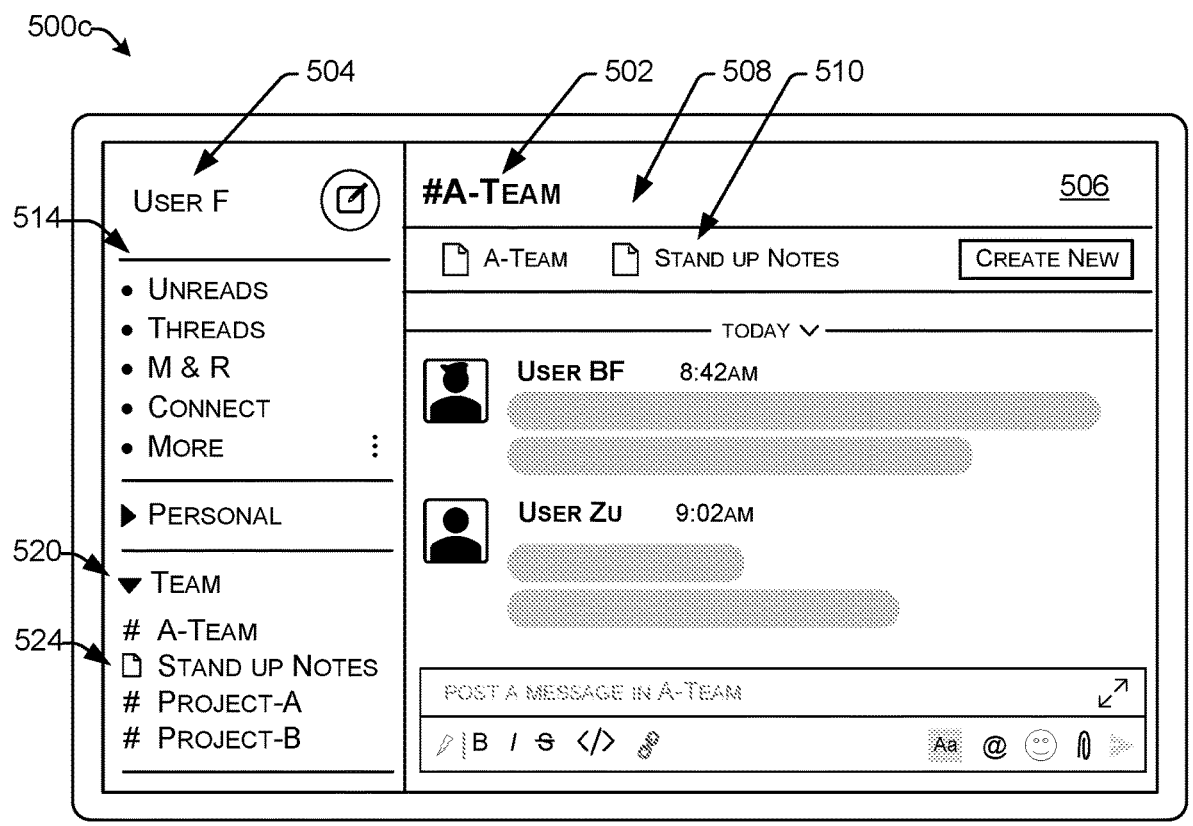

FIGS. 5A-5C illustrate example user interfaces for causing an affordance associated with a document to be presented in a sidebar of a user interface, as described herein. FIG. 5A illustrates an example user interface 500a a in which a virtual space 502 (e.g., "#A-Team") associated with a user account of a user 504 is presented in a second sub-section 506, which may correspond to second section 154. In the illustrative example, the virtual space 502 can have associated therewith one or more collaborative documents 508. The collaborative documents 508 can include other virtual spaces in which members of the virtual space 502 can share information, interact with objects, and/or the like.

In the illustrative example, the user 504 selects an affordance 510 associated with a collaborative document 508. In response to the selection of the affordance 510, the communication platform can cause an options menu 512 to be presented in association with the selected affordance 510 and/or collaborative document 508. Non-limiting examples of options associated with the selection can include viewing the collaborative document 508, sharing the collaborative document 508, viewing details associated with the collaborative document 508, copying a link to the collaborative document 508, adding the collaborative document 508 to a saved items folder or document, pinning or otherwise associating the collaborative document 508 with a sidebar 514 of the user interface 500a, and deleting the collaborative document 508.

In the illustrative example, the user 504 selects an option to pin or otherwise associate the collaborative document 508 with the sidebar 514 of the user interface. That is, the user 504 requests to associate the collaborative document 508 (e.g., an associated affordance 510) with the sidebar 514. In some examples, in response to receiving a selection (e.g., an indication of selection) of the option to pin or otherwise associate the collaborative document 508 with the sidebar 514, the communication platform can associate the selected collaborative document 508 with a particular sub-section of the sidebar 514, such as a documents sub-section. In some examples, in response to receiving the selection of the option to pin or otherwise associate the collaborative document 508 with the sidebar 514, the communication platform can provide a means by which for the user 504 can select a sub-section of the sidebar 514 for collaborative document 508 association.

FIG. 5B illustrates an example user interface 500b in which a sub-section selection menu 516 is presented, enabling the user 504 to select a particular sub-section of the sidebar 514 for collaborative document 508 association. In at least one example, the communication platform can cause the sub-section selection menu 516 to be presented in response to receiving an indication of selection of an option to pin or otherwise associate the selected collaborative document 508 with the sidebar 514.

In some examples, in response to receiving the selection to associate the selected collaborative document 508 with the sidebar 514, the communication platform can identify one or more sub-sections in the sidebar 514 that are eligible for collaborative document 508 association. That is, the communication platform can identify the sub-section(s) of the sidebar 514 that are configured to be modified or personalized by the user and/or are configured to have collaborative documents 508 associated therewith. In the illustrative example, the communication platform identifies a first sub-section 518 (e.g., "Personal" sub-section), a second sub-section 520 (e.g., "Team" sub-section), and a third sub-section 522 (e.g., "Documents" sub-section) that are configured to be modified by the user 504 and/or configured to have collaborative documents 508 associated therewith. Though this is not intended to be so limiting, and greater or fewer sub-sections of the sidebar 514 may be identified.

In at least one example, the sub-section selection menu 516 can be configured to enable the user 504 to select an eligible sub-section of the sidebar 514 for collaborative document 508 association. In the illustrative example, the user 504 selects the second sub-section 520 (e.g., "Team" sub-section) for collaborative document 508 association. In response to receiving a selection of a sub-section and/or a confirmation of the request to associate the selected collaborative document 508 with the sidebar 514 (e.g., selection of an "add" option, a "confirm" option, etc.), the communication platform can associate the selected collaborative document 508 with the selected sub-section (e.g., the second sub-section 520).

FIG. 5C illustrates an example user interface 500c in which a second affordance 524 associated with the selected collaborative document 508 is presented in association with the second sub-section 520 of the sidebar 514. In various examples, the affordance 510 and the second affordance 524 can each be configured such that, when selected by the user 504, the associated collaborative document 508 is presented via the second sub-section 506. In at least one example, the affordance 510 and the second affordance 524 can be configured to have associated therewith notifications informing the user 504 of updates to the associated collaborative document 508.

Figure 6A:
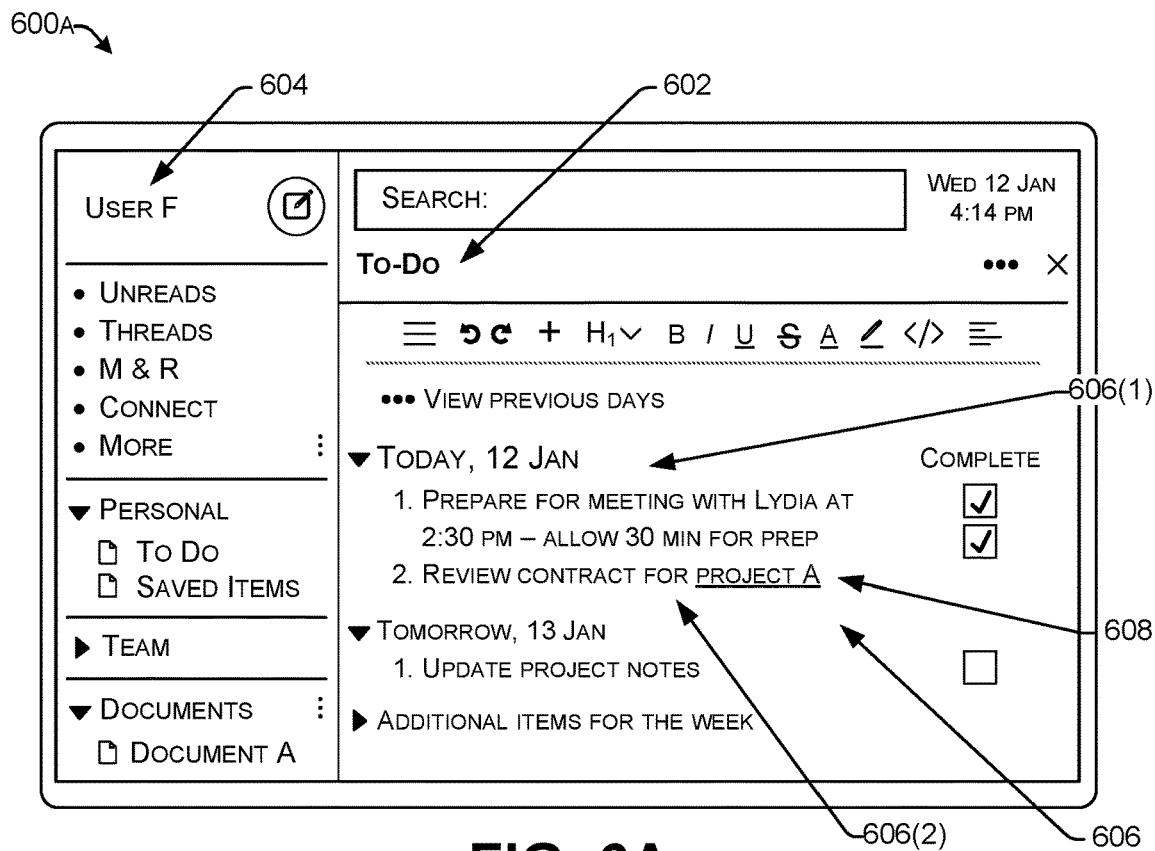
FIGS. 6A and 6B illustrate example user interfaces for presenting a reminder associated with a task in a sidebar of a user interface, as described herein.
Figure 6B:
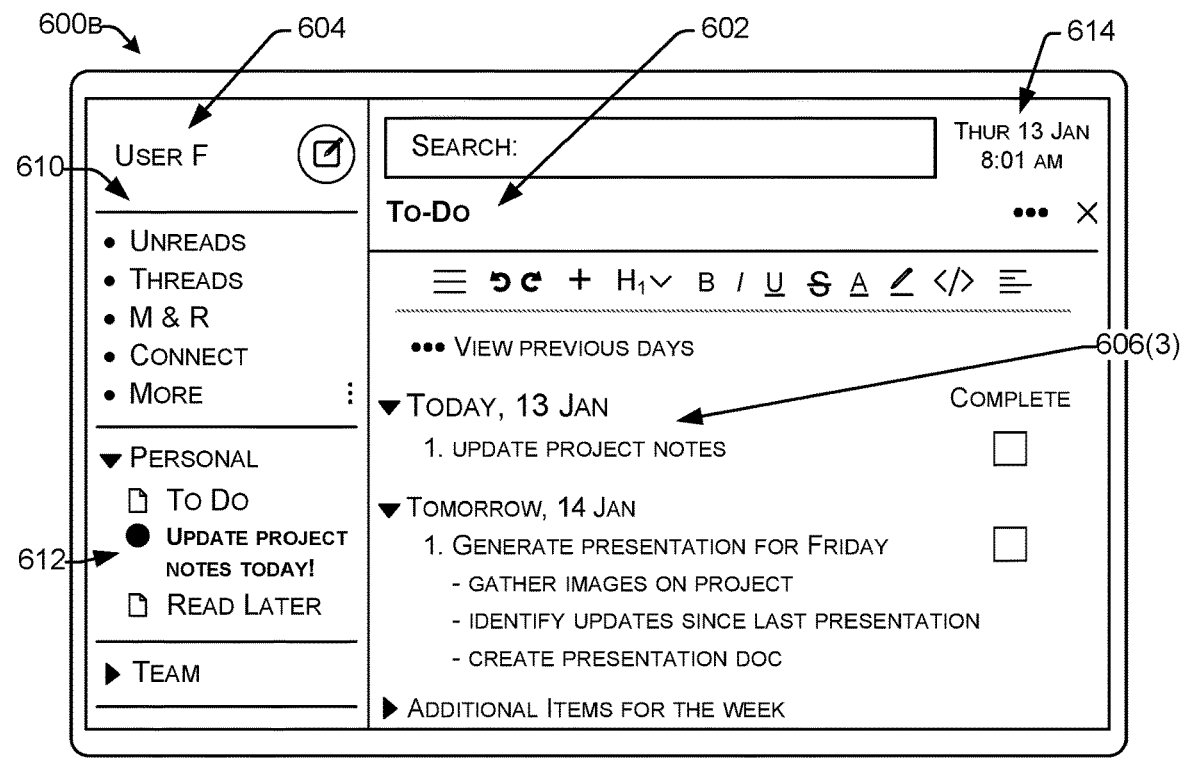

FIGS. 6A and 6B illustrate example user interfaces for presenting a reminder associated with a task in a sidebar of a user interface, as described herein. FIG. 6A illustrates an example user interface 600a in which a personal document 602 associated with a user account of a user 604 is presented. In the illustrative example, the personal document 602 is labeled "To Do," such as a to do list, however, this is not intended to be so limiting, and the label or name of the personal document 602 can be different from that illustrated. In some examples, the label or name of the personal document 602 can be modified by the user, such as by selecting the label and entering in a different label or name.

In the illustrative example, the personal document 602 includes one or more tasks 606 that are assigned to the user 604. In some examples, the task(s) 606 can include tasks that the user creates and includes in the personal document 602. For example, the user 604 can create a first task 606(1), reminding the user 604 to set aside time to prepare for a meeting. In some examples, the task(s) 606 can include objects that are assigned or otherwise associated with the user 604, such as in association with other collaborative documents, virtual spaces, and/or the like. For example, a second task 606(2) can include a task to review a contract associated with another collaborative document 608 (e.g., "Project A"). In various examples, the communication platform can be configured to identify an object assignment associated with the user 604, such as based on a user identifier of the user 604 being associated with the object, and include the assigned object in the personal document 602. That is, the personal document 602 can provide a means by which the user 604 can efficiently access information about object assignments from different collaborative documents.

In various examples, a task 606 that is associated with another collaborative document can include a selectable control or link to the associated collaborative document 608 and/or the object associated with the task 606. For example, the identifier associated with the other collaborative document 608 in the second task 606(2) includes an affordance that, when selected by the user 604, causes presentation of the object and/or the collaborative document 608 via the user interface 600a. In at least one example, one or more tasks 606 can be searchable within a collaborative document 608, such as to identify task(s) 606 with particular characteristics. Non-limiting examples of characteristics include a due date within a threshold period of time, assignment to a particular user, a type of object (e.g., task assignment, ticket, etc.), and/or the like. For example, the user 604 can search a collaborative document 608 for all tasks due this month. For another example, the user 604 can search a particular collaborative document with a plurality of members to identify tasks associated with the particular collaborative document that are assigned to or otherwise associated with the user 604 (e.g., search for @user, or the like).

Though not illustrated in FIG. 6A, the communication platform can be configured to cause presentation of affordances associated with one or more tasks 606 and/or objects associated therewith in a sidebar of the user interface 600a.

FIG. 6B illustrates an example user interface 600b in which an affordance 612 associated with a task 606 is presented in a sidebar 610. In at least one example, the communication platform can be configured to identify a time associated with a particular task 606, such as a third task 606(3). In some examples, the time can include a day, date, time in the day, or other interval of time associated with the particular task 606. In various examples, the communication platform can determine the time based on metadata associated with the task (e.g. associated due date, etc.), a day or date in which the task 606 is associated (e.g., today, tomorrow, etc.), and/or the like. For example, the communication platform determines that the third task 606(3) is to be completed "today."

In some examples, in response to identifying that a current time corresponds to or is within a threshold amount of time (e.g., 1 hour, 3 hours, etc.) from the time associated with the particular task 606, the communication platform can cause presentation of the affordance 612 in the sidebar 610 of the user interface. For example, the communication platform determines that a current date/time 614 corresponds to the day associated with the third task 606(3) (e.g., January 13), and causes presentation of the affordance 612 in the sidebar 610 of the user interface 600b. For another example, the communication platform determines that a current date/time 614 is within a threshold amount of time from a time associated with the task 606(3) and based on the determination, causes the affordance 612 to be presented in the sidebar 610.

In at least one example, in response to receiving an indication that a task 606 is complete (e.g., checkmark input in association with the task 606, associated ticket closed or completed, message sent, current time is after a time associated with a meeting or presentation associated with the task 606, etc.), the communication platform can remove the notification from the sidebar 610 of the user interface. In some examples, the communication platform can be configured to receive an indication, from a first user, that a task 606 associated with a second user is complete. In such an example, the communication platform can cause a notification associated with the task 606 to be removed from a second sidebar 610 associated with a second user interface of the second user.

Figure 7A:
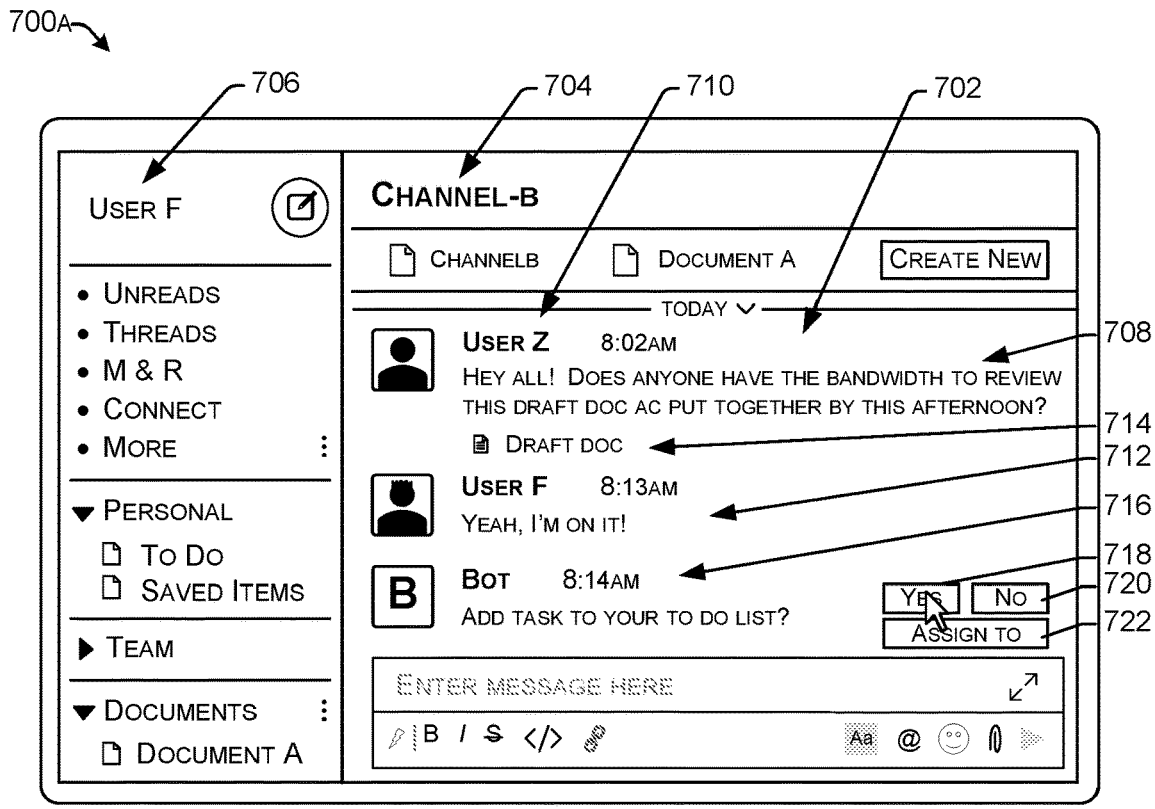
FIGS. 7A and 7B illustrate example user interfaces for generating a task based on message data and presenting a reminder associated with the task in a sidebar of a user interface, as described herein.
Figure 7B:
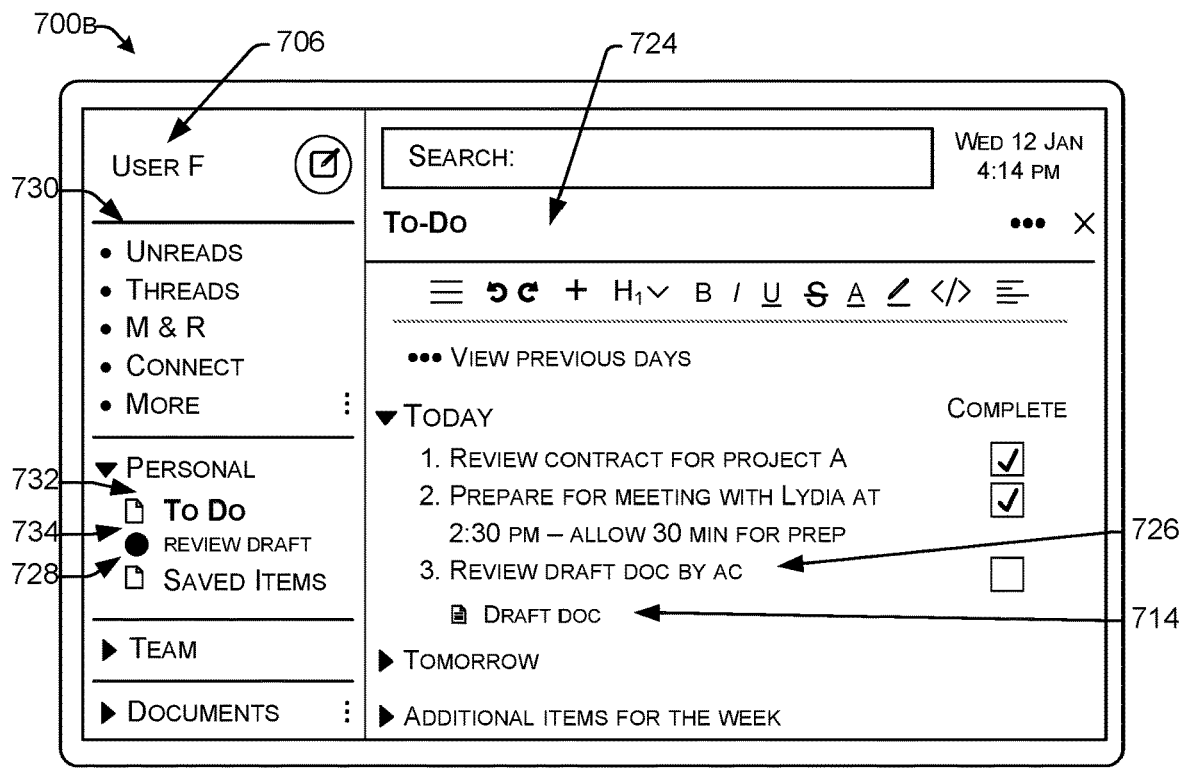

FIGS. 7A and 7B illustrate example user interfaces for generating a task based on message data and presenting a reminder associated with the task in a sidebar of a user interface, as described herein. FIG. 7A illustrates an example user interface 700a in which a messaging feed 702 associated with a virtual space 704 associated with a user account of a first user 706 is presented. In the illustrative example, the virtual space 704 includes a communication channel, however this is not intended to be so limiting and the virtual space 704 can include any other type of virtual space configured for text, audio, and/or video messaging transmissions, such as a direct messaging instances, collaborative documents, audio and/or video synchronous or asynchronous meetings, and/or the like.

In the illustrative example, the messaging feed 702 includes a first message 708 transmitted by a second user 710 and a second message 712 transmitted by the first user 706, such as in a conversation via the virtual space 704. In various examples, the communication platform can be configured to identify content in the first message 708 and the second message 712, such as to determine the context of the conversation. In at least one example, the communication platform can utilize natural language processing techniques, machine learning techniques, and/or other known language analysis techniques for determining content and/or context associated with one or more messages in a conversation.

In various examples, the communication platform can be configured to identify a task or object for assignment based on the determined content and/or context of the messages 708 and 712. For example, based on the content and/or context of the first message 708, the communication platform can determine that a task includes a review of a draft document 714 that is attached to the first message 708. In various examples, based on the content and/or context of the conversation, the communication platform can be configured to determine that a user participating in the conversation is being assigned or has accepted an assignment of the task or object. For example, based on the content and/or context of the second message 712, the communication platform determines that the first user 706 intends to accept an assignment of the task or object.

In various examples, in response to determining that a user (e.g., the first user 706) accepts assignment of or is otherwise assigned a task or object to perform, the communication platform can automatically associate the task or object with a to do list or other collaborative document (e.g., personal document) associated with the user account of the first user 706. That is, the communication platform can be configured to associate a newly assigned task or object with a to do list or another collaborative document associated with the first user 706. In various examples, in response to determining that the first user 706 accepts assignment of or is otherwise assigned a task or object to perform, the communication platform can cause presentation of an automated message 716 to the first user 706 (e.g., user being assigned the task or object). As illustrated, in some examples, the automated message 716 can include a query as to whether the first user 706 would like to associate the task or object with a to do list or other collaborative document associated with the user account. In some examples, the automated message 716 can include a first option 718 to associate a task or object with the to do list or other collaborative document and a second option 720 to not associate the task or object with the to do list or other collaborative document. In some examples, the automated message 716 can additionally include a third option 722 to assign the task or object to another user. In such examples, in response to receiving a selection of the third option 722, the communication platform can enable the first user 706 to select a particular other user for task or object assignment.

In at least one example, in response to receiving an indication of selection of the first option 718, the communication platform can associate the task or object identified in the conversation with the user account of the first user 706.

FIG. 7B illustrates an example user interface 700b in which a collaborative document 724 (e.g., "To Do" collaborative document) associated with the user account of the first user 706 is presented. In various examples, in response to receiving a selection of the first option 718, the communication platform can associate a task 726 (or object) with the collaborative document 724. That is, in response to receiving a request to add the task 726 determined based on the content and/or context of messages transmitted via the virtual space 704, the communication platform can cause presentation of the task 726 in association with the collaborative document 724.

In some examples, the communication platform can determine a day, date, or time associated with the task based on the content and/or context of the messages. In such examples, the communication platform can associate the determined day, date, and/or time with the task 726. For example, based on the content of the first message 708, the communication platform determines that the day, date and/or time associated with the task 726 to include a current day in the afternoon (e.g., 4 pm, 5 pm, etc.). In various examples, the communication platform can cause presentation of the task 726 in association with the determined day, date, and/or time. In the illustrative example, the task 726 can include an indicator associated with document 714 to be reviewed and/or another link or affordance associated with the task 726. In such examples, the communication platform can configure the task 726 to be selectable such that, when selected by the first user 706, the document 714 or other object associated with the task 726 is presented via the user interface 700b.

In various examples, the communication platform can be configured to determine that a current time is within a threshold time of the day, date, and/or time associated with the task 726. In some examples, based on the determination that the current time is within the threshold time, the communication platform can cause presentation of an affordance 728 associated with the task 726, in a sidebar 730 of the user interface 700b. In various examples, the affordance 728 can be selectable, such that, when selected by the first user 706, the document 714 or another object associated with the task 726 is presented via the user interface 700b. That is, the affordance 728 in the sidebar can enable the first user 706 to easily access the document 714 and/or the task 726 associated with the collaborative document 724. In some examples, the communication platform can cause presentation of the affordance 728 in the sidebar 730 in response to determining an assignment of the associated task 726 to the first user 706.

Additionally or alternatively, the communication platform can be configured to cause presentation of a notification 732 in association with an affordance 734 associated with the collaborative document 724, such as to alert the first user 706 of the pending task 726. In the illustrative example, the notification 732 includes a bolding of text associated with the affordance 728. However, this is not intended to be so limiting and the notification 732 can include additional or alternative illustrations, such as a separate indicator, a pop-up or overlay notification, or the like, as described herein.

Figure 8A:
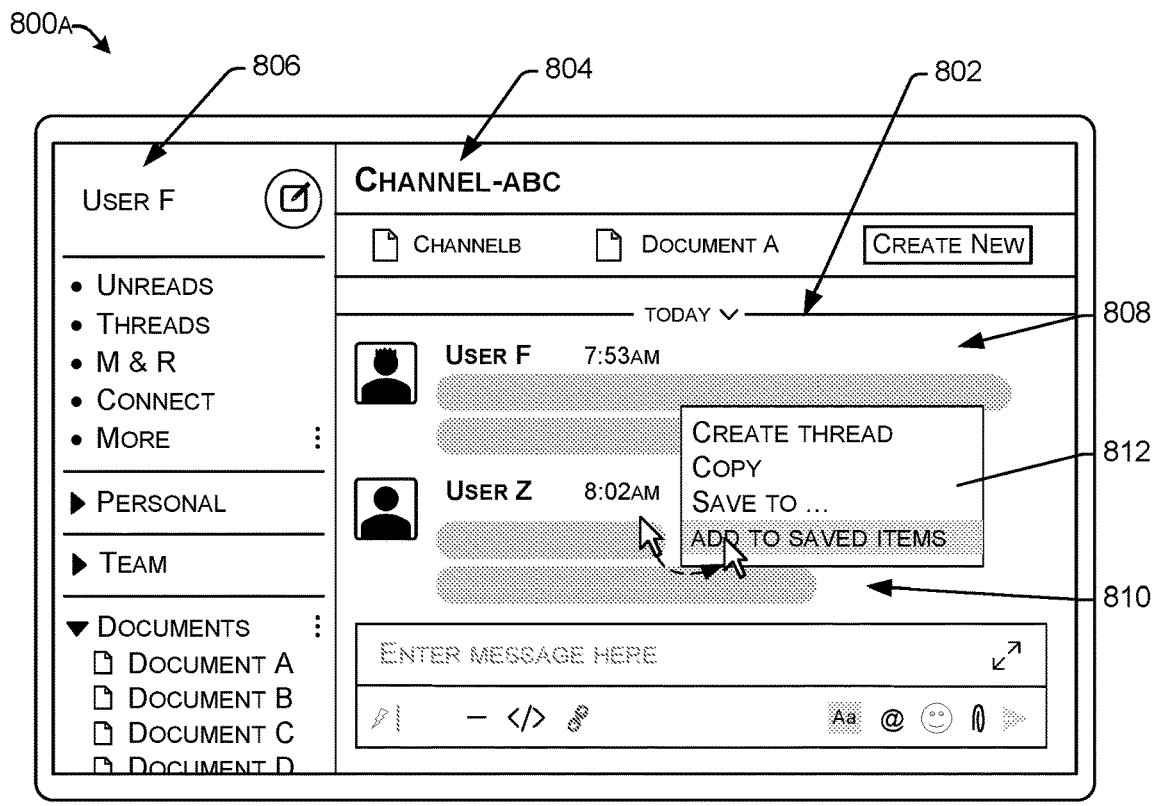
FIGS. 8A and 8B illustrate example user interfaces for saving a message to a document and presenting a notification of an update to the document in a sidebar of a user interface, as described herein.
Figure 8B:
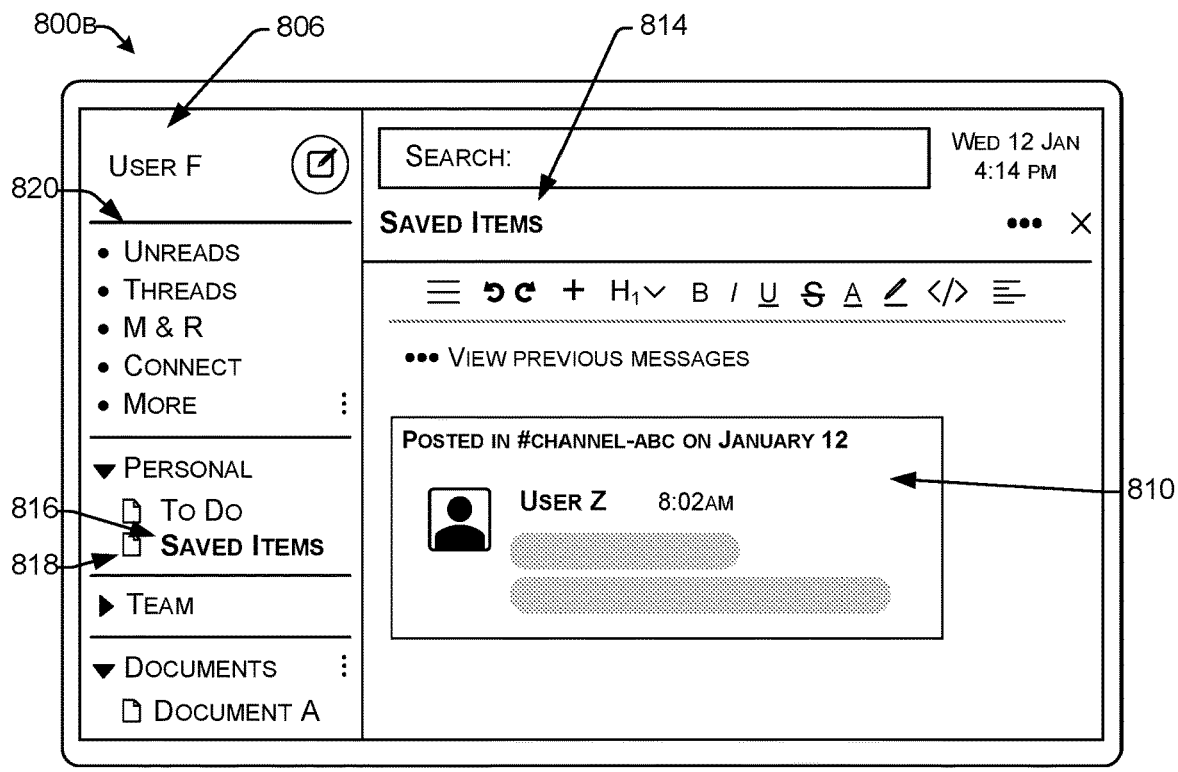

FIGS. 8A and 8B illustrate example user interfaces for saving a message to a document and presenting a notification of an update to the document in a sidebar of a user interface, as described herein. FIG. 8A illustrates an example user interface 800a in which a messaging feed 802 of a virtual space 804 associated with a user account of a user 806 is presented. In the illustrative example, the virtual space 804 includes a communication channel. However, this is not intended to be so limiting and the virtual space 804 can include any other type of virtual space configured for text, audio, and/or video messaging transmissions, such as a direct messaging instances, collaborative documents, audio and/or video synchronous or asynchronous meetings, and/or the like.

In the illustrative example, the messaging feed 802 includes a first message 808 and a second message 810. In other examples, the messaging feed 802 can include a greater or fewer number of messages. In at least one example, the communication platform can enable one or more actions to be taken with respect to the messages of the messaging feed 802. That is, the first message 808 and the second message 810 can be configured to enable the user 806 to perform one or more actions therewith.

In at least one example, in response to receiving a selection of a message in the messaging feed 802 (e.g., the second message 810), the communication platform causes an actions menu 812 to be presented in association with the second message 810. The actions menu 812 can include one or more actions the user 806 can take with respect to the selected second message 810. In the illustrative example, the action(s) include creating a thread associated with the second message 810, copying contents of the second message 810, saving the second message 810 to a datastore, and/or adding the second message 810 to a collaborative document (e.g., "Saved Items" collaborative document). Though this is not intended to be limiting and additional or alternative action(s) can be included in the actions menu 812. Additionally, though illustrated as an "add to saved items" option, this label is not intended to be so limiting, and the second message 810 can be added to another collaborative document that is associated with the user account.

In some examples, the collaborative document associated with the actions menu 812 can include a personal document. In such examples, the actions menu 812 can provide a shortcut for the user 806 to associate a particular message (e.g., the second message 810) with a personal document, such as to read and/or address at a later time. In at least one example, in response to receiving an indication of selection of the add to saved items action, the communication platform can copy an instance of the second message 810 into the saved items collaborative document. That is, the second message 810 can be presented in association with the saved items collaborative document.

FIG. 8B illustrates an example user interface 800b in which an instance of the second message 810 is presented in association with a saved items collaborative document 814. In at least one example, the instance of the second message 810 can be presented in association with the saved items collaborative document 814 in response to a request to associate the second message 810 therewith, such as via an actions menu 812.

In at least one example, in response to associating the second message 810 with the saved items collaborative document 814, the communication platform can cause a notification 816 to be presented in association with an affordance 818 corresponding to the saved items, such as in a sidebar 820 of the user interface 800b. The notification 816 can provide an indication to the user 806 of an update to the saved items collaborative document 814. That is, the notification 816 can inform the user 806 that the association of the second message with the saved items collaborative document 814 was successful, and it can provide a reminder to the user 806 to read or otherwise address the second message 810 at a later time. In the illustrative example, the notification 816 includes a bolding of text associated with the affordance 818. However, this is not intended to be so limiting and the notification 816 can include additional or alternative illustrations, such as a separate indicator, a pop-up or overlay notification, and/or the like, as described herein.

Figure 9A:
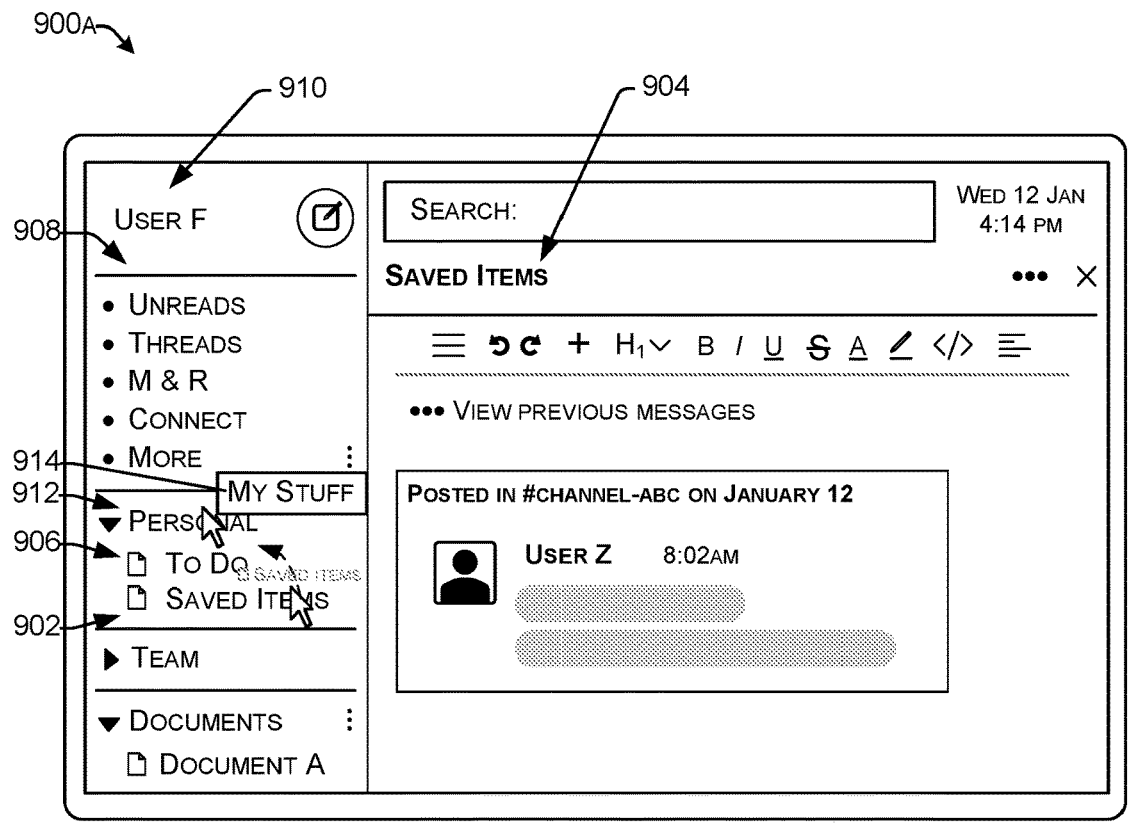
FIGS. 9A and 9B illustrate example user interfaces for modifying an order of documents presented in a sidebar of a user interface, as described herein.
Figure 9B:
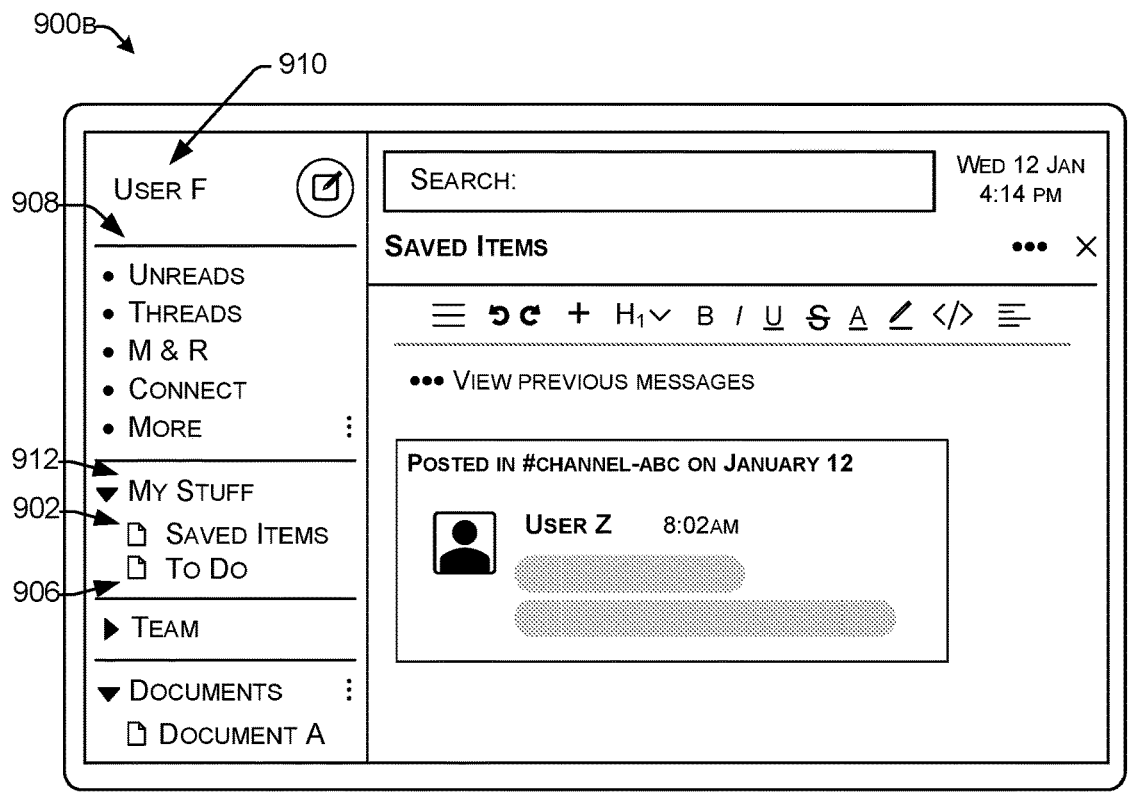

FIGS. 9A and 9B illustrate example user interfaces for modifying an order of affordances associated with documents presented in a sidebar of a user interface, as described herein. FIG. 9A illustrates an example user interface 900a in which a first affordance 902 associated with a first collaborative document 904 (e.g., "Saved Items" collaborative document) and a second affordance 906 associated with a second collaborative document (e.g., "To Do" collaborative document) are presented in a sidebar 908 of the user interface 900a of the user 910. In some examples, the first affordance 902 and the second affordance 906 can be presented in the sidebar based on a request from the user 910 to associate the respective collaborative documents with a sub-section 912 (e.g., "Personal" sub-section) of the sidebar.

In various examples, the communication platform can enable the user to modify features of the sub-section 912, such as a label (e.g., "Personal") and/or an order of affordances associated therewith. For example, in response to receiving a selection of the label associated with the sub-section 912, the communication platform can cause a label change box 914 to be presented in association with the sub-section 912. The user 910 can input a different label in the label change box, such as to cause the label associated with the sub-section 912 to be changed (e.g., "Personal" to "My Stuff"). For another example, the communication platform can enable the user 910 to modify an order of affordances presented in the sub-section 912. In at least one example, the user 910 can modify the order by selecting a particular affordance (e.g., the first affordance 902) and dragging the particular affordance to a desired location in the sub-section 912. In response to the drag-and-drop action, the communication platform can cause the first affordance 902 and the second affordance 906 to be presented in a different order, such as with the first affordance 902 presented before the second affordance 906 in the sub-section 912.

FIG. 9B illustrates an example user interface 900b in which the modifications to the sub-section 912 of the sidebar 908 discussed with respect to FIG. 9A are shown. For example, the label associated with the sub-section 912 is modified based on the user input described above (e.g., illustrated as "My Stuff"). For another example, the order of affordances associated with the sub-section 912 is modified, such as to include the first affordance 902 presented above the second affordance 906. Though illustrated with respect to a "Personal" or user-specific sub-section, this is not intended to be so limiting, and additional or alternative sub-sections of the sidebar 908 can be configured for user modification. Additionally, though described with respect to FIGS. 9A and 9B as modifications to a label associated with the sub-section (e.g., renaming the sub-section) and an order of the affordances associated therewith, this is not intended to be so limiting and additional or alternative modifications to the sub-section 912 are contemplated herein. Non-limiting examples of other modifications include deleting the sub-section 912, relocating the sub-section 912 within the sidebar 908, adding affordances to the sub-section 912, and removing affordances from the sub-section 912.

Figure 10A:
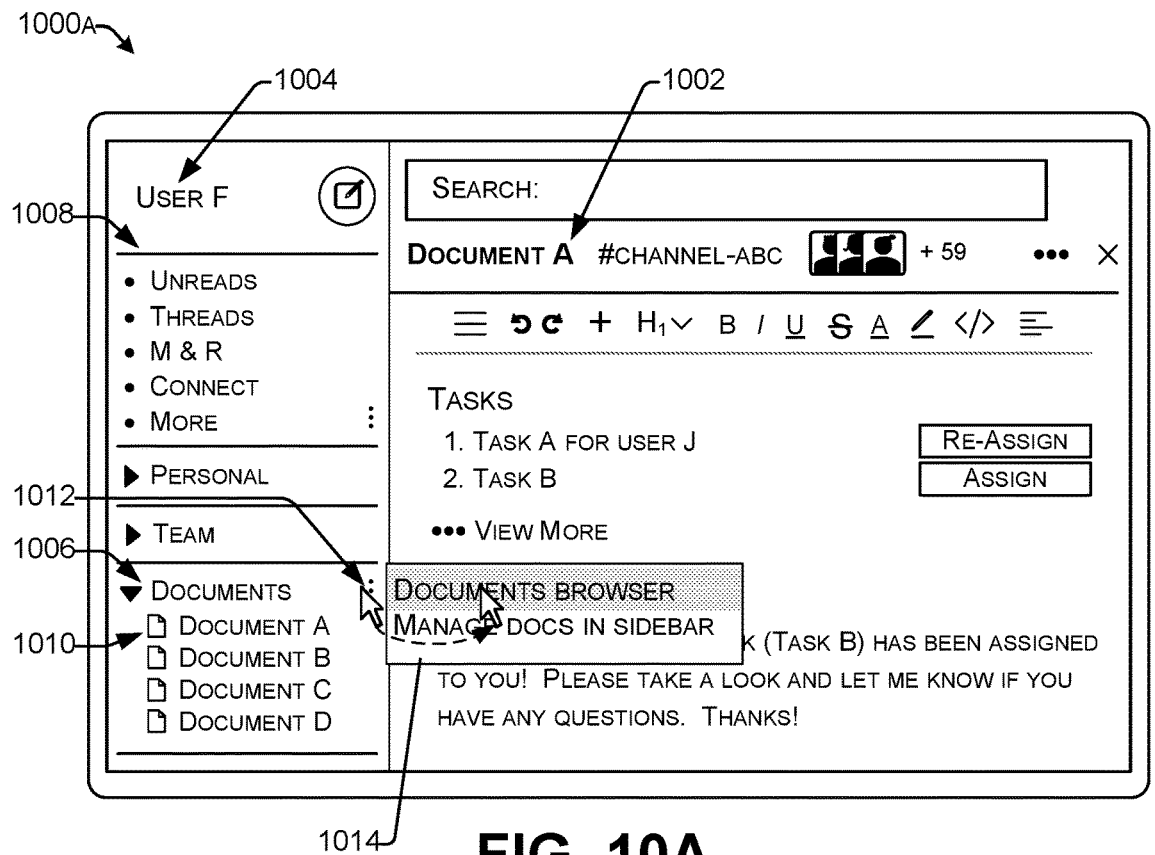
FIGS. 10A-10C illustrate example user interfaces for accessing one or more documents associated with a user account and selecting a document to be presented in a sidebar of a user interface, as described herein.
Figure 10B:
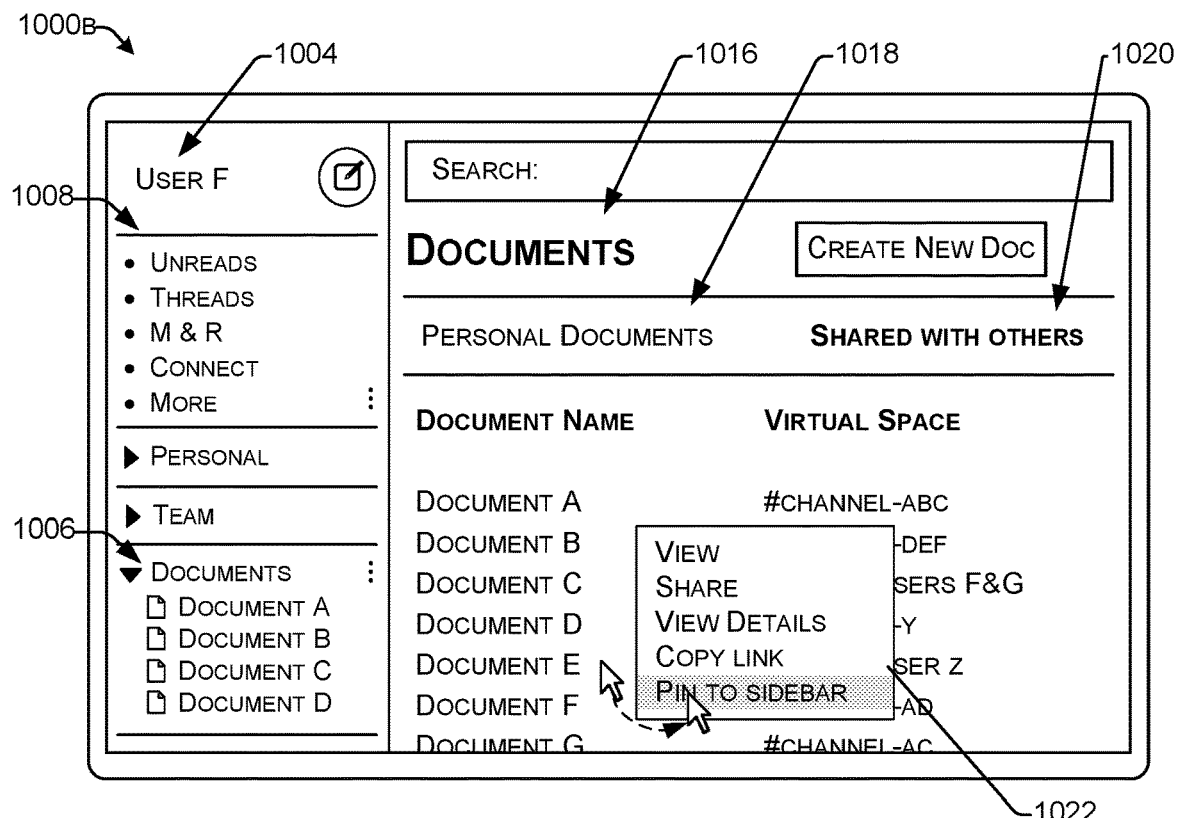
Figure 10C:
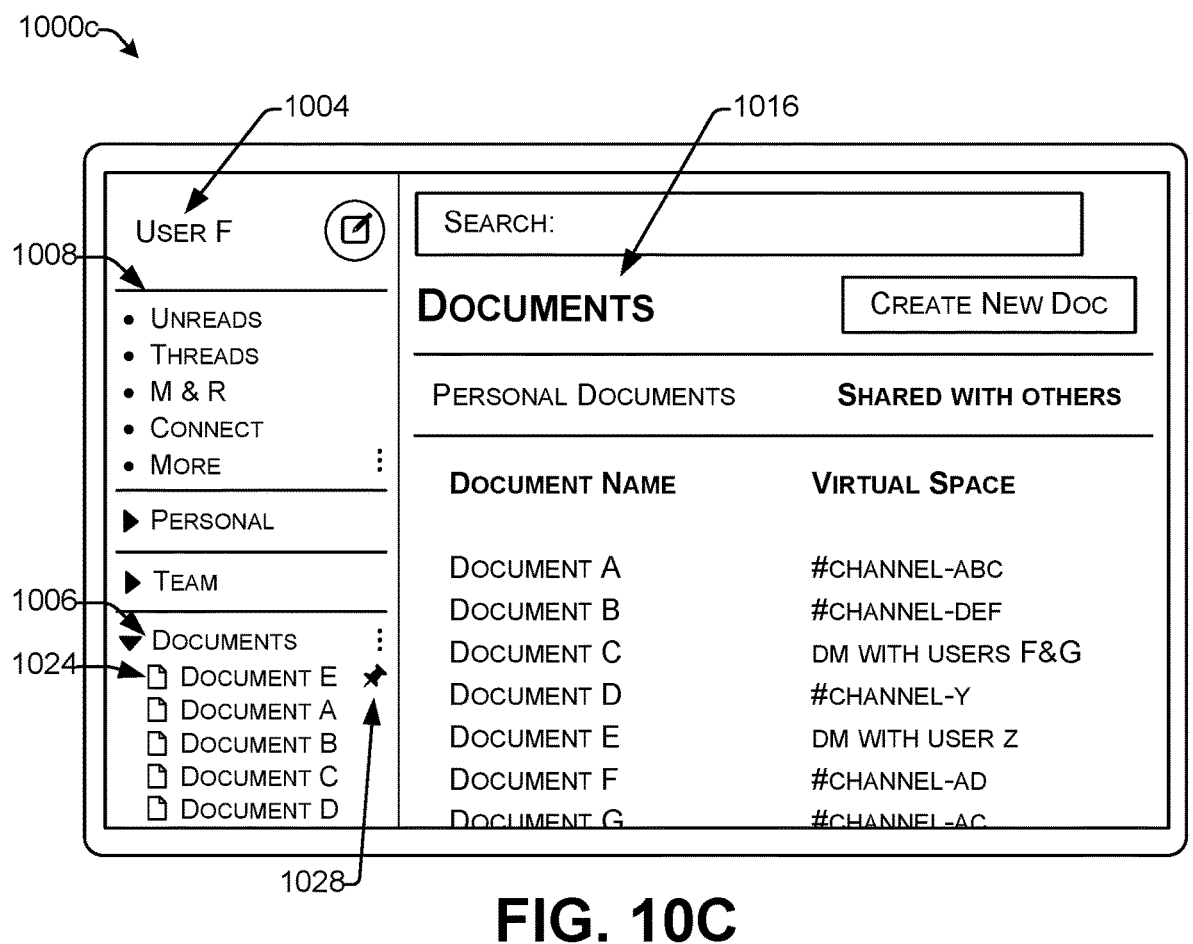

FIGS. 10A-10C illustrate example user interfaces for accessing one or more documents associated with a user account and selecting a document to be presented in a sidebar of a user interface, as described herein. FIG. 10A illustrates an example user interface 1000a in which a collaborative document 1002 associated with a user account of a user 1004 is presented. In the illustrative example, the collaborative document 1002 is associated with a sub-section 1006 of a sidebar 1008 of the user interface. That is, an affordance 1010 associated with the collaborative document 1002 is presented in the sub-section 1006. In at least one example, the affordance 1010 can be selectable such that, when selected or otherwise interacted with by the user 1004, the communication platform causes presentation of the collaborative document 1002 via the user interface 1000a.

In the illustrative example, the affordance 1010 is presented in association with a documents sub-section 1006, as described above. In other examples, the affordance 1010 can be presented in association with an additional or alternate sub-section of the sidebar 1008. In at least one example, the documents sub-section 1006 can include one or more affordances associated with one or more collaborative documents with which the user account of the user 1004 is associated. The documents sub-section 1006 can include a list of some, or all, of the collaborative document(s) associated with the user account of the user 1004. In at least one example, the documents sub-section 1006 can include a ranked list of collaborative document(s) associated with the user account. That is, the documents sub-section 1006 can include a list of collaborative document(s) associated with the user account in a ranked order. The list can include a number of collaborative documents as determined by the communication platform (e.g., pre-determined number) and/or as determined by a user preference (e.g., user preferred number, pre-determined number plus collaborative documents manually added by the user 1004, etc.).

In various examples, the communication platform can rank the collaborative documents associated with the user account based on one or more ranking criteria. Non-limiting examples of ranking criteria can include a most recent time the user accessed the collaborative document(s), a frequency of access of the collaborative document(s), an activity level (e.g., amount of interaction) within the collaborative document(s), a user preference associated with collaborative document(s) (e.g., marked as "favorite," etc.). In at least one example, the communication platform can cause presentation of affordances associated with the collaborative document(s) in the documents sub-section 1006 in a ranked order, such as from highest to lowest. In at least one example, the communication platform can cause affordances associated with highest ranking collaborative documents associated with the user account to be presented in the documents sub-section 1006. Additionally or alternatively, the user 1004 can pin or otherwise associate one or more collaborative documents with the documents sub-section 1006. In some examples, affordances associated with the collaborative document(s) that the user 1004 associates with the documents sub-section 1006 can be presented in a location associated with the request to associate the collaborative document (e.g., drop location of a drag and drop operation) or at a default location (e.g., top of the documents sub-section 1006, bottom of the documents sub-section 1006, etc.). In at least one example, the documents sub-section 1006 can be configured to enable the user to reorder affordances presented therein, such as the reordering of sub-section 912 described with regard to FIGS. 9A and 9B.

In at least one example, a label associated with the documents sub-section 1006 can include an affordance that, when selected by the user 1004 causes a documents interface to be presented via the user interface 1000a. In some examples, the documents sub-section 1006 can additionally or alternatively include a more options control 1012 that, when selected, causes a document options menu 1014 to be presented in association with the documents sub-section 1006. In the illustrative example, the document options menu 1014 includes a first option to view a documents browser (e.g., documents interface) and a second option to manage documents in the sidebar 1008. Though this is not intended to be so limiting, and the document options menu 1014 may include additional or alternative options.

In response to receiving an indication of selection of the second option, the communications platform can cause presentation of a document management window configured to enable the user 1004 to manage documents presented in the sidebar 1008. In response to receiving an indication of selection of the first option, the communications platform can cause presentation of a documents interface via which the user 1004 can access the collaborative document(s) that are associated with the user account. That is, the documents interface can provide an interface for the user to efficiently access one or more collaborative documents that are associated with the user account.

FIG. 10B illustrates an example user interface 1000b in which a documents interface 1016 is presented. In at least one example, the documents interface 1016 can be presented via the user interface 1000b in response to receiving a selection of the first option in the document options menu 1014. In some examples, the communication platform can cause presentation of the documents interface 1016 in response to receiving an indication of selection of a label or affordance associated with the documents sub-section. In such examples, the user 1004 can access the documents interface 1016 by selecting an affordance associated with the label or name of the documents sub-section 1006.

In at least one example, the documents interface 1016 can include one or more lists of collaborative document(s) with which the user account of the user 1004 is associated. In some examples, the documents interface 1016 can include user documents 1018 (illustrated as "Personal Documents"). In some examples, the user documents 1018 can include a list of one or more documents in which the user 1004 is a sole member. That is, the user documents 1018 can include personal documents associated with the user account of the user 1004. For example, a document included in the user documents 1018 can include a personal task list (e.g., to do list) for the user 1004 to manage.

In various examples, the documents interface 1016 can additionally or alternatively include shared documents 1020. The shared documents 1020 can include documents that are shared with at least one other user of the communication platform. In at least one example, a virtual space or other user with which each collaborative document is associated may be presented via the documents interface 1016. As an illustrative example, the documents interface 1016 of FIG. 10B includes a plurality of collaborative documents (e.g., Documents A-G illustrated) with which the user 1004 is a member. Though illustrated as being associated with separate pages, this is not intended to be so limiting, and the user documents 1018 and shared documents 1020 can be presented in a single page of the documents interface 1016. In some examples, clicking on the document (or otherwise selecting the document) will cause the document to be opened within the associated virtual space (e.g., clicking on Document A will cause the document to be opened in association with #channel-ABC).

In various examples, the documents interface 1016 can include additional or alternative details associated with each collaborative document of the plurality of documents. Non-limiting examples of additional or alternative details can include an indication of a creating user (e.g., administrator), an organization associated with the creating user (e.g., administrative organization), a notification of unread data (e.g., bolded document name, indication of a new message associated with the collaborative document, etc.), an indication of privacy settings, and/or the like.

In some examples, in response to receiving a selection of a collaborative document of the collaborative documents presented in the documents interface 1016, the communication platform can cause the respective document to be presented via the user interface 1000*b*. In the illustrative example, in response to receiving the selection of a collaborative document (e.g., "Document E"), the communication platform causes a document actions menu 1022 to be presented in association with the selected collaborative document, the document actions menu 1022 including one or more actions the user 1004 can take with respect to the selected collaborative document. Non-limiting examples of the actions can include viewing the selected collaborative document, sharing the selected collaborative document, viewing details associated with the selected collaborative document, copying a link to the selected collaborative document, and pinning or otherwise associating the selected collaborative document with the sidebar 1008 (e.g., illustrated as "pin to sidebar").

In at least one example, in response to receiving an indication of selection of the pin to sidebar 1008 action, the communication platform can associate the selected collaborative document with the sidebar 1008. That is, the communication platform can cause presentation of an affordance associated with the collaborative document in the sidebar 1008 of the user interface 1000*b*.

FIG. 10C illustrates an example user interface 1000*c* in which an affordance 1024 associated with the selected collaborative document is presented in association with the documents sub-section 1006 of the sidebar 1008. In at least one example, the affordance 1024 can be presented in the documents sub-section 1006 of the sidebar 1008 in response to a selection of a pin to sidebar 1008 action, such as via a documents action menu 1022. In some examples, the affordance 1024 can be presented in response to a drag-and-drop operation from a virtual space or the documents interface 1016, as described above. Though illustrated as being presented in the documents sub-section 1006 of the sidebar 1008, this is merely an illustrative example, and the affordance 1024 can be presented in association with different sub-sections of the sidebar 1008, such as determined based on a user preference (e.g., preference to associate affordances associated with selected collaborative documents in another sub-section (e.g., "Team" sub-section, "Personal" sub-section, etc.).

In some examples, the communication platform can be configured to associate an indicator 1028 with the affordance 1024, such as to indicate to the user 1004 that the respective collaborative document was pinned or otherwise associated with the documents sub-section by the user 1004. That is, the indicator 1028 can provide an indication that the affordance 1024 is associated with a collaborative document that may, or may not be, among the highest ranked collaborative documents with which the user is associated. As such, the indicator 1028 can distinguish user selected collaborative documents from highest ranked documents in the documents sub-section 1006. Though illustrated as a pin, this is not intended to be so limiting, and alternative shapes, symbols, letters, and/or the like are contemplated herein. For example, the indicator 1028 can have associated therewith a star to indicate that it is a user-selected (e.g., favorite) collaborative document.

Figure 11A:
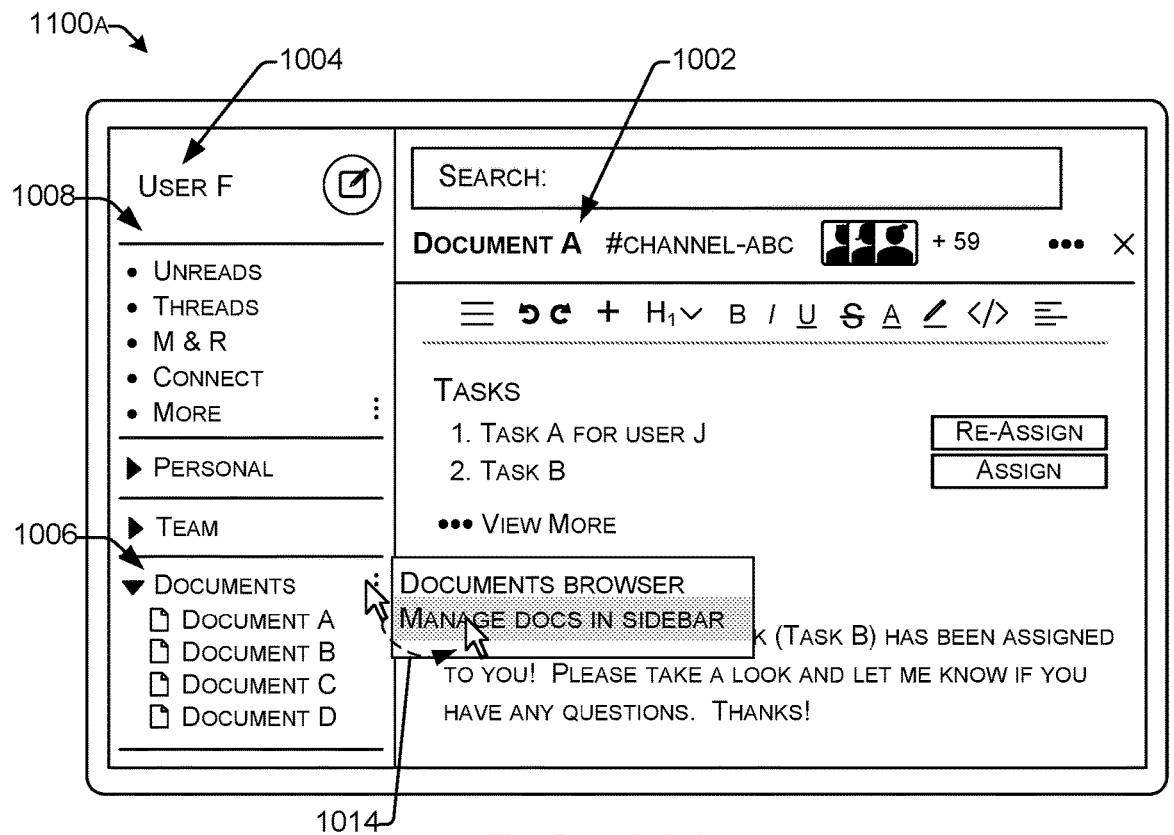
FIGS. 11A-11C illustrate example user interfaces for modifying a presentation of documents in a sidebar of a user interface, as described herein.
Figure 11B:
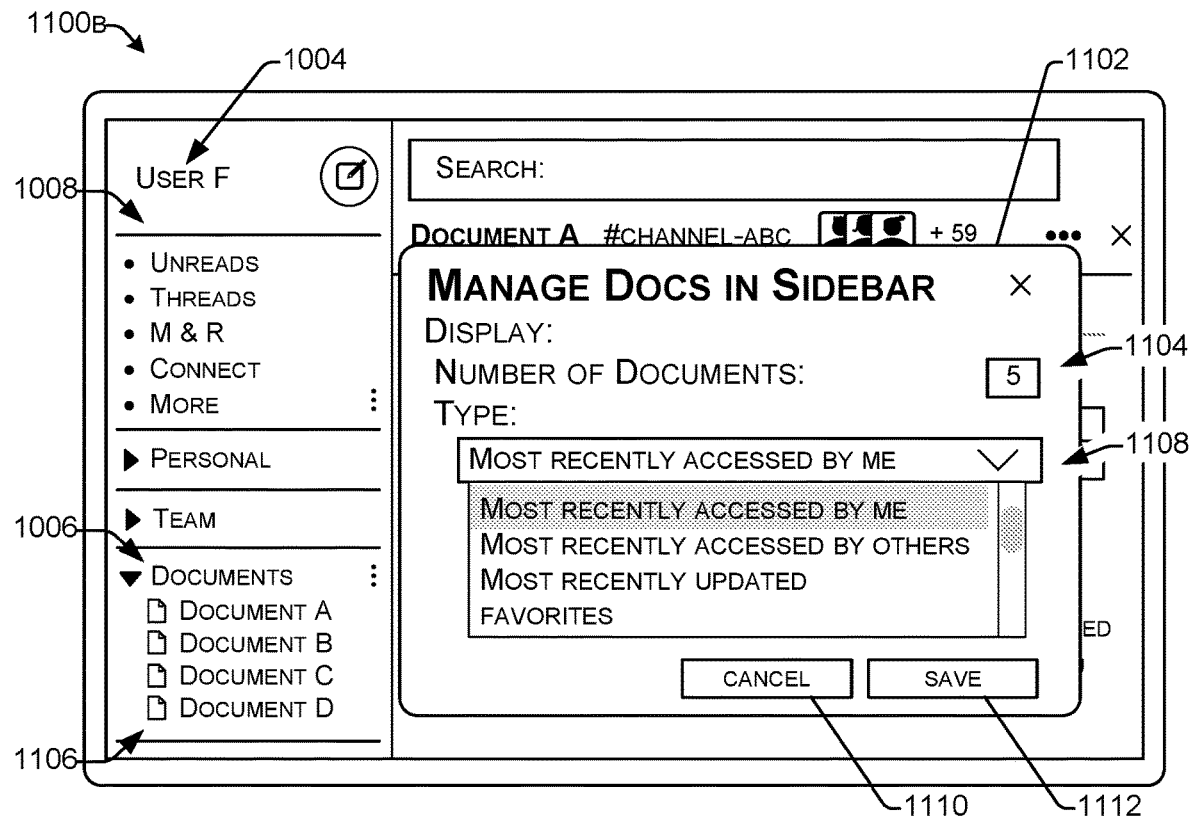
Figure 11C:
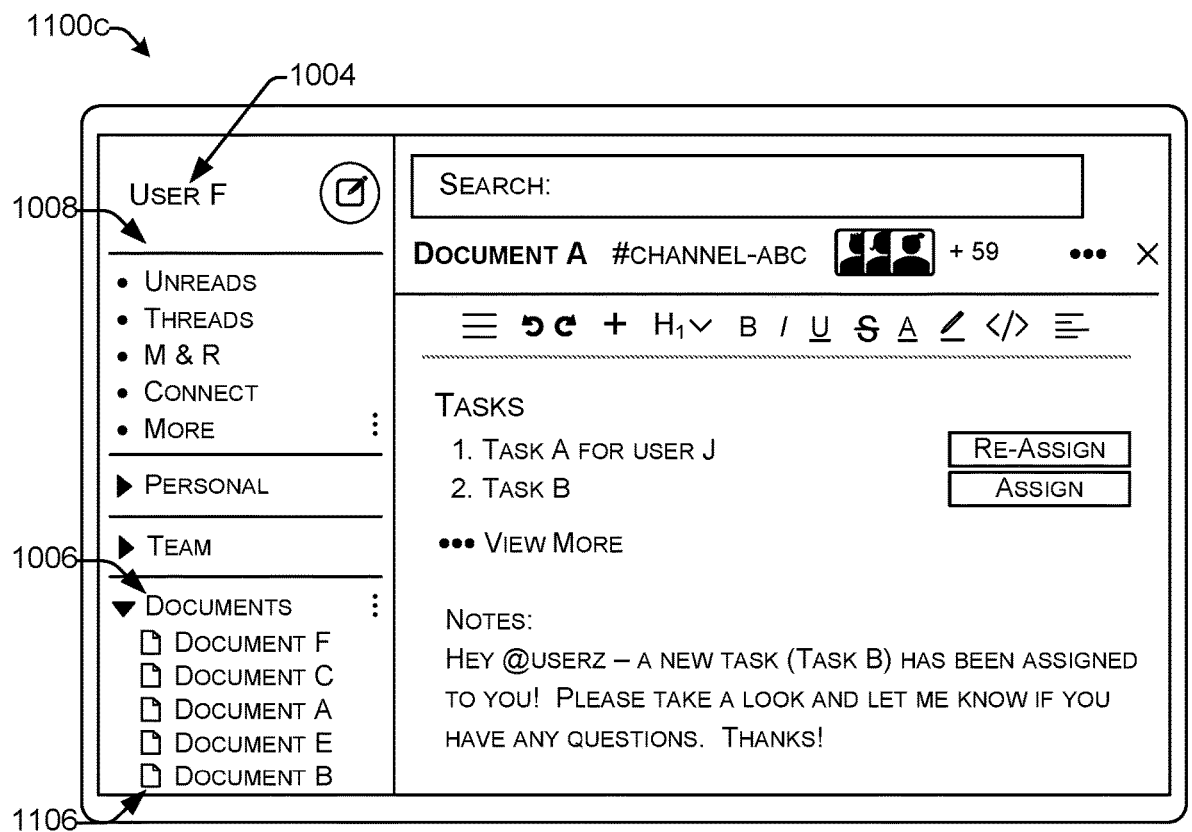

FIGS. 11A-11C illustrate example user interfaces for modifying a presentation of affordances associated with collaborative documents in a sidebar of a user interface, as described herein. FIG. 11A illustrates an example user interface 1100*a* in which the user 1004 selects an option to manage documents in the sidebar 1008 via the documents options menu 1014 associated with the documents sub-section 1006 of FIGS. 10A-C. In response to receiving an indication of selection of the option to manage the documents in the sidebar 1008, the communications platform can cause presentation of a document management window configured to enable the user 1004 to manage documents presented in the sidebar 1008.

FIG. 11B illustrates an example user interface 1100*b* in which a document management window 1102 is presented to enable the user to manage the collaborative documents presented in the sidebar 1008. In at least one example, the communication platform presents the document management window 1102 in response to a selection to manage documents in the sidebar 1008 via the document options menu 1014. In some examples, the communication platform can present the document management window 1102 in response to a selection of an option to manage documents, such as in association with the documents interface 1016 of FIG. 10B

In various examples, the document management window 1102 can include a document number input box 1104 enabling the user 1004 to modify a number of affordances 1106 that are presented in the sidebar 1008. In some examples, the user 1004 can modify the number of affordances from a pre-determined number, such as that determined by the communication platform. For example, the communication platform can initially cause presentation of a pre-determined number of affordances 1106 associated with highest ranking collaborative documents, and the user 1004 can later modify the number to view a greater number or a fewer number of affordances 1106 associated with highest ranking collaborative documents. For another example, the user 1004 can, at a first time, input a user preference to associate a first number of collaborative documents with the documents sub-section 1006, and at a second time after the first time, can cause a second number of collaborative documents to be associated with the documents sub-section 1006. In the illustrative example, the user 1004 can adjust the number from a previously determined number of collaborative documents (e.g., four) to an updated or modified number of collaborative documents (e.g., five), as input in the document number input box 1104.

In various examples, the document management window 1102 can include a ranking criteria input box 1108 enabling the user 1004 to establish one or more ranking criteria by which the communication platform will rank collaborative documents to determine an association with the documents sub-section. As described above, the communication platform can cause presentation of a number of affordances 1106 associated with highest ranking collaborative documents. The ranking criteria can include collaborative documents that are most recently accessed by the user 1004, most recently accessed by others, most recently updated, collaborative documents marked as favorites, frequency of access by the user 1004, frequency of access by other users (e.g., an activity level, amount of interaction), and/or the like. In some examples, the ranking criteria can include access thresholds, such as a threshold frequency of access by the user or other users. For example, the communication platform can determine to cause presentation of an affordance associated with a collaborative document based on a determination that a frequency of access by the user 1004 meets or exceeds the threshold frequency.

In various examples, the ranking criteria input box 1108 can be configured to enable the user 1004 to input one or more ranking criteria. In such examples, the communication platform can rank the collaborative documents based on the one or more ranking criteria and can associate the appropriate number of collaborative documents with the documents sub-section 1006.

In various examples, the communication platform can rank the collaborative documents at a pre-determined frequency (e.g., once per day, once per week, every other hour, etc.). That is, the communication platform can modify associations of collaborative documents with the documents sub-section based on interaction data associated with interactions with the collaborative documents during each interval of time associated with the pre-determined frequency. In some examples, the communication platform can rank the collaborative documents in response to receiving a threshold amount of interaction data associated with one or more collaborative document. That is, in response to identifying a threshold amount of activity associated with the collaborative document(s), the communication platform can re-rank the collaborative documents, such as to provide an up-to-date list of the highest ranked collaborative documents in the documents sub-section 1006. Additionally or alternatively, the communication platform can rank the collaborative documents in response to receiving input from the user 1004, such as a request to re-rank the collaborative documents, an update to the ranking criteria (e.g., via the ranking criteria input box 1108), and/or the like.

In various examples, in response to receiving an indication of selection of a cancel selectable control 1110 associated with the document management window 1102, the communication platform can continue to rank the collaborative documents based on previously determined criteria (e.g., ranking criteria determined by the communication platform, ranking criteria previously input by the user 1004, etc.). In some examples, in response to receiving an indication of selection of a save selectable control 1112 associated with the document management window 1102, the communication platform can update the stored number of documents and ranking criteria based on the input provided by the user 1004, such as via the document number input box 1104 and/or the ranking criteria input box 1108. In at least one example, in response to receiving the indication of selection of the save selectable control 1112, the communication platform can re-rank the collaborative documents based on the updated number of documents and ranking criteria, such as to provide an updated list of highest ranked collaborative documents in association with the documents sub-section 1006.

FIG. 11C illustrates an example user interface 1100c in which the affordances 1106 corresponding to collaborative documents associated with the documents sub-section 1006 are updated, such as based on an updated ranking of the collaborative documents associated with the user account. In at least one example, the affordances 1106 are updated based on input received via the document number input box 1104 and/or the ranking criteria input box 1108 of the document management window 1102. For example, based on an input via the document number input box 1104 modifying the number of collaborative documents from four to five, the updated documents sub-section illustrated in FIG. 11C includes five affordances 1106 associated with the five highest ranked collaborative documents. For another example, based on an input via the ranking criteria input box 1108, the updated documents sub-section illustrated in FIG. 11C includes a list of collaborative documents that are highest ranked based on the updated ranking criteria (e.g., most recently accessed by the user 1004).

FIGS. 12-15 are flowcharts showing example processes involving techniques as described herein. The processes illustrated in FIGS. 12-15 are described with reference to components described above with reference to the system 100 shown in FIG. 1 for convenience and ease of understanding. However, the processes illustrated in FIGS. 12-15 are not limited to being performed using the components described above with reference to the system 100. Moreover, the components described above with reference to the system 100 are not limited to performing the processes illustrated in FIGS. 12-15.

Figure 12:
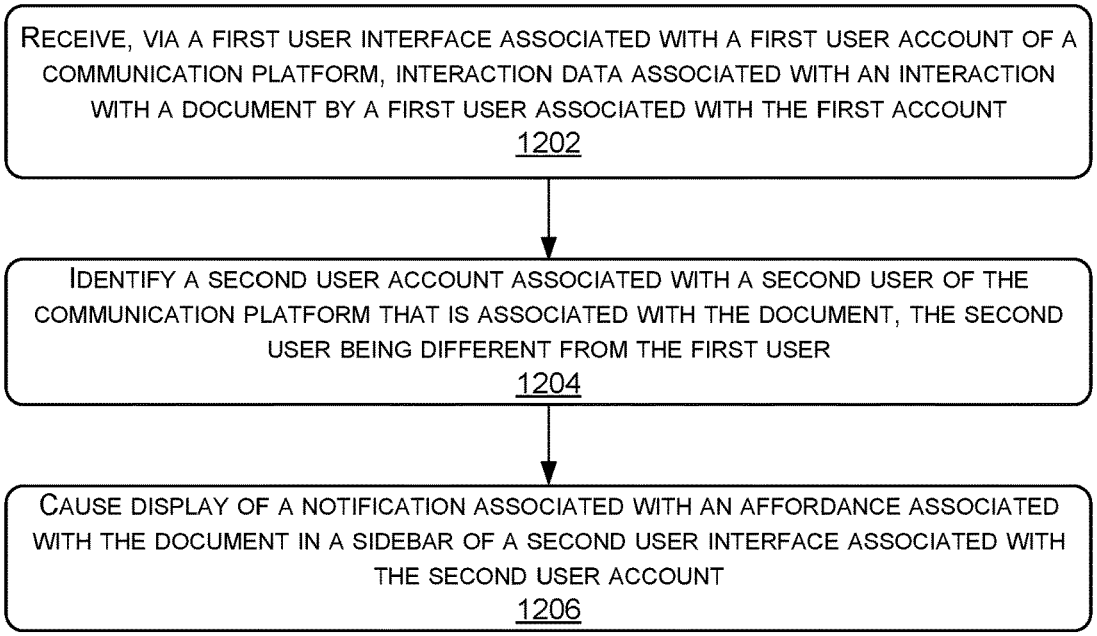
FIG. 12 is an example process for providing a notification of an update to a collaborative document in a sidebar of a user interface associated with a member of the collaborative document, as described herein.

FIG. 12 illustrates an example process 1200 for providing a notification of an update to a collaborative document in a sidebar of a user interface associated with a member of the collaborative document, as described herein.

At operation 1202, a server 102 receives, via a first user interface associated with a first user account of a communication platform, interaction data associated with an interaction with a document (e.g., collaborative document) by a first user associated with the first account. The interaction data can include text and/or objects input by the first user. That is, the interaction data associated with the interaction can represent an update or modification to the document. In various examples, the update or modification can include a modification to text in an editable text section, an addition of an object (e.g., adding a workflow, a task, a ticket, a message from another virtual space, etc.), inputting a message in a text, audio, or video chat interface associated with the document, and/or the like. In some examples, the update or modification can include a mention or tag of another user associated with the document.

At operation 1204, in response to receiving the request, the server 102 identifies a second user account associated with a second user of the communication platform that is associated with the document, the second user being different from the first user. In examples in which the document is shared in association with a virtual space (e.g., communication channel, direct messaging instance, synchronous or asynchronous audio and/or video meeting, etc.), the members of the virtual space can additionally be members of the document. That is, the first user and the second user can both be members of the virtual space and the document. In various examples, the communication platform can identify the second user account based on a previous request received from the first user to share the document with the second user. In such an example, the communication platform can associate the document with the second user account based on the share, thereby rendering the second user a member of the document, in addition to the first user and/or other users with whom the document has been previously shared. In some examples, the communication platform can identify the second user based on a mention or tag thereof that is associated with the update. For example, the communication platform identifies the second user based on a determination that the first user mentions the second user in the interaction (e.g., interaction data includes an identifier such as "seconduser," "@second user," etc.).

At operation 1206, the server 102 causes display of a notification associated with an affordance associated with the document in a sidebar of a second user interface associated with the second user account. The notification can include a modification to text and/or an image associated with the affordance corresponding to the document. For example, the notification can include bolded text associated with the affordance. In some examples, the notification can include a separate indicator (e.g., shape, symbol, number, letter, etc.) associated with the affordance. In some examples, the notification can include a pop-up or overlay notification presented via the second user interface. In at least one example, the notification can be configured to alert the second user of the update to the document, such as to improve discoverability of the update.

Figure 13:
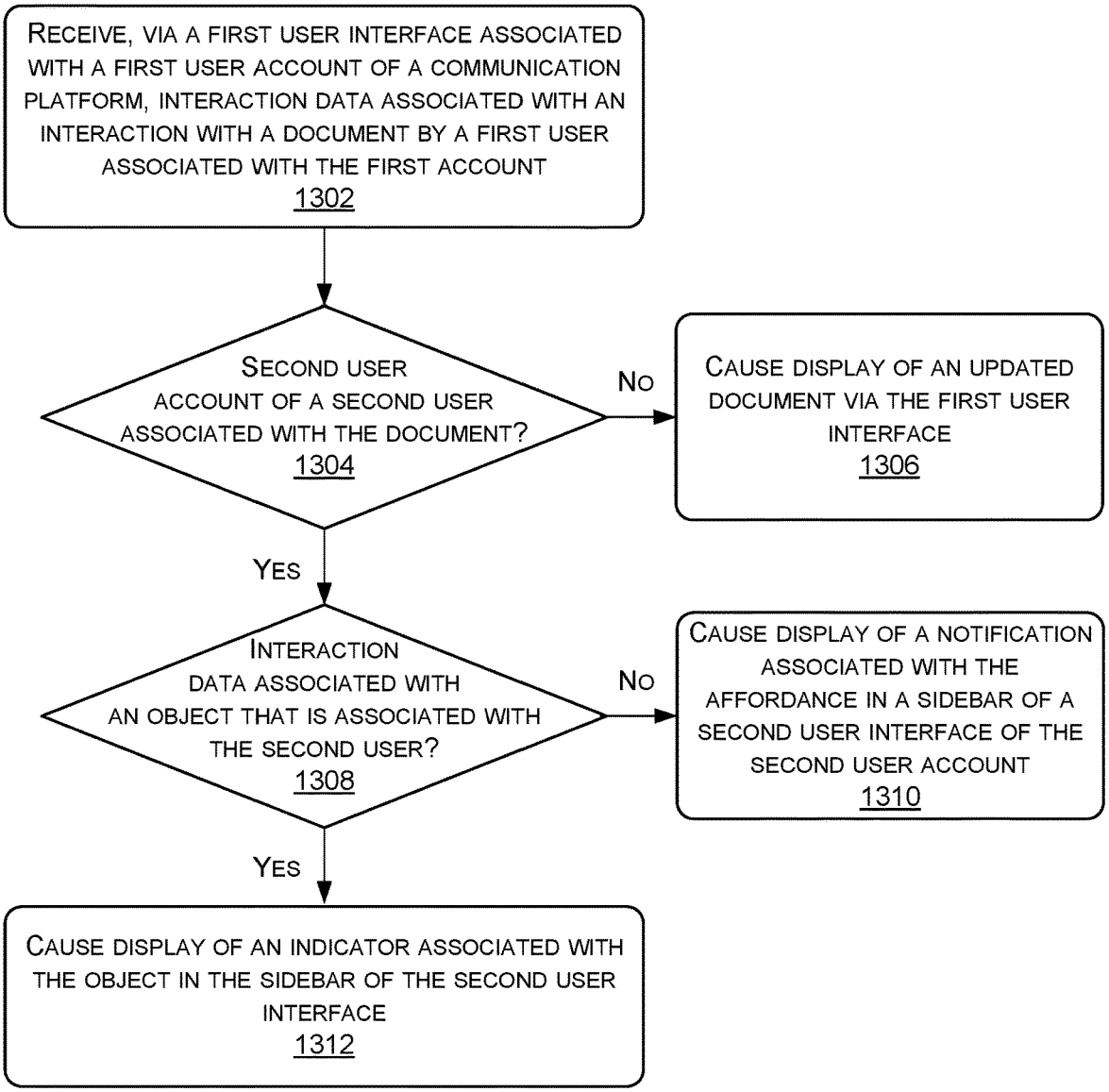
FIG. 13 is an example process for determining that interaction data associated with an interaction by a first user with a collaborative document is associated with a second user, and causing presentation of an indicator associated with the interaction in a sidebar of a user interface associated with the second user, as described herein.

FIG. 13 illustrates an example process 1300 for determining that interaction data associated with an interaction by a first user with a collaborative document is associated with a second user, and causing presentation of an indicator associated with the interaction in a sidebar of a user interface associated with the second user, as described herein.

At operation 1302, a server 102 receives, via a first user interface associated with a first user account of a communication platform, interaction data associated with an interaction with a document (e.g., collaborative document) by a first user associated with the first account. The interaction data can include text, a comment, and/or objects input by the first user. That is, the interaction data associated with the interaction can represent an update or modification to the document. In various examples, the update or modification can include a modification to text in an editable text section, an addition of an object (e.g., adding a workflow, a task, a ticket, a message from another virtual space, etc.), inputting a message in a text, audio, or video chat interface associated with the document, and/or the like. In some examples, the update or modification can include a mention or tag of another user associated with the document.

At operation 1304, the server 102 determines whether a second user account of a second user is associated with the document. As discussed above, in examples in which the document is shared, the document can be associated with at least the second user account. In examples in which the document is created in association with the first user account, such as a personal document, the document can be associated with the first user account and not the second user account.

Based on a determination that the second user account is not associated with the document ("No" at operation 1304), the server 102, at operation 1306, causes display of an updated document via the first user interface based on the interaction data. That is, the server 102 receives the interaction data associated with the interaction, stores the updated document, and causes the updated document to be presented to the first user in association with the first user account.

Based on a determination that the second user account is associated with the document ("Yes" at operation 1304), the server 102, at operation 1308, determines whether the interaction data is associated with an object that is associated with the second user. In various examples, the interaction data can represent an assignment of the object (e.g., task, ticket, etc.) to the second user, an update to a workflow in which the second user is associated with a step (e.g., completion of first step and second step associated with second user, etc.), and/or the like.

Based on a determination that the interaction data is not associated with the second user ("No" at operation 1308), the server 102, at operation 1310, causes display of a notification associated with the affordance in a sidebar of a second user interface of the second user account. The notification can include a modification to text and/or an image associated with the affordance corresponding to the document. For example, the notification can include bolded text associated with the affordance. In some examples, the notification can include a separate indicator (e.g., shape, symbol, number, letter, etc.) associated with the affordance. In some examples, the notification can include a pop-up or overlay notification presented via the second user interface. In at least one example, the notification can be configured to alert the second user of the update to the document, such as to improve discoverability of the update.

Based on a determination that the interaction data is associated with the second user ("Yes" at operation 1308), the server 102, at operation 1312, causes display of an indicator associated with the object in the sidebar of the second user interface. In at least one example, the indicator can include an affordance or user interface element that, when selected by the second user, causes at least one of the document or the object to be presented via the second user interface. In various examples, the indicator presented in the sidebar can improve discoverability of the object to the second user, such as to inform and/or remind the second user of an assignment or other association therewith.

FIG. 14 illustrates an example process 1400 for providing a notification of an update to a collaborative document in sidebar of a user interface, as described herein.

At operation 1402, a server 102 receives, via a first user interface associated with a first user account of a communication platform, a request to associate a document with a sidebar of the first user interface. As discussed above, the request can include a drag-and-drop operation of an affordance from a virtual space associated with the document to a sub-section of the sidebar and/or a request to pin or otherwise associate the document with the sidebar of the first user interface.

At operation 1404, in response to receiving the request, the server 102, causes display of an affordance associated with the document in the sidebar of the first user interface. In at least one example, the affordance can be configured such that, when selected by the first user, the document is presented via the first user interface. That is, the affordance can enable efficient access to the document for the first user.

At operation 1406, the server 102 receives, via a second user interface associated with a second user account, interaction data associated with an interaction with the document by a second user associated with the second account. The interaction data can include text, comments, and/or objects input by the first user. That is, the interaction data associated with the interaction can represent an update or modification to the document. In various examples, the update or modification can include a modification to text in an editable text section, an addition of an object (e.g., adding a workflow, a task, a ticket, a message from another virtual space, etc.), inputting a message in a text, audio, or video chat interface associated with the document, and/or the like. In some examples, the update or modification can include a mention or tag of another user associated with the document.

At operation 1408, the server 102 determines whether the interaction data is associated with an object that is associated with the first user. In some examples, the server 102 can determine that the interaction data is associated with an object in the document that is associated with the first user based on a determination that the interaction data includes an object assignment to the first user, an update to an object previously assigned to the first user, a mention or a tag of the first user (e.g., interaction data includes "firstuser" or other identifier associated with the first user), a completion of a step in a workflow that is associated with the first user, user preference of the first user to be informed of updates to the document by the second user and/or other users (e.g., notification preference), and/or the like.

Based on a determination that the interaction data is not associated with an object in the document associated with the first user ("No" at operation 1408), the server 102, at operation 1410, stores data associated with an updated document based at least in part on the interaction without causing a notification to be displayed in the affordance in the sidebar of the first user interface. In at least one example, the server 102 can store the updated document in a datastore, such as datastore 126. In some examples the server 102 can store the updated document in a data shard of the datastore that is associated with at least one of the collaborative document or an organization associated with the collaborative document. In various examples, the updated document can be accessible to users of the communication platform with appropriate permissions (e.g., members of the document). In at least one example, the updated document can be accessed via an associated virtual space and/or a documents interface associated with members of the document.

Based on a determination that the interaction data is associated with an object in the document associated with the first user ("Yes" at operation 1408), the server 102, at operation 1412, causes display of a notification associated with the affordance in the sidebar of the first user interface. The notification can include a modification to text and/or an image associated with the affordance corresponding to the document. For example, the notification can include bolded text associated with the affordance. In some examples, the notification can include a separate indicator (e.g., shape, symbol, number, letter, etc.) associated with the affordance. In some examples, the notification can include a pop-up or overlay notification presented via the second user interface. In at least one example, the notification can be configured to alert the second user of the update to the document, such as to improve discoverability of the update.

Figure 15:
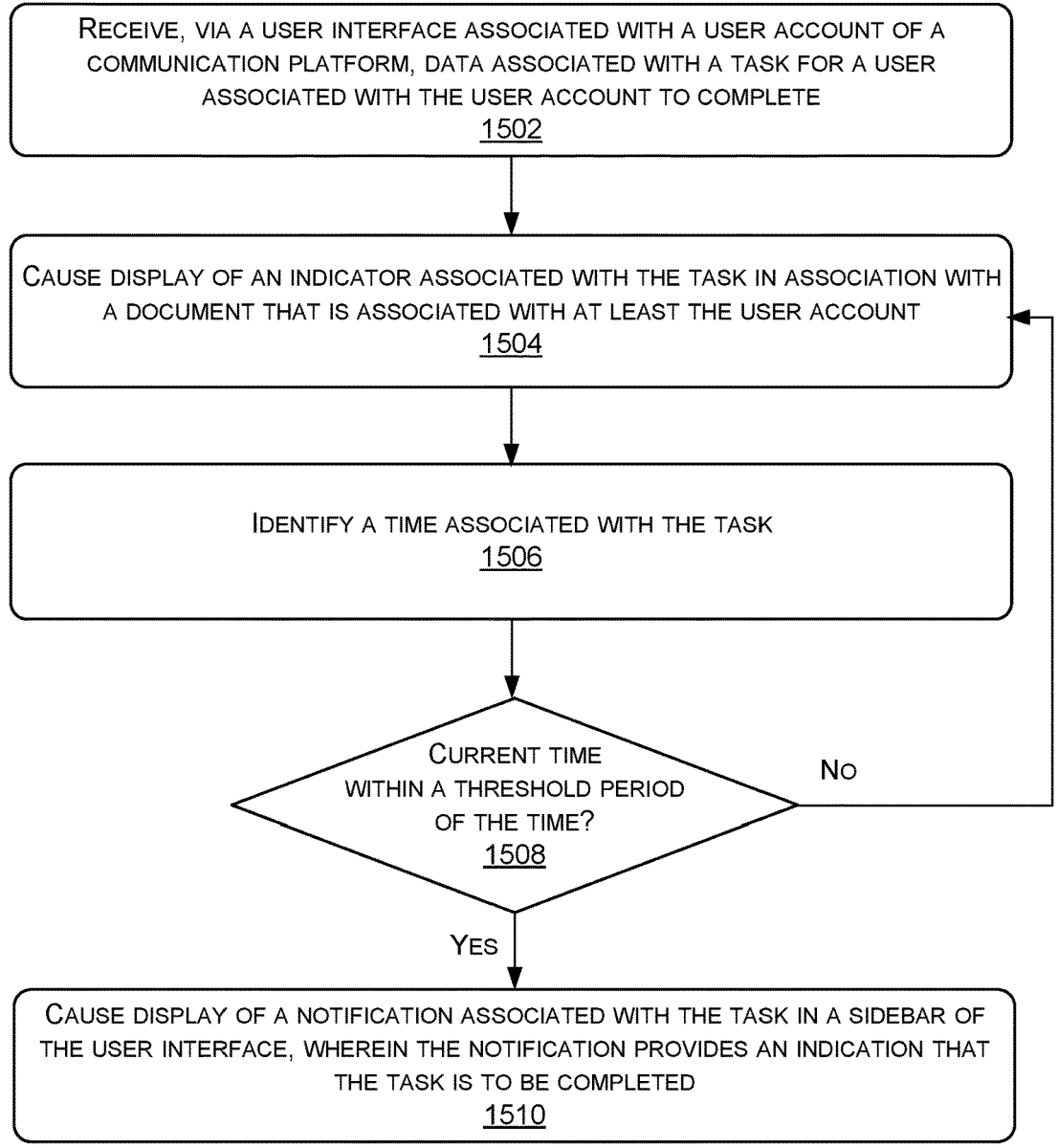
FIG. 15 is an example process for providing a notification of a task for a user to complete in a sidebar of a user interface, as described herein

FIG. 15 illustrates an example process 1500 for providing a notification of a task for a user to complete in a sidebar of a user interface, as described herein.

At operation 1502, a server 102 receives, via a user interface associated with a user account of a communication platform, data associated with a task for a user associated with the user account to complete. In at least one example, the data can represent a task assignment to the user. As discussed above with respect to FIG. 7A, the server 102 can be configured to identify the task based on content and/or context of messages transmitted in association with a virtual space. In such examples, the server 102 the data can include message data. In some examples, the server 102 can identify the task based on a task assignment associated with a collaborative document, such as that described with respect to FIG. 3A.

At operation 1504, in response to receiving the request, the server 102 causes display of an indicator associated with the task in association with a document that is associated with at least the user account. In at least one example, the document can include a personal document associated with the user account, such as a to do list document managed by the user.

At operation 1506, the server 102 identifies a time associated with the task. In some examples, the time includes a date and/or time of the day associated with the task. In at least one example, the time can include a due date and/or time, a suspense time, and/or the like associated with the task. That is, the time can represent a time by which the task is to be completed.

At operation 1508, the server 102 determines whether a current time is within a threshold period (e.g., one day, 10 hours, 8 hours, 1 hour, etc.) of the time. In some examples, a determination that the current time is within the threshold period can include a determination that a current day and/or date is associated with the time. In some examples, the determination that the current time is within the threshold period can include a determination that a current time of the day is within a threshold amount of time of the time associated with the task.

Based on a determination that the current time is not within the threshold period of the time ("No" at operation 1508), the server 102 continues to display the indicator associated with the task in association with the document.

Based on a determination that the current time is within the threshold period of the time ("Yes" at operation 1508), the server 102, at operation 1510 causes display of a notification associated with the task in a sidebar of the user interface, wherein the notification provides an indication that the task is to be completed. In some examples, the server 102 can associate the notification with the document that is associated with the at least the user account. In some examples, the server 102 can additionally cause an affordance associated with the task to be presented in the sidebar, such as in association with the document. In such examples, the notification can be presented in association with the document and/or the affordance. In at least one example, the affordance can be selectable such that, when selected by the user, causes presentation of the task and/or the document via the user interface.

In at least one example, the notification can include a modification to text and/or an image associated with an affordance corresponding to the document and/or the affordance associated with the task. For example, the notification can include bolded text associated with one or both affordances. In some examples, the notification can include a separate indicator (e.g., shape, symbol, number, letter, etc.) associated with one or both affordances. In some examples, the notification can include a pop-up or overlay notification presented in association with the sidebar.

Though described herein as a task that is associated with the user account, this is not intended to be so limiting, and additional or alternative objects can be associated with the user account and affordances and/or notifications associated therewith can be presented via the sidebar. Non-limiting examples of other objects include files (e.g., text, audio, video, an application, etc.), events (e.g., scheduled event, calendar invitation, calendar instance, etc.), tickets, messages associated with the user account (e.g., mentioning, tagging, or otherwise directed to the user), a link to a local object that is associated with the user, a link to a remote object that is associated with the user (e.g., third-party object), and/or the like.

As such, techniques described herein provide specific, technical solutions to technical problems faced by existing systems, the details of which are described above.

Example Clauses

A: A method, implemented at least in part by one or more computing devices of a communication platform, the method comprising: receiving, via a first user interface associated with a first user account of the communication platform, interaction data associated with an interaction with a document by a first user associated with the first user account; identifying a second user account associated with a second user of the communication platform that is associated with the document, wherein the second user is different from the first user and the first user and the second user are members of the document; and in response to identifying the second user account, causing display of a notification associated with an affordance associated with the document in a sidebar of a second user interface associated with the second user account, wherein the notification is based at least in part on the interaction data.

B: The method of paragraph A, wherein the interaction data comprises a request to associate an object associated with a virtual space of the communication platform with the document, the method further comprising: receiving, in association with the second user account, an indication of selection of the affordance; and causing display, via the second user interface, of the object in the document.

C: The method of paragraph B, wherein the interaction comprises a drag and drop action, by the first user, of the object from the virtual space to a second affordance associated with the document, the second affordance being associated with a second sidebar of the first user interface.

D: The method of any one of paragraphs A-C, wherein the affordance is a first affordance, the notification is a first notification, the method further comprising: determining that an object associated with the document comprises a task that is associated with the second user; and causing display, in the sidebar of the second user interface, of a second affordance associated with the object, wherein the second affordance is presented in association with the document in the sidebar.

E: The method of any one of paragraphs A-D, wherein the notification is a first notification, the method further comprising: receiving, from a third user account of a third user that is associated with the document, a message transmitted in association with the document; and in response to receiving the message, causing display of a first instance of the message in association with a first messaging interface associated with the document; causing display of a second notification associated with the affordance in the sidebar of the second user interface, the second notification providing an indication of an update to the document based on the message; and causing display of a second instance of the message in association with a second messaging interface of a virtual space associated with the document.

F: The method of any one of paragraphs A-E, wherein the document is associated with a virtual space in which the first user and the second user are members, the method further comprising: prior to displaying the notification, determining a frequency that the second user accesses the document in association with the virtual space; and based on a determination that the frequency meets or exceeds a threshold frequency, causing display of the affordance associated with the document in the sidebar of the second user interface.

G: The method of any one of paragraphs A-F, the method further comprising: prior to receiving the interaction data, receiving, via the second user interface, a request to associate the document with the sidebar, wherein an association of the document with the sidebar causes the affordance associated with the document to persist in the sidebar; and in response to receiving the request, causing display of the affordance in the sidebar.

H: The method of paragraph G, further comprising identifying a virtual space associated with the document, wherein causing display of the affordance in the sidebar comprises causing display of the affordance in association with the virtual space.

I: A system comprising: one or more processors; and one or more non-transitory computer-readable media storing instructions that, when executed, cause the system to perform operations comprising: receiving, via a first user interface associated with a first user account of a communication platform, interaction data associated with an interaction with a document by a first user associated with the first user account; identifying a second user account associated with a second user of the communication platform that is associated with the document, wherein the second user is different from the first user and the first user and the second user are members of the document; and in response to identifying the second user account, causing display of a notification associated with an affordance associated with the document in a sidebar of a second user interface associated with the second user account, wherein the notification is based at least in part on the interaction data.

J: The system of paragraph I, wherein the interaction data comprises a request to associate an object associated with a virtual space of the communication platform with the document, the operations further comprising: receiving, in association with the second user account, an indication of selection of the affordance; and causing display, via the second user interface, of the object in the document.

K: The system of paragraph J, wherein the interaction comprises a drag and drop action, by the first user, of the object from the virtual space to a second affordance associated with the document, the second affordance being associated with a second sidebar of the first user interface.

L: The system of any one of paragraphs I-K, wherein the affordance is a first affordance, the notification is a first notification, the operations further comprising: determining that an object associated with the document comprises a task that is associated with the second user; and causing display, in the sidebar of the second user interface, of a second affordance associated with the object, wherein the second affordance is presented in association with the document in the sidebar.

M: The system of any one of paragraphs I-L, wherein the notification is a first notification, the operations further comprising: receiving, from a third user account of a third user that is associated with the document, a message transmitted in association with the document; and in response to receiving the message, causing display of a first instance of the message in association with a first messaging interface associated with the document; causing display of a second notification associated with the affordance in the sidebar of the second user interface, the second notification providing an indication of an update to the document based on the message; and causing display of a second instance of the message in association with a second messaging interface of a virtual space associated with the document.

N: The system of any one of paragraphs I-M, wherein the document is associated with a virtual space in which the first user and the second user are members, the operations further comprising: prior to displaying the notification, determining a frequency that the second user accesses the document in association with the virtual space; and based on a determination that the frequency meets or exceeds a threshold frequency, causing display of the affordance associated with the document in the sidebar of the second user interface.

O: The system of any one of paragraphs I-N, the operations further comprising: prior to receiving the interaction data, receiving, via the second user interface, a request to associate the document with the sidebar, wherein an association of the document with the sidebar causes the affordance associated with the document to persist in the sidebar; and in response to receiving the request, causing display of the affordance in the sidebar.

P: The system of paragraph O, the operations further comprising identifying a virtual space associated with the document, wherein causing display of the affordance in the sidebar comprises causing display of the affordance in association with the virtual space.

Q: One or more non-transitory computer-readable media storing instructions that, when executed by one or more processors, cause the one or more processors to perform operations comprising: receiving, via a first user interface associated with a first user account of a communication platform, interaction data associated with an interaction with a document by a first user associated with the first user account; identifying a second user account associated with a second user of the communication platform that is associated with the document, wherein the second user is different from the first user and the first user and the second user are members of the document; and in response to identifying the second user account, causing display of a notification associated with an affordance associated with the document in a sidebar of a second user interface associated with the second user account, wherein the notification is based at least in part on the interaction data.

R: The one or more non-transitory computer-readable media of paragraph Q, wherein the interaction data comprises a request to associate an object associated with a virtual space of the communication platform with the document, the operations further comprising: receiving, in association with the second user account, an indication of selection of the affordance; and causing display, via the second user interface, of the object in the document.

S: The one or more non-transitory computer-readable media of paragraph R, wherein the interaction comprises a drag and drop action, by the first user, of the object from the virtual space to a second affordance associated with the document, the second affordance being associated with a second sidebar of the first user interface.

T: The one or more non-transitory computer-readable media of any one of paragraphs Q S, wherein the affordance is a first affordance, the notification is a first notification, the operations further comprising: determining that an object associated with the document comprises a task that is associated with the second user; and causing display, in the sidebar of the second user interface, of a second affordance associated with the object, wherein the second affordance is presented in association with the document in the sidebar.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, the method comprising:
   receiving, via a first user interface associated with a first user account of the communication platform, interaction data associated with an interaction with a document by a first user associated with the first user account, wherein the interaction includes at least one of a modification of the document or a message posted within the communication platform that references the document;
   identifying a second user account associated with a second user of the communication platform that is associated with the document, wherein the second user is different from the first user and the first user and the second user are members of the document; and
   in response to identifying the second user account, causing display of a notification associated with an affordance associated with the document in a sidebar of a second user interface associated with the second user account, wherein the notification is based at least in part on the interaction data and the sidebar includes one or more virtual spaces in which the second user account is a member.

2. The method of claim 1, wherein the interaction data comprises a request to associate an object associated with a virtual space of the communication platform with the document, the method further comprising:
   receiving, in association with the second user account, an indication of selection of the affordance; and
   causing display, via the second user interface, of the object in the document.

3. The method of claim 2, wherein the interaction comprises a drag and drop action, by the first user, of the object from the virtual space to a second affordance associated with the document, the second affordance being associated with a second sidebar of the first user interface.

4. The method of claim 1, wherein the affordance is a first affordance, the notification is a first notification, the method further comprising:
   determining that an object associated with the document comprises a task that is associated with the second user; and
   causing display, in the sidebar of the second user interface, of a second affordance associated with the object, wherein the second affordance is presented in association with the document in the sidebar.

5. The method of claim 1, wherein the notification is a first notification, the method further comprising:
receiving, from a third user account of a third user that is associated with the document, the message or a second message transmitted in association with the document; and
in response to receiving the message or the second message,
causing display of a first instance of the message or the second message in association with a first messaging interface associated with the document;
causing display of a second notification associated with the affordance in the sidebar of the second user interface, the second notification providing an indication of an update to the document based on the message or the second message; and
causing display of a second instance of the message or the second message in association with a second messaging interface of a virtual space associated with the document.

6. The method of claim 1, wherein the document is associated with a virtual space in which the first user and the second user are members, the method further comprising:
prior to displaying the notification, determining a frequency that the second user accesses the document in association with the virtual space; and
based on a determination that the frequency meets or exceeds a threshold frequency, causing display of the affordance associated with the document in the sidebar of the second user interface.

7. The method of claim 1, the method further comprising:
prior to receiving the interaction data, receiving, via the second user interface, a request to associate the document with the sidebar, wherein an association of the document with the sidebar causes the affordance associated with the document to persist in the sidebar; and
in response to receiving the request, causing display of the affordance in the sidebar.

8. The method of claim 7, further comprising:
identifying a virtual space associated with the document, wherein causing display of the affordance in the sidebar comprises causing display of the affordance in association with the virtual space.

9. A system comprising:
one or more processors; and
one or more non-transitory computer-readable media storing instructions that, when executed, cause the system to perform operations comprising:
receiving, via a first user interface associated with a first user account of a communication platform, interaction data associated with an interaction with a document by a first user associated with the first user account, wherein the interaction includes at least one of a modification of the document or a message posted within the communication platform that references the document;
identifying a second user account associated with a second user of the communication platform that is associated with the document, wherein the second user is different from the first user and the first user and the second user are members of the document; and
in response to identifying the second user account, causing display of a notification associated with an affordance associated with the document in a sidebar of a second user interface associated with the second user account, wherein the notification is based at least in part on the interaction data and the sidebar includes one or more virtual spaces in which the second user account is a member.

10. The system of claim 9, wherein the interaction data comprises a request to associate an object associated with a virtual space of the communication platform with the document, the operations further comprising:
receiving, in association with the second user account, an indication of selection of the affordance; and
causing display, via the second user interface, of the object in the document.

11. The system of claim 10, wherein the interaction comprises a drag and drop action, by the first user, of the object from the virtual space to a second affordance associated with the document, the second affordance being associated with a second sidebar of the first user interface.

12. The system of claim 9, wherein the affordance is a first affordance, the notification is a first notification, the operations further comprising:
determining that an object associated with the document comprises a task that is associated with the second user; and
causing display, in the sidebar of the second user interface, of a second affordance associated with the object, wherein the second affordance is presented in association with the document in the sidebar.

13. The system of claim 9, wherein the notification is a first notification, the operations further comprising:
receiving, from a third user account of a third user that is associated with the document, the message or a second message transmitted in association with the document; and
in response to receiving the message or the second message,
causing display of a first instance of the message or the second message in association with a first messaging interface associated with the document;
causing display of a second notification associated with the affordance in the sidebar of the second user interface, the second notification providing an indication of an update to the document based on the message or the second message; and
causing display of a second instance of the message or the second message in association with a second messaging interface of a virtual space associated with the document.

14. The system of claim 9, wherein the document is associated with a virtual space in which the first user and the second user are members, the operations further comprising:
prior to displaying the notification, determining a frequency that the second user accesses the document in association with the virtual space; and
based on a determination that the frequency meets or exceeds a threshold frequency, causing display of the affordance associated with the document in the sidebar of the second user interface.

15. The system of claim 9, the operations further comprising:
prior to receiving the interaction data, receiving, via the second user interface, a request to associate the document with the sidebar, wherein an association of the document with the sidebar causes the affordance associated with the document to persist in the sidebar; and
in response to receiving the request, causing display of the affordance in the sidebar.

16. The system of claim 15, the operations further comprising:

identifying a virtual space associated with the document, wherein causing display of the affordance in the sidebar comprises causing display of the affordance in association with the virtual space.

17. One or more non-transitory computer-readable media storing instructions that, when executed by one or more processors, cause the one or more processors to perform operations comprising:

receiving, via a first user interface associated with a first user account of a communication platform, interaction data associated with an interaction with a document by a first user associated with the first user account, wherein the interaction includes at least one of a modification of the document or a message posted within the communication platform that references the document;

identifying a second user account associated with a second user of the communication platform that is associated with the document, wherein the second user is different from the first user and the first user and the second user are members of the document; and in response to identifying the second user account, causing display of a notification associated with an affordance associated with the document in a sidebar of a second user interface associated with the second user account, wherein the notification is based at least in part on the interaction data and the sidebar includes one or more virtual spaces in which the second user account is a member.

18. The one or more non-transitory computer-readable media of claim 17, wherein the interaction data comprises a request to associate an object associated with a virtual space of the communication platform with the document, the operations further comprising:

receiving, in association with the second user account, an indication of selection of the affordance; and causing display, via the second user interface, of the object in the document.

19. The one or more non-transitory computer-readable media of claim 18, wherein the interaction comprises a drag and drop action, by the first user, of the object from the virtual space to a second affordance associated with the document, the second affordance being associated with a second sidebar of the first user interface.

20. The one or more non-transitory computer-readable media of claim 17, wherein the affordance is a first affordance, the notification is a first notification, the operations further comprising:

determining that an object associated with the document comprises a task that is associated with the second user; and causing display, in the sidebar of the second user interface, of a second affordance associated with the object, wherein the second affordance is presented in association with the document in the sidebar.

* * * * *